US012291018B2

(12) United States Patent
Held et al.

(10) Patent No.: US 12,291,018 B2
(45) Date of Patent: May 6, 2025

(54) DIE-CUTTING UNIT COMPRISING A DEVICE FOR CHANGING A DIE-CUTTING CYLINDER AND METHOD FOR CHANGING A DIE-CUTTING CYLINDER

(71) Applicant: KOENIG & BAUER AG, Würzburg (DE)

(72) Inventors: Michael Held, Heuchelheim (DE); Alexander Soller, Worms (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/690,491

(22) PCT Filed: Nov. 30, 2022

(86) PCT No.: PCT/EP2022/083827
§ 371 (c)(1),
(2) Date: Mar. 8, 2024

(87) PCT Pub. No.: WO2023/099552
PCT Pub. Date: Jun. 8, 2023

(65) Prior Publication Data

US 2024/0416643 A1 Dec. 19, 2024

(30) Foreign Application Priority Data

Dec. 1, 2021 (DE) ..................... 10 2021 131 590.5
Jan. 17, 2022 (DE) ..................... 10 2022 100 961.0
Jan. 31, 2022 (DE) ..................... 10 2022 102 147.5

(51) Int. Cl.
*B41F 9/18* (2006.01)
*B41F 13/34* (2006.01)
*B41F 19/00* (2006.01)

(52) U.S. Cl.
CPC ................ *B41F 9/18* (2013.01); *B41F 13/34* (2013.01); *B41F 19/008* (2013.01); *B41P 2213/80* (2013.01)

(58) Field of Classification Search
CPC .... B23D 35/008; B26D 7/2614; B26D 7/265; Y10T 483/17; Y10T 83/483;
(Continued)

(56) References Cited

U.S. PATENT DOCUMENTS 6,138,544 A * 10/2000 Newell .................. B26F 1/384 83/563
6,253,593 B1 * 7/2001 Goto ...................... B21B 31/08 72/97
(Continued)

FOREIGN PATENT DOCUMENTS

DE 102004058597 A1 7/2005
DE 102009028208 A1 2/2011
(Continued)

OTHER PUBLICATIONS

International Search Report of PCT/EP2022/083827 dated Feb. 3, 2023.

*Primary Examiner* — Jonathan G Riley
(74) *Attorney, Agent, or Firm* — MATTINGLY & MALUR, PC

(57) ABSTRACT

Examples include a die-cutting unit that includes a device for changing a die-cutting cylinder. The die-cutting unit includes at least one die-cutting cylinder and at least one anvil cylinder. The die-cutting cylinder is arranged in a die-cutting position for die-cutting, and the at least one die-cutting cylinder is exchangeable for at least one other die-cutting cylinder by means of the device for changing the die-cutting cylinder. A shortest straight connecting line between the axis of rotation of the die-cutting cylinder in the die-cutting position and the axis of rotation of the die-cutting cylinder in the move-out position is inclined less than 30
(Continued)

degrees with respect to a horizontal plane. Further, a shortest straight connecting line between the axis of rotation of the die-cutting cylinder in the move-out position and a maintenance position is inclined less than 30 degrees with respect to a vertical direction.

20 Claims, 21 Drawing Sheets

(58) Field of Classification Search
CPC .... Y10T 83/4838; Y10T 83/8748; B41F 9/18; B41F 13/34; B41F 19/008; B41P 2213/80
See application file for complete search history.

(56) References Cited

U.S. PATENT DOCUMENTS

| | | | | |
|---|---|---|---|---|
| 7,175,578 | B2 * | 2/2007 | Elkis | B26D 7/265 83/346 |
| 9,802,330 | B2 * | 10/2017 | Hoover | B26F 1/384 |
| 2001/0037739 | A1 | 11/2001 | Schroeder | |
| 2005/0103173 | A1 | 5/2005 | Elkis et al. | |

FOREIGN PATENT DOCUMENTS

| | | | |
|---|---|---|---|
| DE | 202012100708 | U1 | 4/2012 |
| DE | 102014205880 | B3 | 7/2015 |
| DE | 202021104224 | U1 | 10/2021 |
| GB | 2406069 | A | 3/2005 |
| JP | 58-168565 | A | 10/1983 |
| WO | 98/50235 | A2 | 11/1998 |
| WO | 01/87605 | A1 | 11/2001 |
| WO | 2011/015478 | A1 | 2/2011 |
| WO | 2013/041455 | A1 | 3/2013 |

* cited by examiner

DIE-CUTTING UNIT COMPRISING A DEVICE FOR CHANGING A DIE-CUTTING CYLINDER AND METHOD FOR CHANGING A DIE-CUTTING CYLINDER

CROSS-REFERENCES TO RELATED APPLICATIONS

This application is the US national phase, under 35 USC § 371, of PCT/EP2022/083827, filed on Nov. 30, 2022, published as WO 2023/099552 A1 on Jun. 8, 2023, and claiming priority to DE 10 2022 102 147.5 filed Jan. 31, 2022; DE 10 2022 100 961.0 filed Jan. 17, 2022; and DE 10 2021 131 590.5 filed Dec. 1, 2021, and all of which are expressly incorporated by reference herein in their entireties.

TECHNICAL FIELD

Examples herein relate to a die-cutting unit comprising a device for changing a die-cutting cylinder, and to a method for changing a die-cutting cylinder. For instance, the die cutting unit includes the device for changing a die-cutting cylinder and further includes at least one die-cutting cylinder, having an axis of rotation, and at least one anvil cylinder. The device for changing the die-cutting cylinder includes at least one further die-cutting cylinder to replace the at least one die-cutting cylinder. One of the die-cutting cylinders is arrangeable in a die-cutting position, and one of the die-cutting cylinders is arrangeable in a move-out position. The move-out position is spaced apart from the die-cutting position. Additionally, one of the die-cutting cylinders is arrangeable in a maintenance position for set-up and/or maintenance. The anvil cylinder is arrangeable in a working position and a backed-away position, and the anvil cylinder, in the backed-away position, is arranged in a vertical direction beneath the die-cutting position.

Additionally the method for changing the die-cutting cylinder of a die-cutting unit is performed on a die-cutting unit that includes at least one die-cutting cylinder and at least one anvil cylinder. The at least one die-cutting cylinder is exchangeable and/or is exchanged for at least one further die-cutting cylinder by means of a device for changing the die-cutting cylinder. The further die-cutting cylinder is located in a maintenance position for set-up and/or maintenance. In a working position, the anvil cylinder is arranged in the vertical direction beneath the die-cutting position of the die-cutting cylinder. The anvil cylinder is displaced from a working position into a backed-away position, and is displaced in a predominantly vertical direction into the backed-away position. The die-cutting cylinder, in a move-out step, is displaced from a die-cutting position into a move-out position.

BACKGROUND

When processing corrugated cardboard, a corrugated cardboard sheet undergoes several processing steps. The sheets are printed or coated, for example, and can be modified by shaping devices in terms of the mass and/or shape and/or contour thereof. Flexographic printing is a particularly suitable printing method. Flexographic printing is characterized by a plate cylinder comprising a flexible printing plate. For shaping, rotative processing methods, such as rotary die cutting, are frequently employed, given the speed advantages they offer.

Rotary die cutters usually comprise die-cutting units which include a die-cutting cylinder and an anvil cylinder.

For example, DE 10 2004 058 597 A1 shows a die cutter comprising two rotating processing rollers. Likewise, a die-cutting device comprising a continuously running die-cutting roller is disclosed by DE 20 2012 100 708 U1, which is driven by a synchronous motor.

Usually, a cutting die including die-cutting tools or blades is arranged on the die-cutting cylinder, which process the substrate during operation, while also making contact with the anvil cylinder. The anvil cylinders include elastic and resilient covers or die cutting blankets. During a job change, the cutting dies have to be replaced. So as to return the rotary die cutter into an operational state quickly, changing devices for die-cutting cylinders are used.

A changing device for a die-cutting cylinder is known from U.S. Pat. No. 6,138,544 A. The document describes the arrangement of the cylinders in this changing device as a planetary configuration since two die-cutting cylinders are arranged around one anvil cylinder. The cylinders are arranged on a disk, and the two die-cutting cylinders can be exchanged by rotating the disk.

Furthermore, GB 2 406 069 A also discloses a similar arrangement of the anvil cylinders and die-cutting cylinders. The two die-cutting cylinders are arranged so as to be rotatable about an axis of rotation and can be replaced by rotation.

Furthermore, DE 10 2014 205 880 B3 discloses a die-cutting device comprising means for changing die-cutting cylinders. The tool change is to take place more quickly. For this purpose, the die-cutting device comprises two holders for receiving die-cutting cylinders. The anvil cylinder can be set against both die-cutting cylinders. For this purpose, the anvil cylinder is backed away from one die-cutting cylinder and set against the other.

US 2005/0103173 A1 and U.S. Pat. No. 7,175,578 B2 show another option for exchanging die-cutting cylinders. Two die-cutting cylinders are displaced by means of linear guides. In the process, a die-cutting cylinder can be moved out of a maintenance position in the horizontal direction. The die-cutting cylinder to be changed and the anvil cylinder are displaced from a vertical position in such a way that the two die-cutting cylinders are located on one plane in the vertical direction. Thereafter, both die-cutting cylinders are horizontally displaced. The new die-cutting cylinder then assumes the position of the previous cylinder.

Furthermore, cylinder changing devices in printing machines are known. For example, a device for changing a plate cylinder in a rotary printing machine, and in particular a gravure printing machine, is known from WO 98/50235 A2. A cylinder can be changed very easily through the use of a steady rest mount. A plate cylinder can be lifted out of the side frame by way of a carriage and moved toward a lift. There, the plate cylinder can then be displaced. The lift is displaced so as to bring a new plate cylinder close, and the new plate cylinder is thereafter guided to the mount.

When plate cylinders are being changed, or for the purpose of a relative rotation with respect to one another, the plate cylinders can be decoupled from the drive thereof. For example, WO 01/87605 A1 discloses such a coupling of a plate cylinder to a corresponding drive in a printing machine. In this document, the motor is displaced as a whole for coupling and/or decoupling. The motor is displaced by way of a threaded spindle.

DE 10 2009 028 208 A1 as well as WO 2011/015478 A1 disclose printing machines comprising exchangeable cylinders of a printing mechanism. A plate cylinder and/or a transfer cylinder can be decoupled from a drive and be exchanged. Via a device, the cylinders can be arranged in various positions. Amongst others, an exchange of the cylinders is simplified in this way, while an installation of cylinders of differing sizes is also made possible.

WO 2013/041 455 A1 also discloses the cylinder exchange in a rotary printing machine. The cylinder is removed from the bearing seats thereof by means of a handling device and transferred into a supply position in a receiving unit of one movable storage device of two movable storage devices which is arranged in a transfer position. The movable storage devices can be moved along a guide system with a component in a vertical direction and with a component in an axial direction, which is parallel to the axis of rotation of the cylinder.

A printing mechanism of a rotogravure web-fed printing machine is disclosed by US 2001/0037739 A1. The printing mechanism comprises a printing cylinder that is dipped into an ink trough and the shaft journals of which can be supported on support devices, designed as supporting roll, for changing the printing cylinder. Each support device is arranged on a respective horizontally movable carrier that is provided with a drive, via which the support devices can be displaced between the bearings of the printing cylinder and an extended position in which a device that lifts out and inserts the printing cylinder is provided.

JP S58-168565 A discloses a device for replacing a plate cylinder of a printing mechanism. So as to replace a plate cylinder with a new cylinder after the printing operation has been completed, the plate cylinder is released from the mount thereof by means of a pivoting arm. The pivoting arm is subsequently held horizontally, and the plate cylinder is moved along the pivoting arm into a holding position at the end of the arm. A plate cylinder to be brought in is placed onto the pivoting arm in a middle position and transported into the position for carrying out the printing operation.

Vertically adjustable transport devices are, for example, also provided in processing machines. One example is shown in DE 41 00 458 A1, which discloses a panel feed device for panel dividing saws. A transfer table is interposed between a lifting table and a panel delivery table, which can be vertically displaced by predetermined increments on a guide frame in a computer-controlled manner.

An equipment component having a transfer and alignment function is known from DE 20 2021 104 224 U1, for example, wherein an alignment unit comprises sliding rails for adjusting a lateral relative position, and wherein a carrier unit is designed so as to be height-adjustable.

SUMMARY

It is an object of some examples herein to provide a die-cutting unit comprising a device for changing a die-cutting cylinder and a method for changing a die-cutting cylinder.

The object is achieved according to some examples by the above-described die-cutting unit in which a shortest straight connecting line between the axis of rotation of the die-cutting cylinder in the die-cutting position and the axis of rotation of the die-cutting cylinder in the move-out position is inclined less than 30 degrees with respect to a horizontal plane. Further, a shortest straight connecting line between the axis of rotation of the die-cutting cylinder in the move-out position and a maintenance position is inclined less than 30 degrees with respect to a vertical direction.

The object is further achieved according to some examples by the above-described method in which the die-cutting cylinder is displaced predominantly horizontally from the die-cutting position to the move-out position. A shortest straight connecting line between the axis of rotation of the die-cutting cylinder in the die-cutting position and the axis of rotation of the die-cutting cylinder in the move-out position is inclined less than 30 degrees with respect to a horizontal plane. In addition, a shortest straight connecting line between the axis of rotation of the die-cutting cylinder in the move-out position and the maintenance position is inclined less than 30 degrees with respect to a vertical direction.

The advantages to be achieved with the invention are, in particular, that an improved die-cutting unit was created. In particular, an improved processing machine comprising the at least one die-cutting unit was created.

The die-cutting unit comprises at least one die-cutting cylinder, in particular having an axis of rotation, and at least one anvil cylinder. A device for changing comprises at least one further die-cutting cylinder to replace the at least one die-cutting cylinder. One of the die-cutting cylinders can be arranged and/or is arranged in a die-cutting position. The anvil cylinder can be arranged and/or is arranged in a working position and/or in a backed-away position.

The die-cutting cylinder is preferably changed by the device for changing in a simple manner. In a preferred embodiment, this is achieved in that the die-cutting cylinder can be removed predominantly horizontally from a die-cutting position and/or change-out position in a particularly simple manner. A straight connecting line between the positions of the cylinders is then inclined less than 30° with respect to a horizontal.

The die-cutting cylinder can preferably be changed in an improved manner by a device for changing. Additionally, the device for changing makes it possible to preset a die-cutting cylinder. As a result of presetting, in particular the complex changing process of a die-cutting form can already take place while a die-cutting process is ongoing. By using the device for changing, a further die-cutting cylinder can be preset while one die-cutting cylinder is being operated. During job changes, the new cutting die has then already been applied to the new cutting cylinder, so that this cylinder can then be moved quickly and fully automatically to the die-cutting position. The design of the device for changing ensures a high degree of automation with increased safety. Furthermore, the design of the device for changing avoids additional costs by having a simple configuration and saves superfluous components.

Additionally, the die-cutting cylinder can be changed fully automatically by way of the device for changing. Inline in a sheet processing machine comprising application units, such as printing or varnishing units, the sheet processing machine achieves greater efficiency in terms of the time that is required for a job change and/or in terms of the processing speed. The application units also, for example, comprise devices for changing the cylinders of the application units in a simplified manner. In this way, a fully automatic device for changing, which is integrated inline, can contribute to a considerably more efficient operation of the machine as a whole. In particular the complex changing of a cutting die can thus already be carried out in the processing machine while a current die-cutting process is still in progress. During job changes, the new cutting die has then already been applied to the die-cutting cylinder, so that the die-cutting cylinder can then be moved quickly and fully automatically to the die-cutting position. The design of the device for changing advantageously ensures a high degree of automation having high safety, and avoids additional costs due to a simple configuration and by saving duplicate components.

In a preferred embodiment, not only the die-cutting tools, but also the application cylinders have to be changed in the processing machine during a job change. In a preferred configuration, the processing machine comprises redundant application units, i.e., more application units than are required for a normal application job. By combining redundant application units with the device for changing the die-cutting cylinders, a job change can be carried out significantly faster. The application units are preferably designed in such a way that these units can be set against and/or backed away from cylinders quickly and fully automatically. The combination of the device for changing the die-cutting cylinders and the redundant application units makes it possible to preset both processing steps, and considerably reduces the time until the next application job. However, the use of an increased number of application units is not just limited to these being utilized for presetting. They can also be utilized for carrying out special orders, for example. In this way, for example, an increased number of colors, in particular special colors, can be applied.

In a preferred embodiment, the die-cutting unit comprises a device for locking the die-cutting cylinder in the die-cutting position. In this way, the die-cutting cylinder can be held in the die-cutting position in a simple and secure manner and can likewise be released in a simple manner. The die-cutting cylinder is preferably pushed, preferably from beneath, against a frame and/or an element fixed to the frame and/or a housing so as to point away from the processing point, preferably perpendicularly. During die-cutting, the die-cutting cylinder experiences stresses from the processing point. These stresses arise, for example, from the die-cutting cylinder cyclically pushing and/or striking against the anvil cylinder and/or the substrate. Since the die-cutting cylinder is pushed against the frame from the opposite side or from beneath, the strikes do not act on the locking mechanism of the die-cutting cylinder, but act on the solid frame. This results in improved force dissipation, along with reduced stress and decreased wear. The locking mechanism is connected to a drive, whereby the locking mechanism can be automatically actuated and raised. In this way, the locking mechanism can be released or fixed by way of a control system in a manner that is synchronized with the changing process of the die-cutting cylinders.

In a preferred embodiment, the mounts as well as the bearing seats are arranged so as to be attached to the die-cutting cylinders. In this way, the die-cutting cylinder can be removed more easily. As a result, the die-cutting cylinder does not first have to be removed from the bearings in the axial direction before being changed.

The die-cutting unit preferably comprises a drive for driving the die-cutting cylinder. The drive comprises a motor having a rotor and a stator, which are arranged so as to be axially displaceable relative to one another. The drive thus operates various functions. The relative displaceability can be used, on the one hand, for adjusting the lateral register and, on the other hand, for releasing and/or removing a die-cutting cylinder from a coupling so that the die-cutting cylinder can be changed in a simple manner. In particular, the die-cutting cylinder can thus be removed horizontally from the die-cutting position thereof in a simple manner. This becomes possible since the motor is designed as a synchronous motor having a permanently excited magnetic field on the rotor. For this purpose, the rotor comprises at least one permanent magnet. In this configuration, the rotor can be displaced relative to the stator in a simple manner.

In terms of the design, being able to only displace the rotor yields the advantage that the drive can be fixedly mounted to a housing carrier, and additional linear guides, on which the entire drive is moved, can be dispensed with. As a result, it must only be ensured that the rotor can be axially displaced. This is preferably carried out by way of a plain bearing.

In a preferred embodiment, the rotor can be displaced relative to the stator. Selectively, the rotor can be displaced together with the die-cutting cylinder, or without the die-cutting cylinder. When the rotor is displaced together with the die-cutting cylinder, the lateral register thereof can be adjusted. When displaced without the die-cutting cylinder, a coupling can be moved out of the way in such a way that the die-cutting cylinder can be changed in a simple manner. Furthermore, a coupling can also be brought in contact with the new die-cutting cylinder again in a simple manner after the cylinder has been changed.

In a preferred embodiment, the rotor and stator are displaced relative to one another by means of a servo drive. This enables an automatable displacement process. For this purpose, the servo drive is preferably connected to the rotor. The servo drive is preferably designed as a pneumatic and/or an electric and/or preferably an electromechanical drive. The electromechanical drive stands out with its durability and reduced complexity.

In a preferred embodiment, a coupling is arranged between the motor and the die-cutting cylinder. By releasing the coupling, the drive can be disconnected from the die-cutting cylinder. The coupling can preferably be released by means of a pressure medium. In this way, a sufficiently high force for releasing the coupling can be applied in a simple manner. The pressure medium can be supplied to the coupling through a borehole through the axis of the rotor. A rotary inlet is preferably employed for this purpose.

The centering of the rotor is preferably ensured by way of the mounting of the die-cutting cylinder, in particular in a hub of the die-cutting cylinder. The rotor is preferably centered by coupling the coupling. This has the advantage that an additional mount in the motor can be dispensed with. A spherical roller bearing enables corresponding mobility.

In another preferred embodiment, the die-cutting cylinder is decoupled from the drive thereof by means of a coupling for the changing process. This has the advantage that the die-cutting cylinder can be changed, and the drive remains in position. This not only saves an additional drive, but also considerably simplifies the sequence of motions of changing the die-cutting cylinder. The die-cutting unit and the device for changing can then have a simplified configuration and requires less space.

In a preferred embodiment, the coupling is actuated by way of a servo drive. For this purpose, the servo drive preferably displaces the entire drive of the die-cutting cylinder parallel to the axis of rotation, or only a part thereof. In addition to actuating the coupling, the servo drive can preferably be used to adapt the lateral register of the drive of the die-cutting cylinder. The drive is preferably designed as a torque motor having a rotating component, this being a rotor, and a rigid component, this being a stator. The servo drive then preferably only displaces one of the two components, preferably the rotor, in the axial direction, parallel to the axis of rotation of the die-cutting cylinder. In this embodiment, both functions can thus be implemented using only one servo drive.

In another preferred embodiment, the die-cutting cylinders are guided in guides by means of a groove. This considerably increases the safety of the changing process. The die-cutting cylinders thus remain in the guides, and shifting in the axial direction is prevented. As a result, the cylinder is prevented from detaching from the guides, and the safety is increased. A safe operation for an equipment operator is thus ensured at all times.

In a preferred embodiment, the cylinder journals of the cylinders, and in particular the cylinder journals of the at least one die-cutting cylinder, each have at least one hub. Such a hub preferably includes the groove for safely guiding the die-cutting cylinders in the guides. The hub furthermore comprises the mounts for mounting the die-cutting cylinders. The hub preferably has an adapted contact surface for fixing and/or releasing the die-cutting cylinders by means of the locking mechanism.

In a preferred embodiment, the die-cutting unit is designed in such a way that the at least one anvil cylinder is arranged and/or remains arranged in a working position or in a backed-away position during the exchange. The changing process can thus be simplified since only the die-cutting cylinders have to be moved. Furthermore, the changing process is expedited since the anvil cylinder can be returned quickly into the working position.

The device for changing die-cutting cylinders preferably comprises, preferably, two guides for this purpose. This small number of guides allows a cylinder to be changed with a particularly simple sequence of motions.

In a preferred embodiment, the device for changing furthermore has a waiting position for guiding the cylinders, and in particular the die-cutting cylinders, past one another. In this way, the complexity of changing the cylinder can thus be reduced to a minimum. For this purpose, the waiting position is preferably arranged outside a direct guide path between the die-cutting position and the maintenance position, and more preferably between the change-out position and the maintenance position.

In a preferred embodiment, the waiting position is arranged in the vertical direction slightly beneath or at the same height as or above the die-cutting position and/or the change-out position and/or the move-out position. In this way, the cylinders, and in particular the die-cutting cylinders, can be changed in a particularly simple manner and using a configuration having a simple design. By arranging the waiting position above the change-out position and/or the move-out position, in particular at a distance with respect to the move-out position, it is achieved that a die-cutting cylinder change takes place in a simple manner since both cylinders can be guided past one another in a particularly simple manner. For example, only a vertical guide has to be widened for this purpose. One cylinder, in particular die-cutting cylinder, can thus be temporarily stored in the waiting position, and the other cylinder, in particular die-cutting cylinder, can be guided past the same in a simple manner. Additional guides and further planes for arranging the cylinders can thus be dispensed with.

In a preferred embodiment, the maintenance position is situated on a considerably lower plane than the die-cutting position of the die-cutting cylinder. In this way, a cutting die can be changed or replaced in a particularly simple manner. The cutting die can then be changed conveniently, and without a lifting device. Likewise, the die-cutting cylinder is considerably more easily accessible in the maintenance position than in the die-cutting position. At the die-cutting position, a wide variety of devices, such as sensors, vacuum system, anvil cylinder and the like interfere with the process. For this purpose, it is particularly advantageous that the die-cutting cylinder, in this position, is spaced apart from other cylinders. For example, it is then also possible to move auxiliary devices close to the die-cutting cylinder in a simple manner.

In a preferred embodiment, the die-cutting unit comprises a device for locking the die-cutting cylinder in the die-cutting position. In this way, the die-cutting cylinder can be held in the die-cutting position in a simple and secure manner.

In another preferred embodiment, the die-cutting cylinders are transported on a transport system. In a preferred embodiment, only two transport elements are needed for changing a cylinder. This is preferably achieved through the use of a shared carrier comprising two holding spots for the cylinders. In addition, a horizontal transport element is provided. As a result of this arrangement, the entire cylinder change can be implemented using only two displaceable elements.

Another advantage to be achieved with the invention is that the die-cutting cylinder can be removed from the die-cutting position thereof in a particularly simple manner. In the process, the transport device, which guides the sheets to the processing point, can be displaced or raised in a simple manner by means of a displacement device. The die-cutting cylinder can then be removed, preferably horizontally, from the die-cutting position in a particularly simple manner. The transport device can be displaced in a simple manner as a function of the position of a die-cutting cylinder. This enables a simple sequence of motions during the cylinder change.

The displacement device preferably comprises a drive for displacing the transport device. The transport device can thus be displaced in an automated fashion and, if needed, be moved out of the way.

In a preferred embodiment, the displacement process of the transport device is, preferably mechanically and/or electrically, synchronized with the device for changing the die-cutting cylinders. In a particularly preferred embodiment, the displacement process is mechanically coupled to the device for changing the die-cutting cylinders via a contact surface of the transport device. The mechanical coupling results in a particularly simple and safe operation of the cylinder changing process. The mechanical coupling, in particular, ensures that the transport device is guided out of the guide path of the device for changing at the right time.

In a preferred embodiment, the displacement device has a particularly simple design for displacing the transport device. The transport device is preferably guided on a guide that is preferably designed as a guide rail, more preferably a linear guide, whereby simple and safe displacement or raising of the transport device is ensured. In the working position, the transport device preferably rests with the dead weight thereof against a stop. For the displacement of the at least one transport device, preferably of the transport devices, it is then only necessary to work against the dead weight of the transport device. The transport device can be raised upwardly in the vertical direction in a simple manner.

In a preferred embodiment, the guide, in which the transport device is guidably arranged, is designed as a guide that is shared with the device for changing. Preferably, a frame and/or housing, which is seated in the guide, is arranged at the transport device. The movement during the cylinder change is synchronized via a shared contact surface between the transport device or the frame and the device for changing. During the changing process of the die-cutting cylinders, a transport element and/or a carrier are preferably moved and displace the transport device or raise the transport device. This movement preferably only takes place in a guide, namely the vertical guide. This ensures that the cylinder, in particular die-cutting cylinder, can be easily removed from the die-cutting position, and furthermore the transport device is quickly returned to the correct position or the working position after the cylinder change. The return movement preferably takes place by lowering of the contact element of the displacement device. The transport device is preferably lowered again as a result of the dead weight thereof.

BRIEF DESCRIPTION OF THE DRAWINGS

Exemplary embodiments of the invention are illustrated in the drawings and will be described in greater detail below. The drawings show.

DETAILED DESCRIPTION

Figure 1:
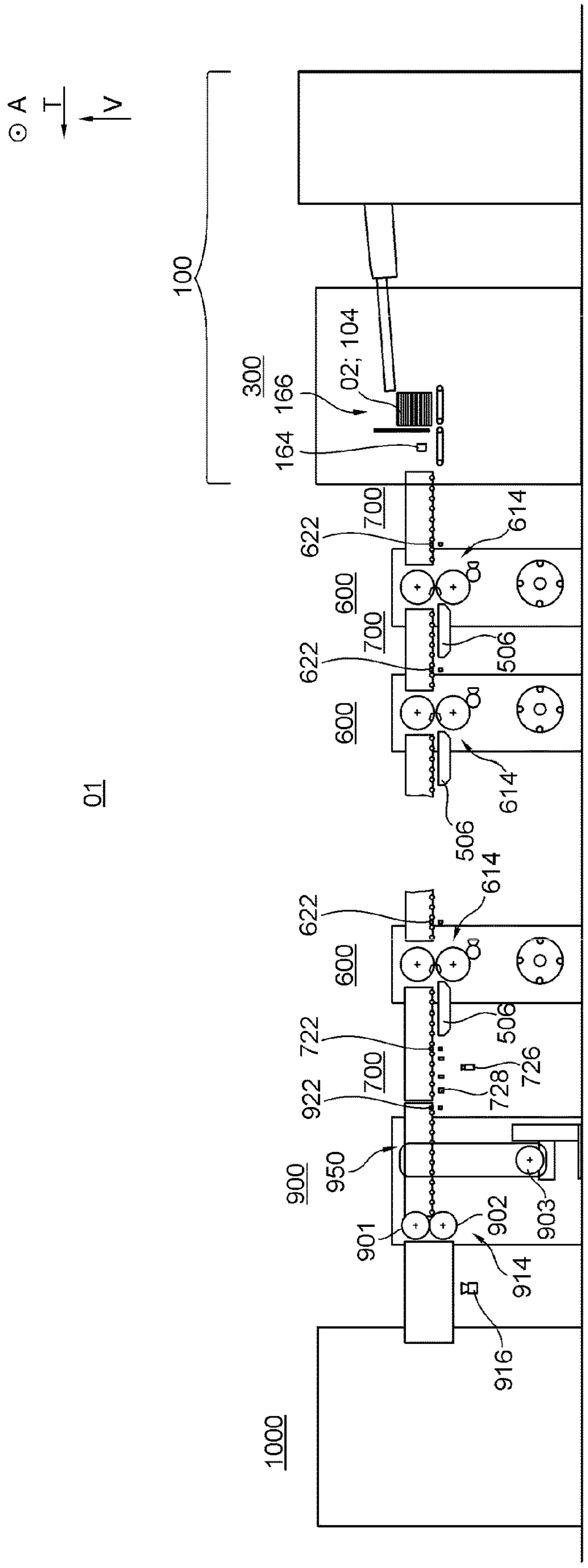
FIG. 1 a schematic illustration of a sheet processing machine comprising application mechanisms and a die-cutting unit.
Figure 2:
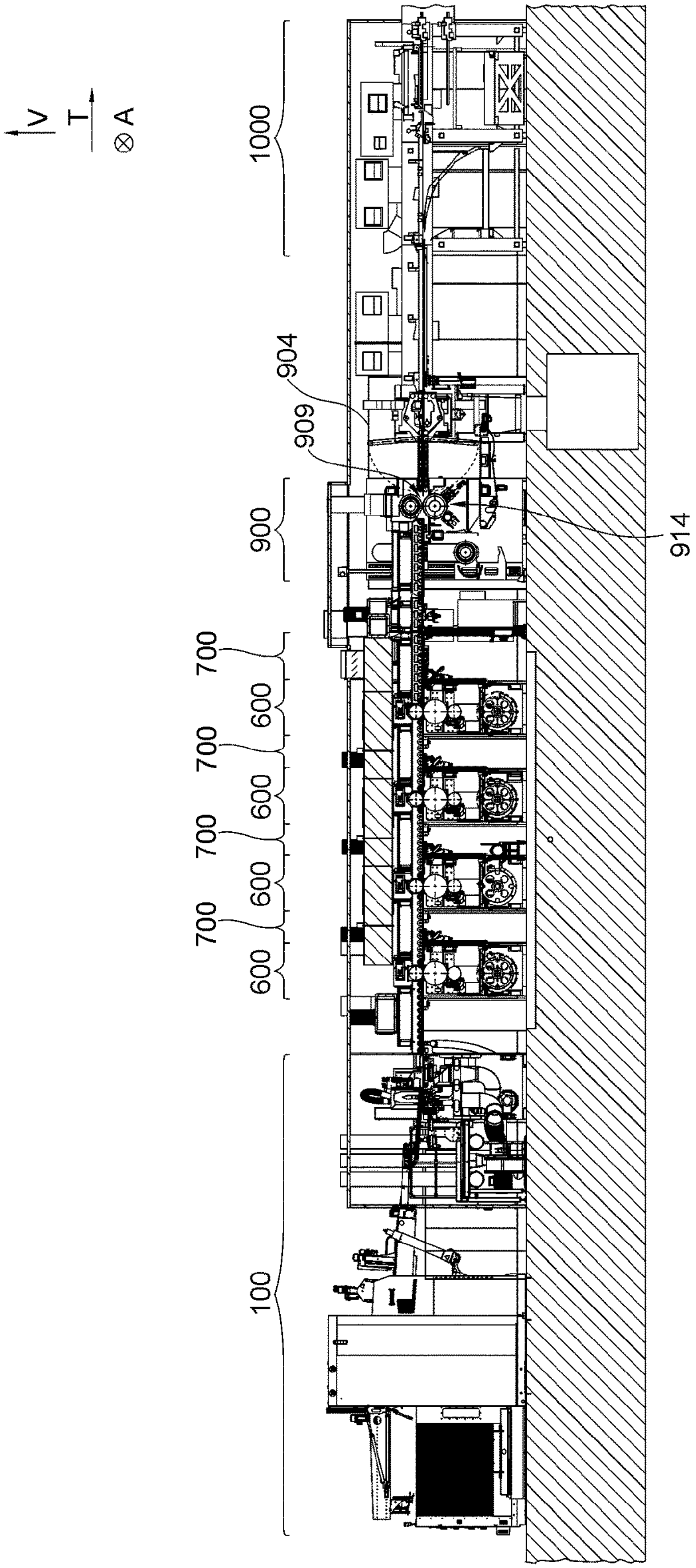
FIG. 2 a side view of a sheet processing machine in a preferred configuration, comprising four printing mechanisms and the die-cutting unit including a device for changing.
Figure 3:
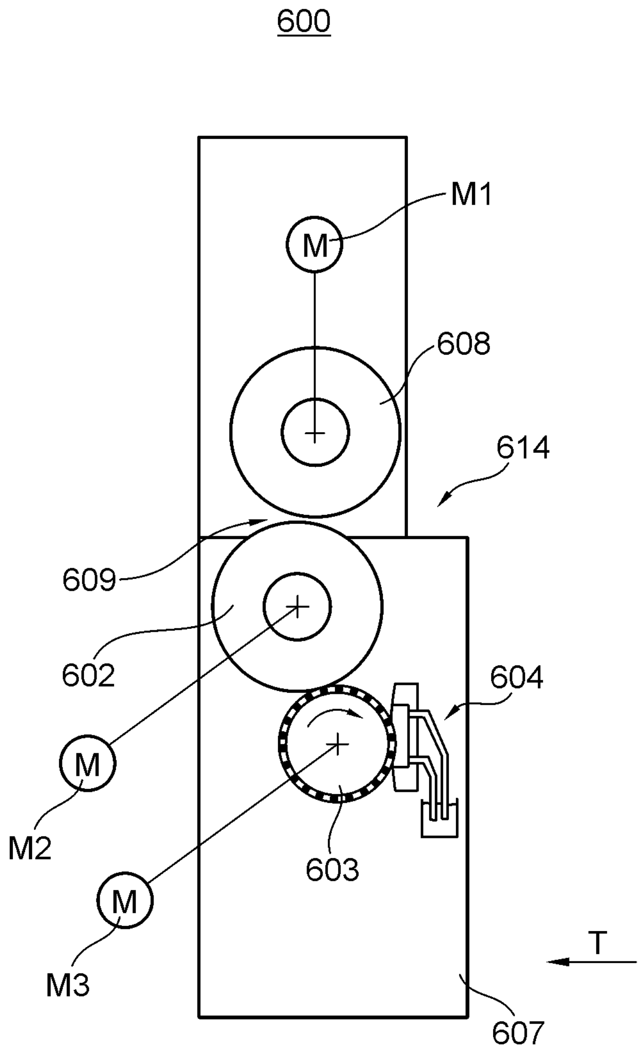
FIG. 3 a schematic illustration of an application mechanism with ink application from beneath.
Figure 4:
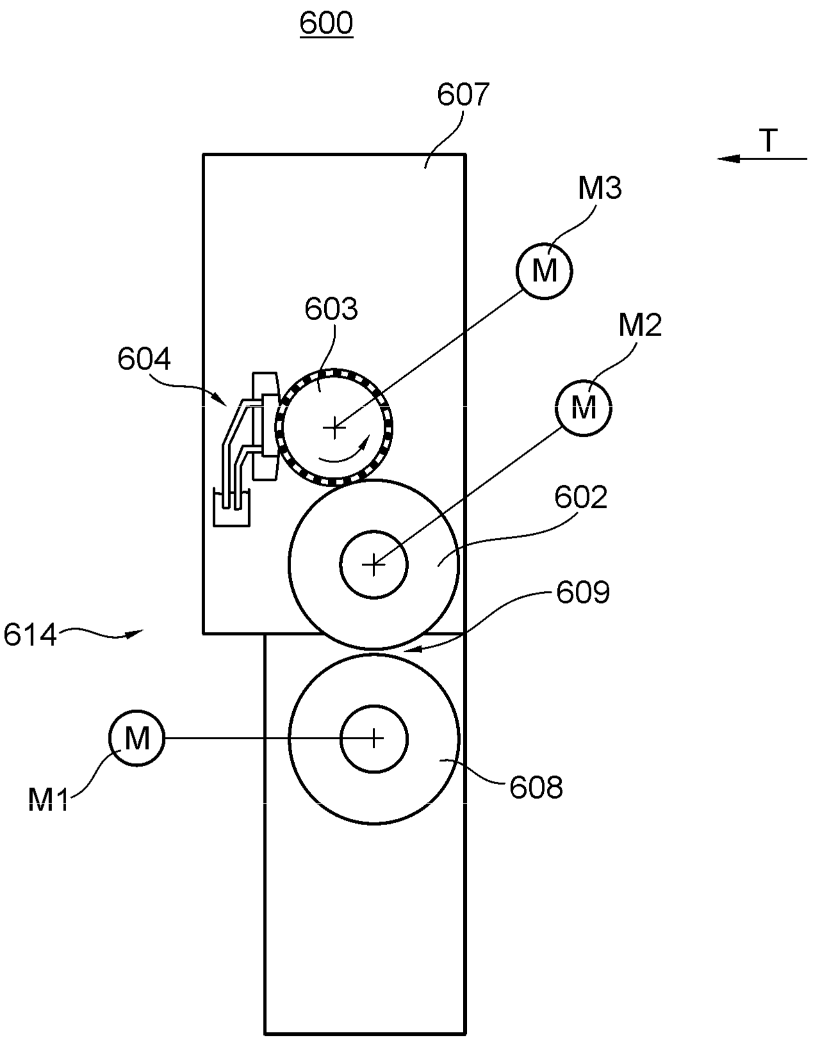
FIG. 4 a schematic illustration of an application mechanism with ink application from above.
Figure 5:
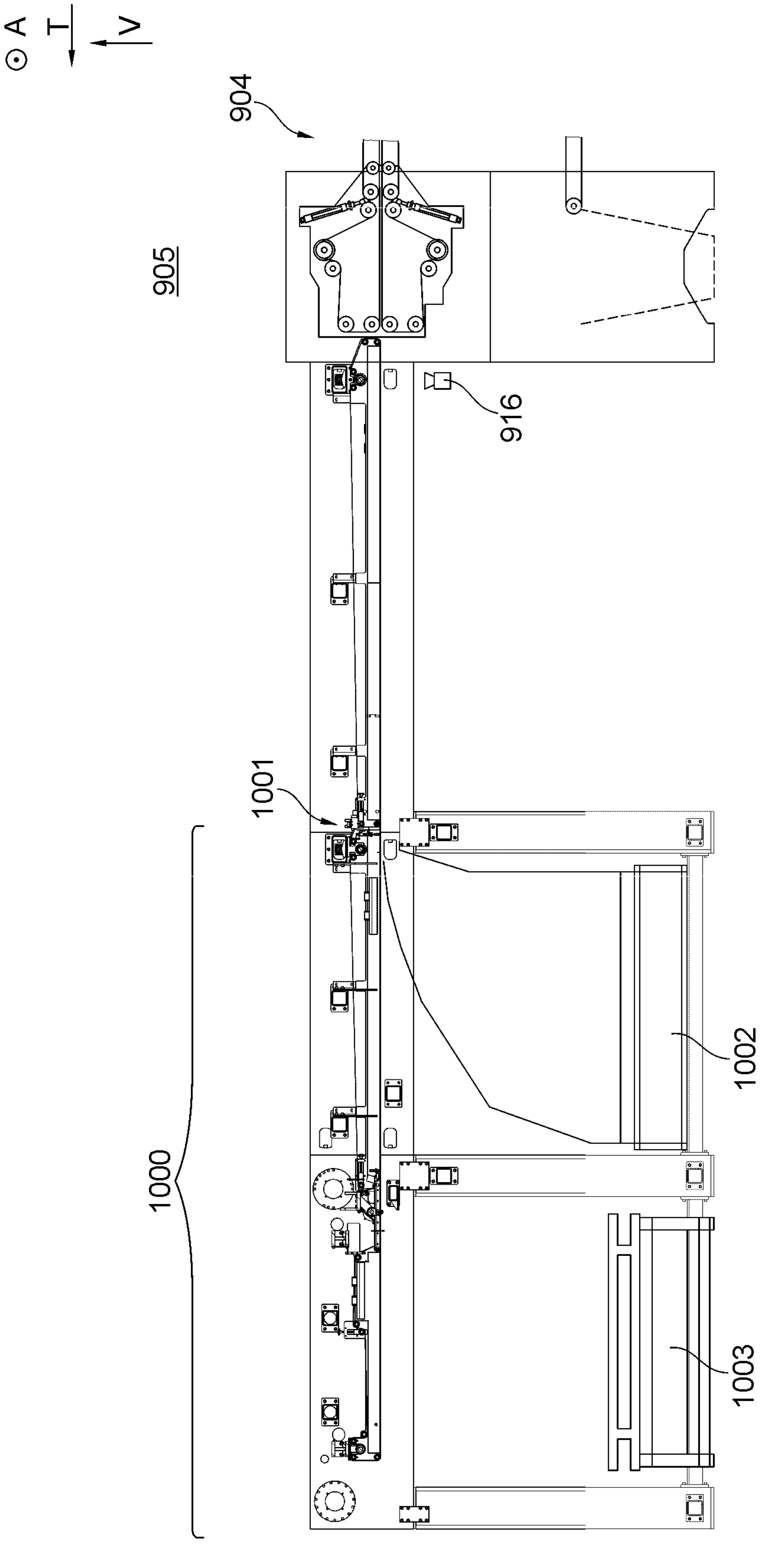
FIG. 5 a schematic illustration of the sheet delivery unit comprising a device for channeling out sheets.
Figure 6:
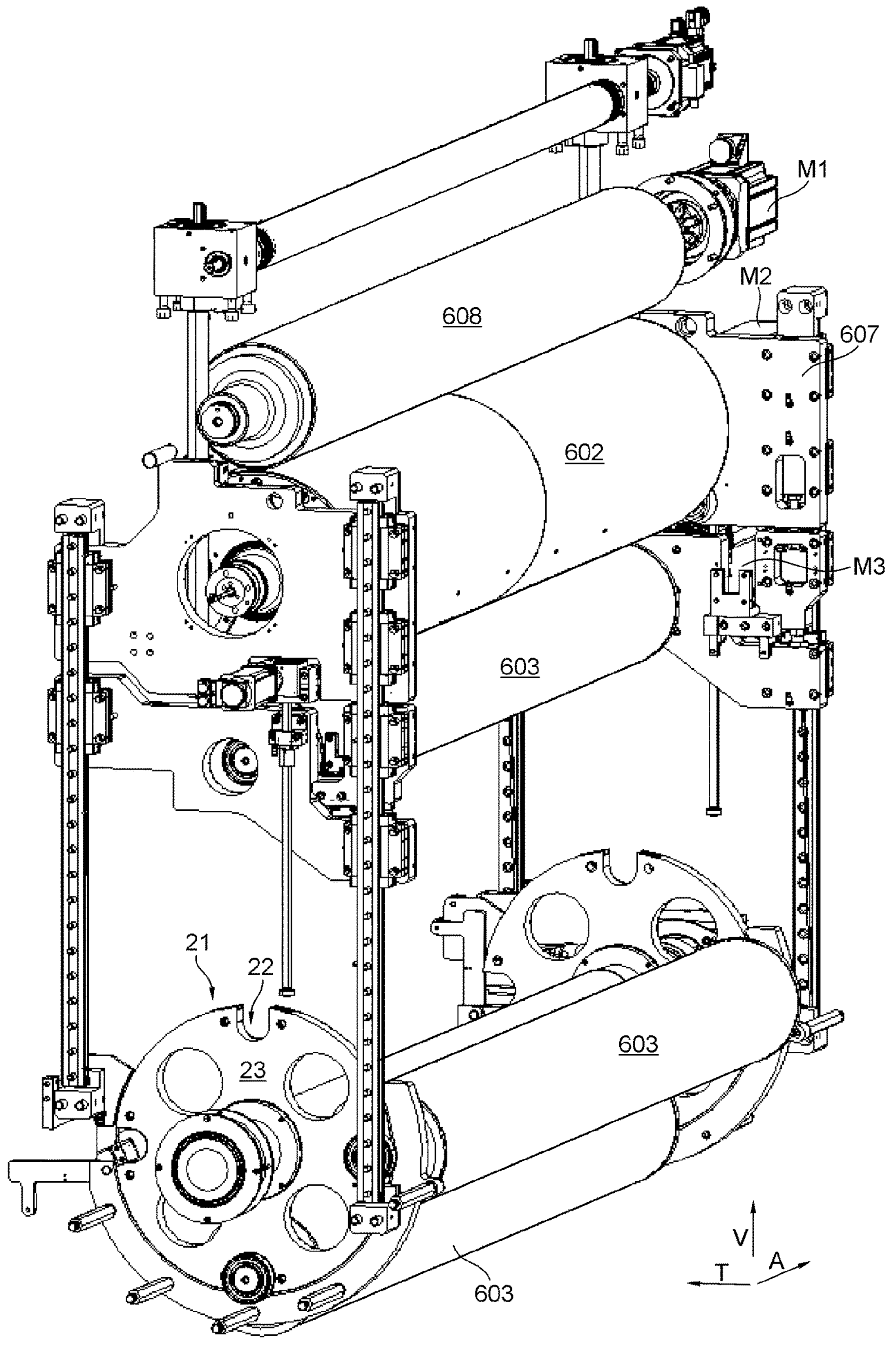
FIG. 6 a perspective illustration of an anilox roller changing device.
Figure 7:
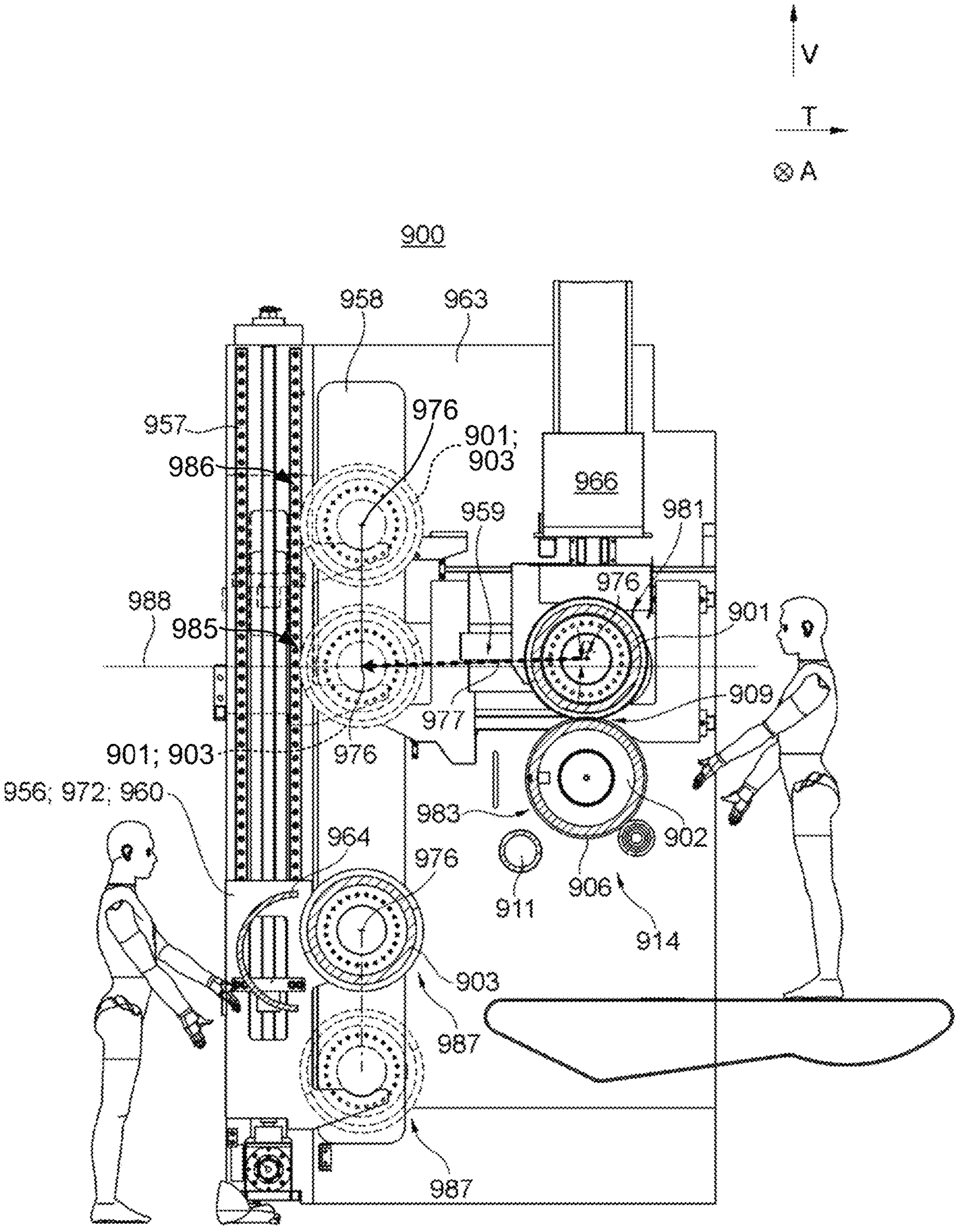
FIG. 7 a side view of the die-cutting unit comprising a die-cutting cylinder in the die-cutting position and the further die-cutting cylinder in the maintenance position, and the anvil cylinder in the working position.
Figure 8:
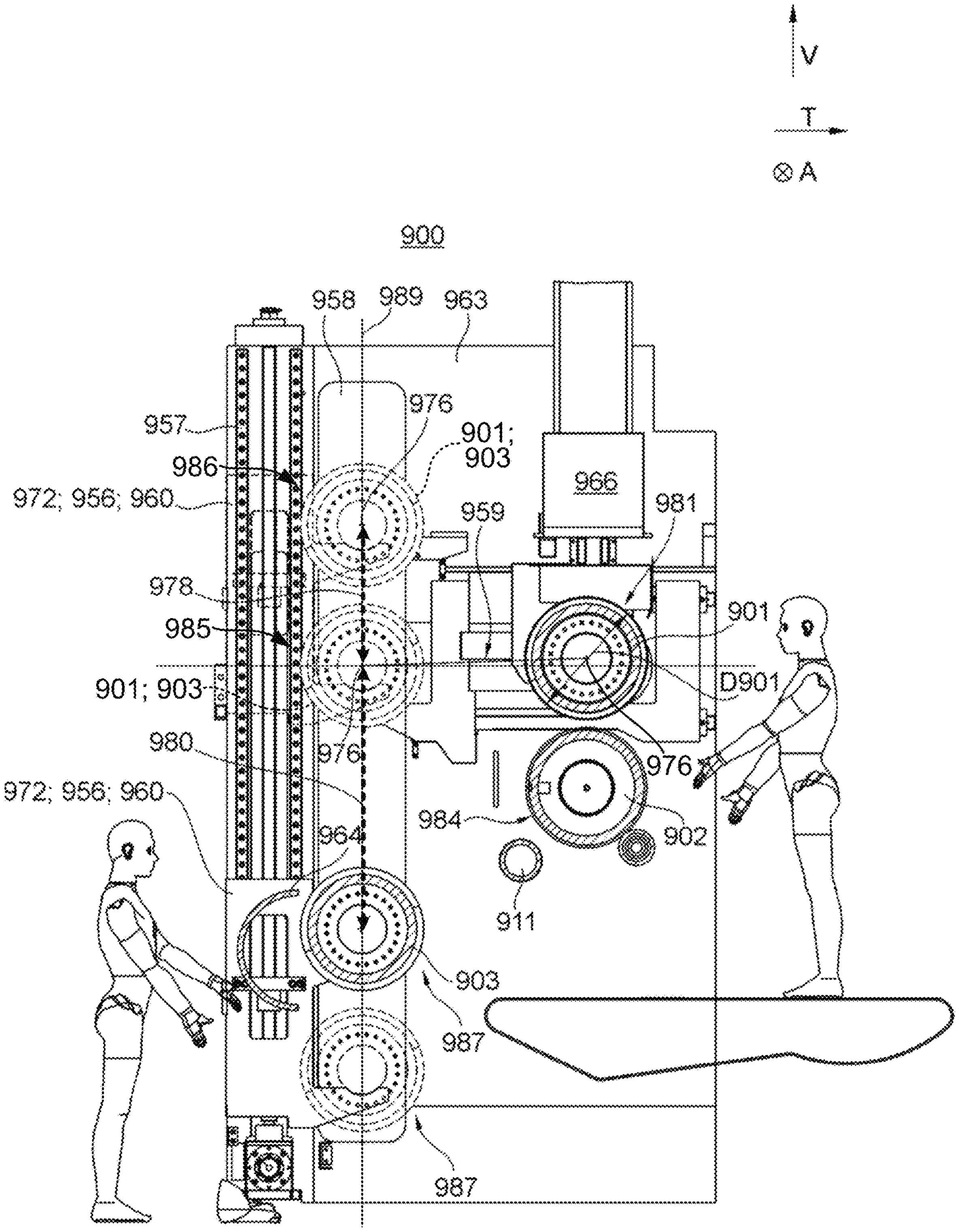
FIG. 8 a side view of the die-cutting unit comprising a die-cutting cylinder in the die-cutting position and the further die-cutting cylinder in the maintenance position, and the anvil cylinder in the backed-away position.
Figure 9:
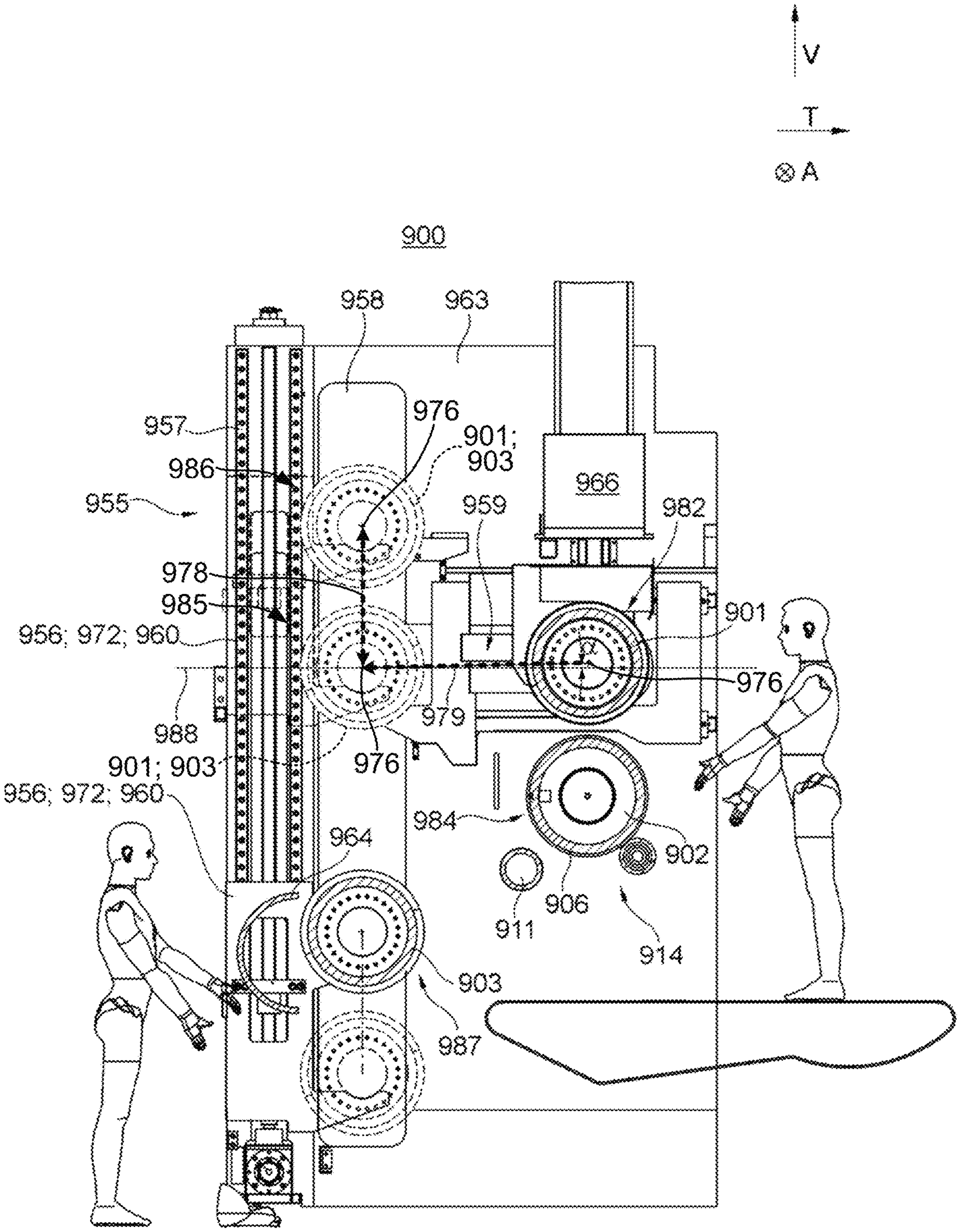
FIG. 9 a side view of the die-cutting unit comprising a die-cutting cylinder in the change-out position and the further die-cutting cylinder in the maintenance position, and the anvil cylinder in the backed-away position.
Figure 10:
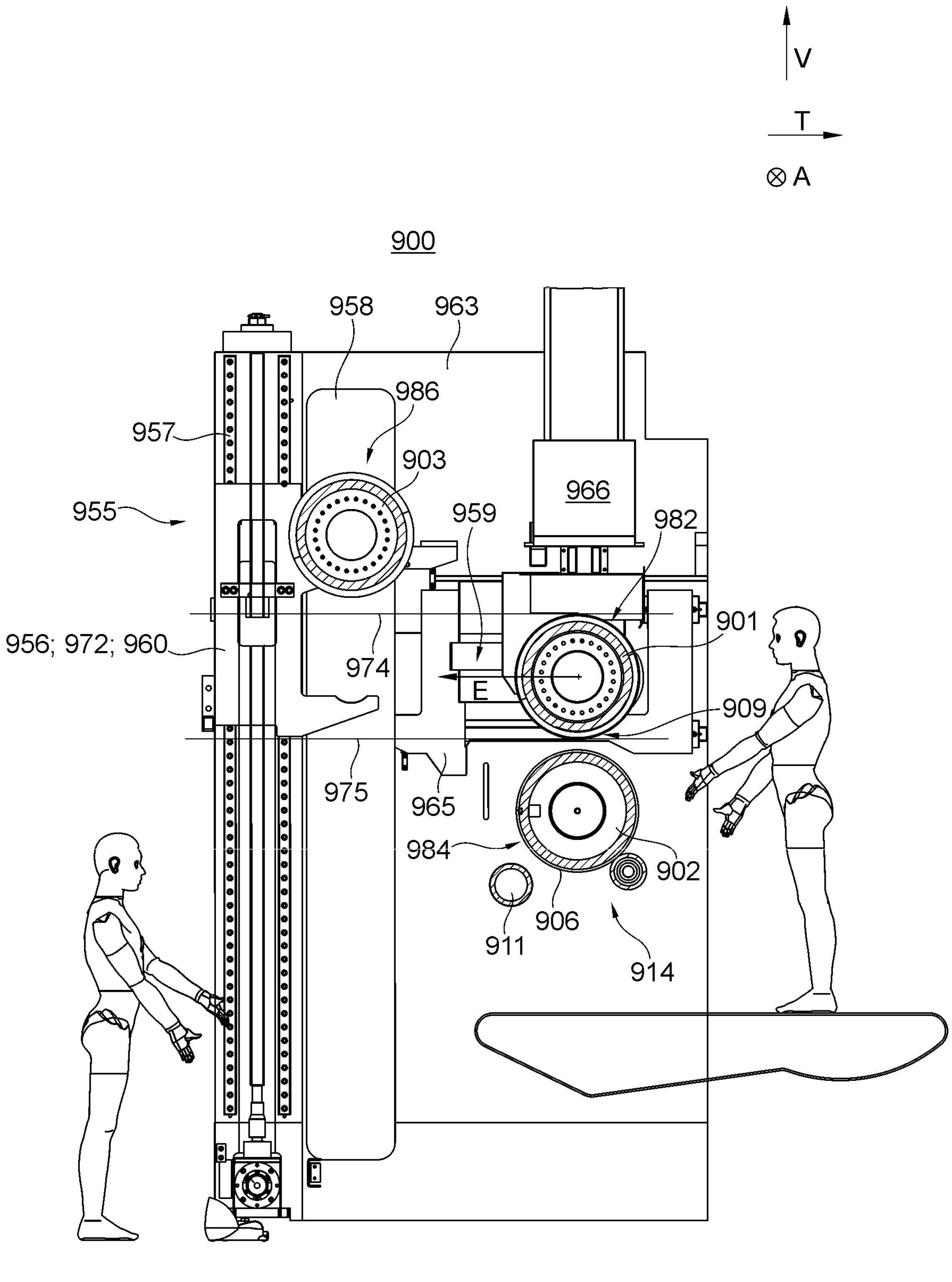
FIG. 10 a side view of the die-cutting unit comprising a die-cutting cylinder in the change-out position and the further die-cutting cylinder in the waiting position, and the anvil cylinder in the backed-away position.
Figure 11:
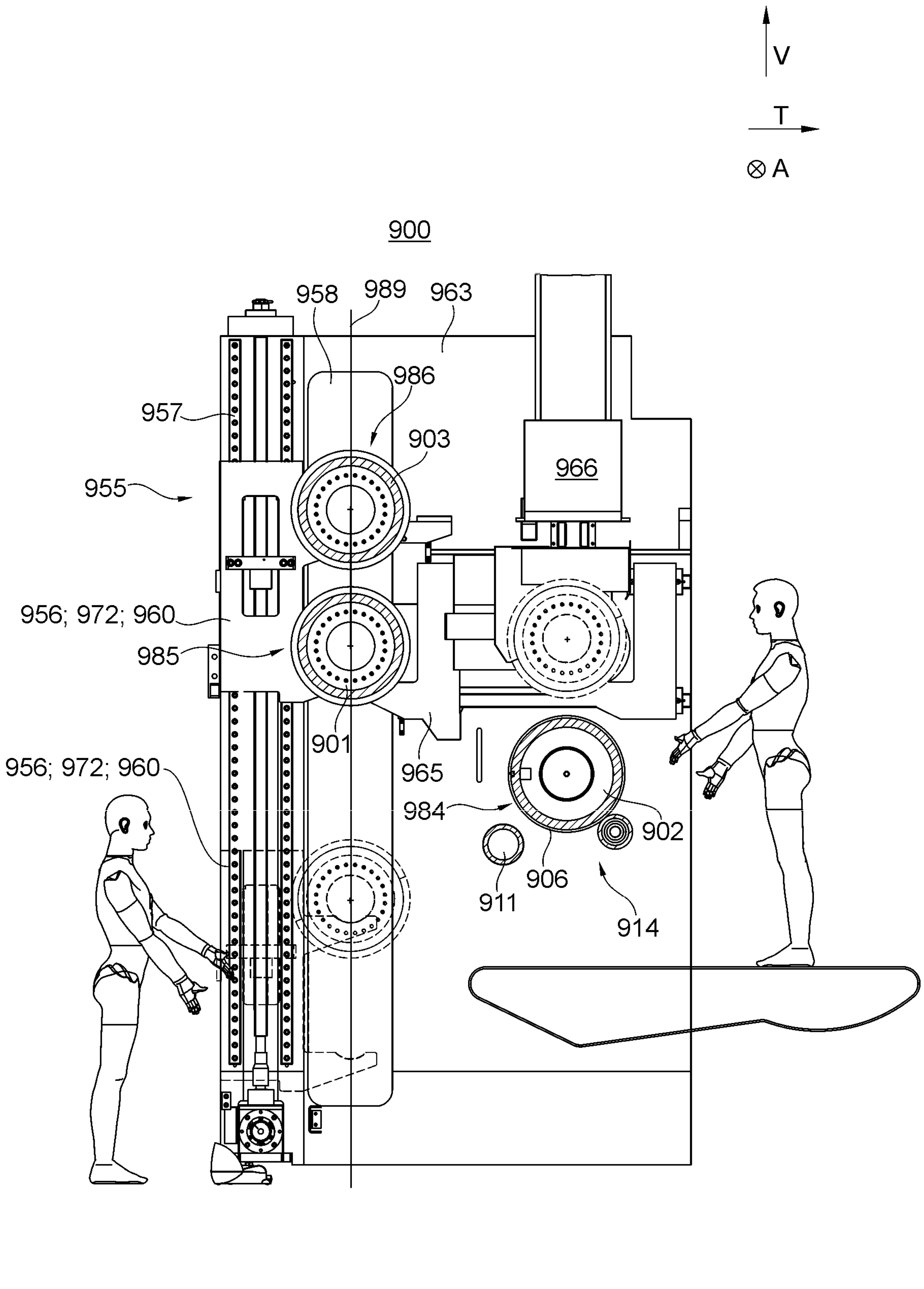
FIG. 11 a side view of the die-cutting unit comprising a die-cutting cylinder in the move-out position and the further die-cutting cylinder in the waiting position, and the anvil cylinder in the backed-away position.
Figure 12:
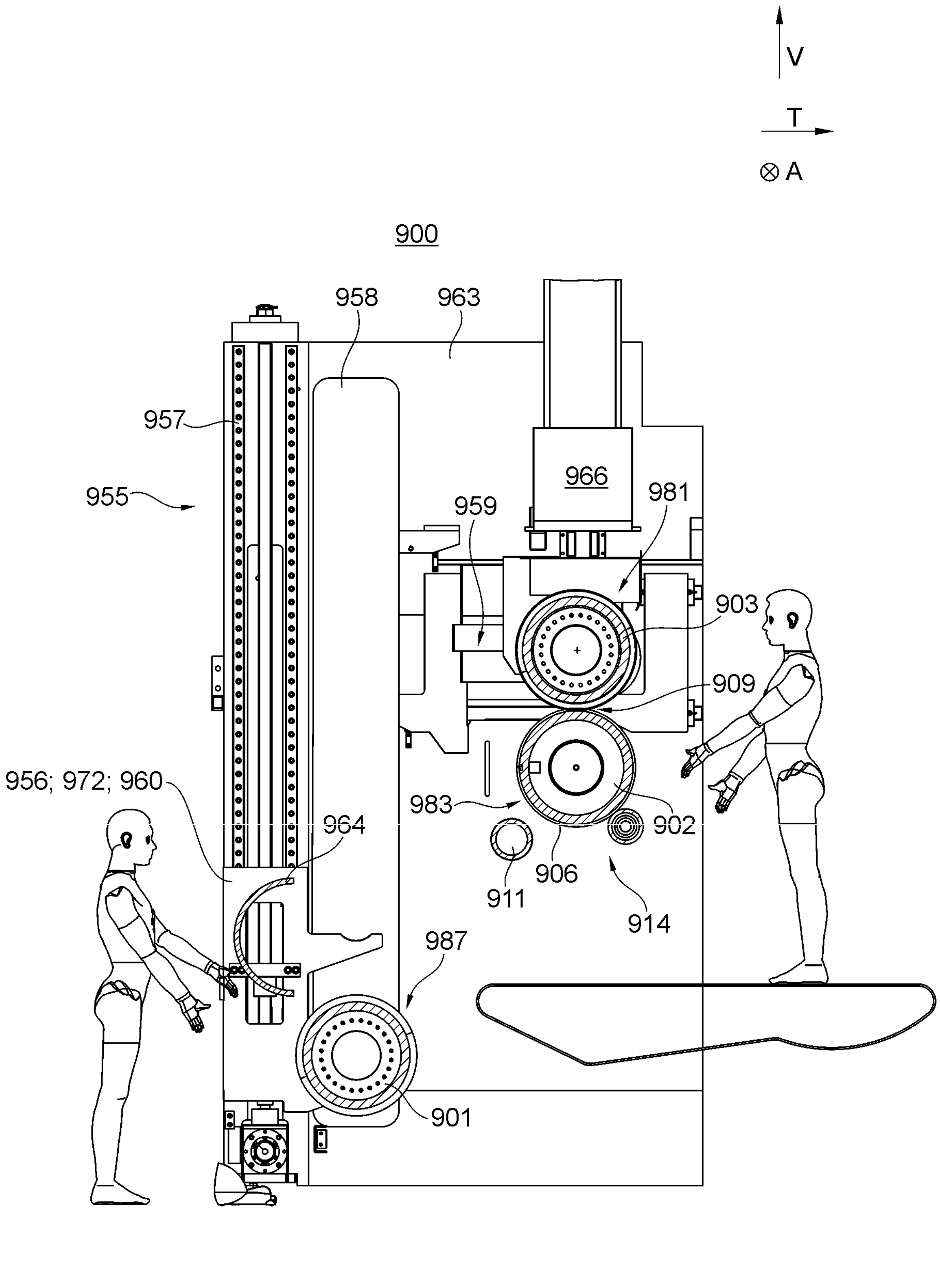
FIG. 12 a side view of the die-cutting unit comprising a die-cutting cylinder in the maintenance position and the further die-cutting cylinder in the die-cutting position, and the anvil cylinder in the working position.
Figure 13:
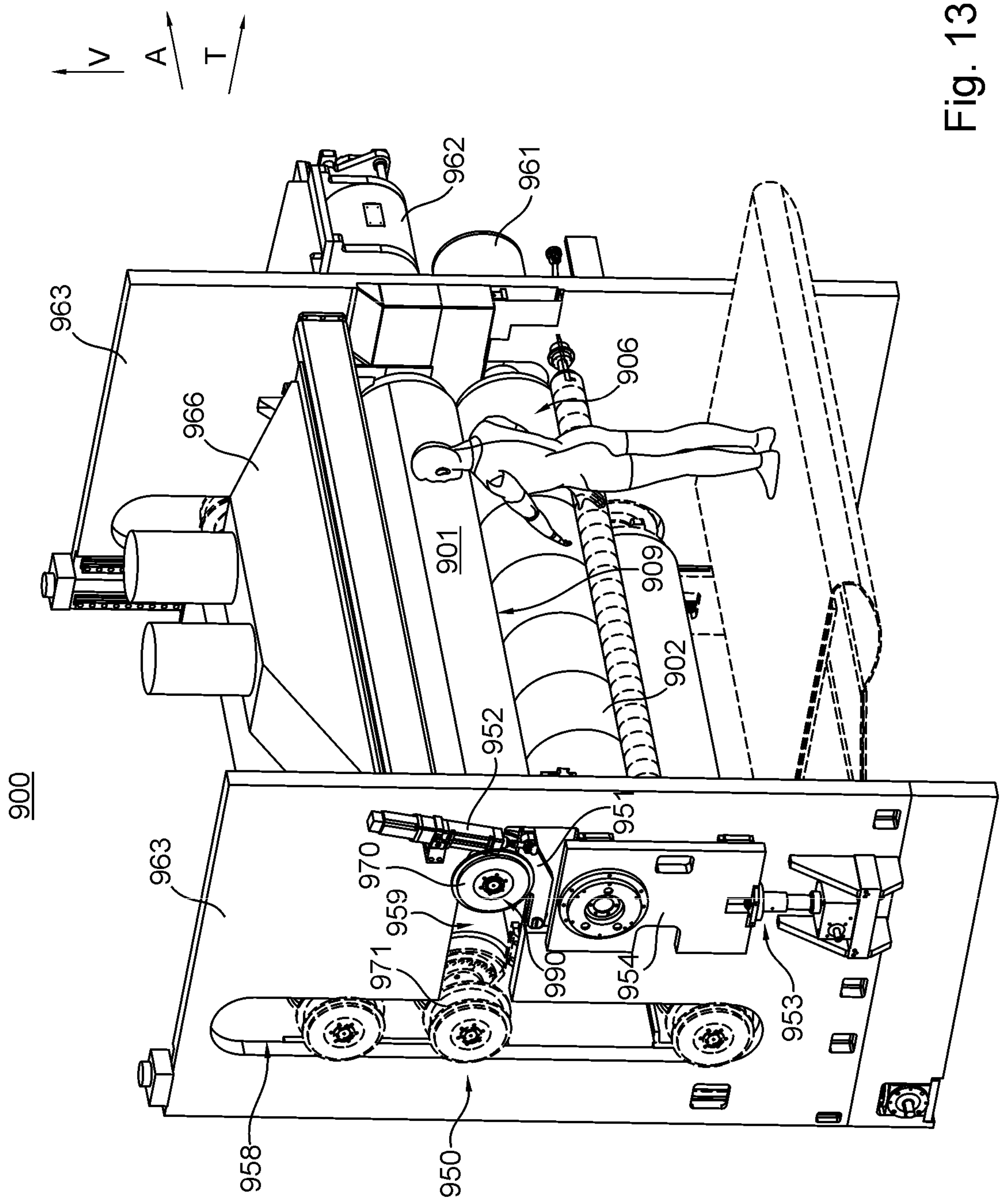
FIG. 13 a perspective illustration of the die-cutting unit.
Figure 14:
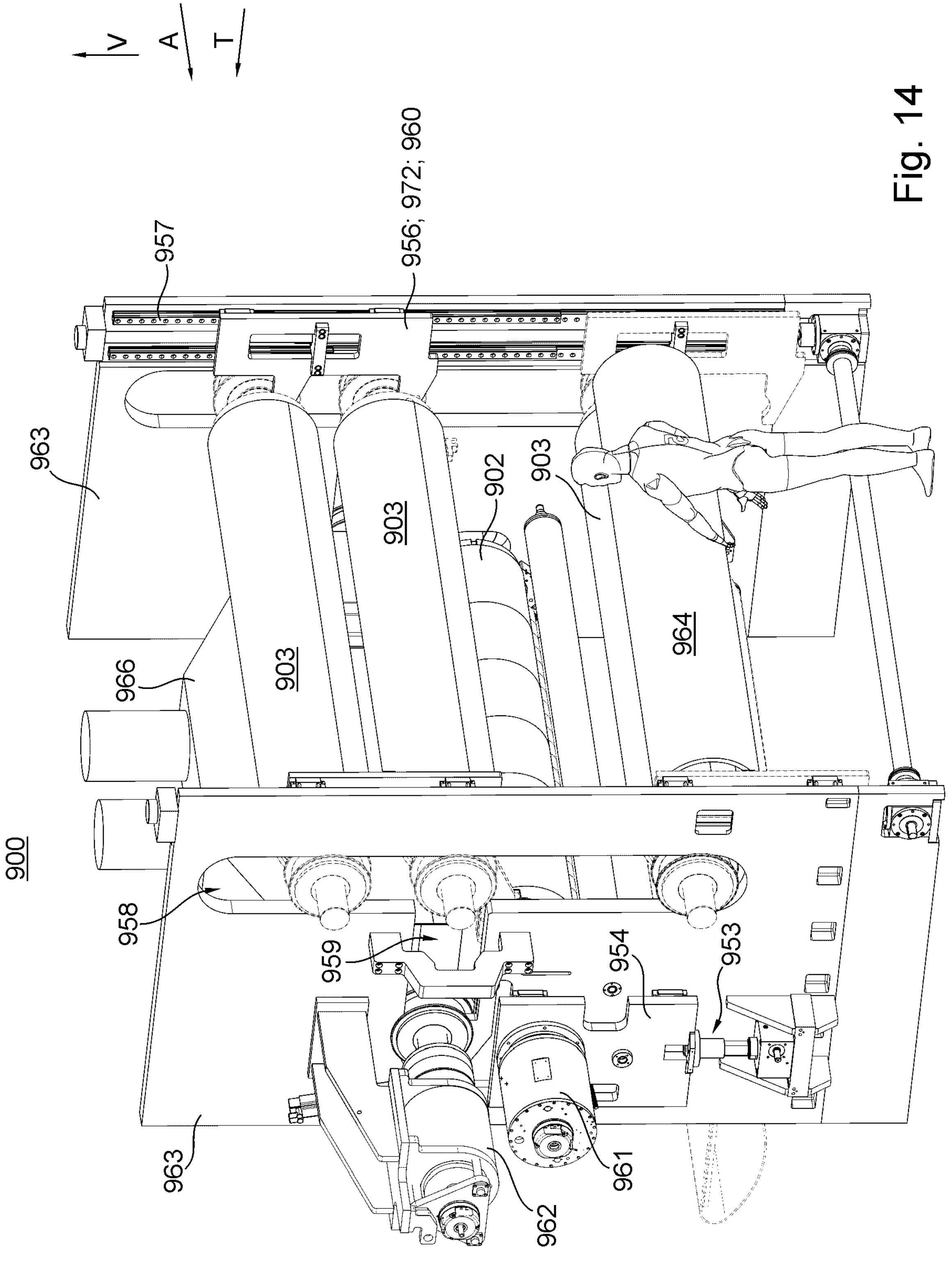
FIG. 14 another perspective illustration of the die-cutting unit, wherein further die-cutting cylinders, for illustrating the positions, are schematically arranged in the waiting position, the move-out position, and the maintenance position.
Figure 15:
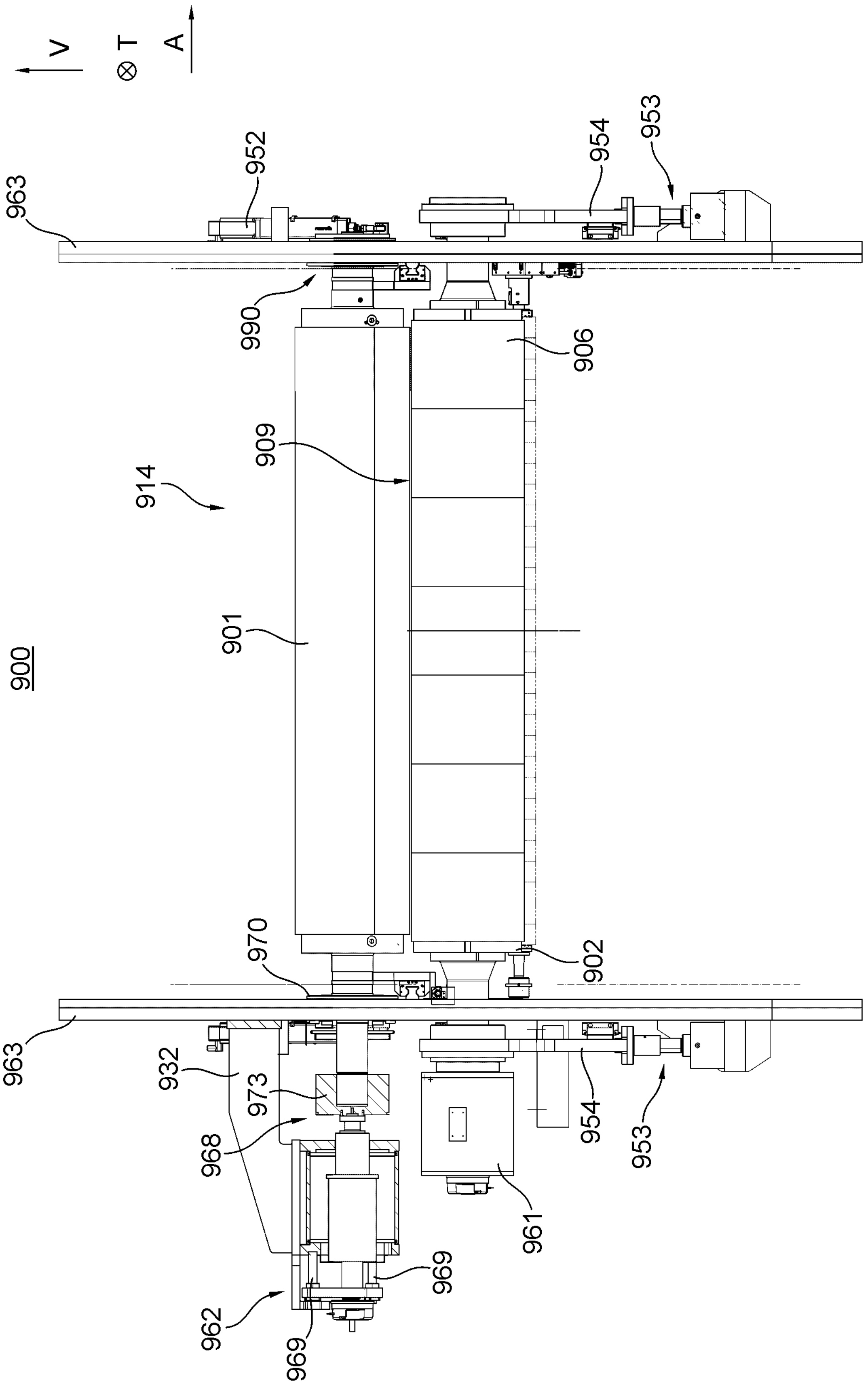
FIG. 15 a sectional illustration of the die-cutting unit comprising drives.
Figure 16:
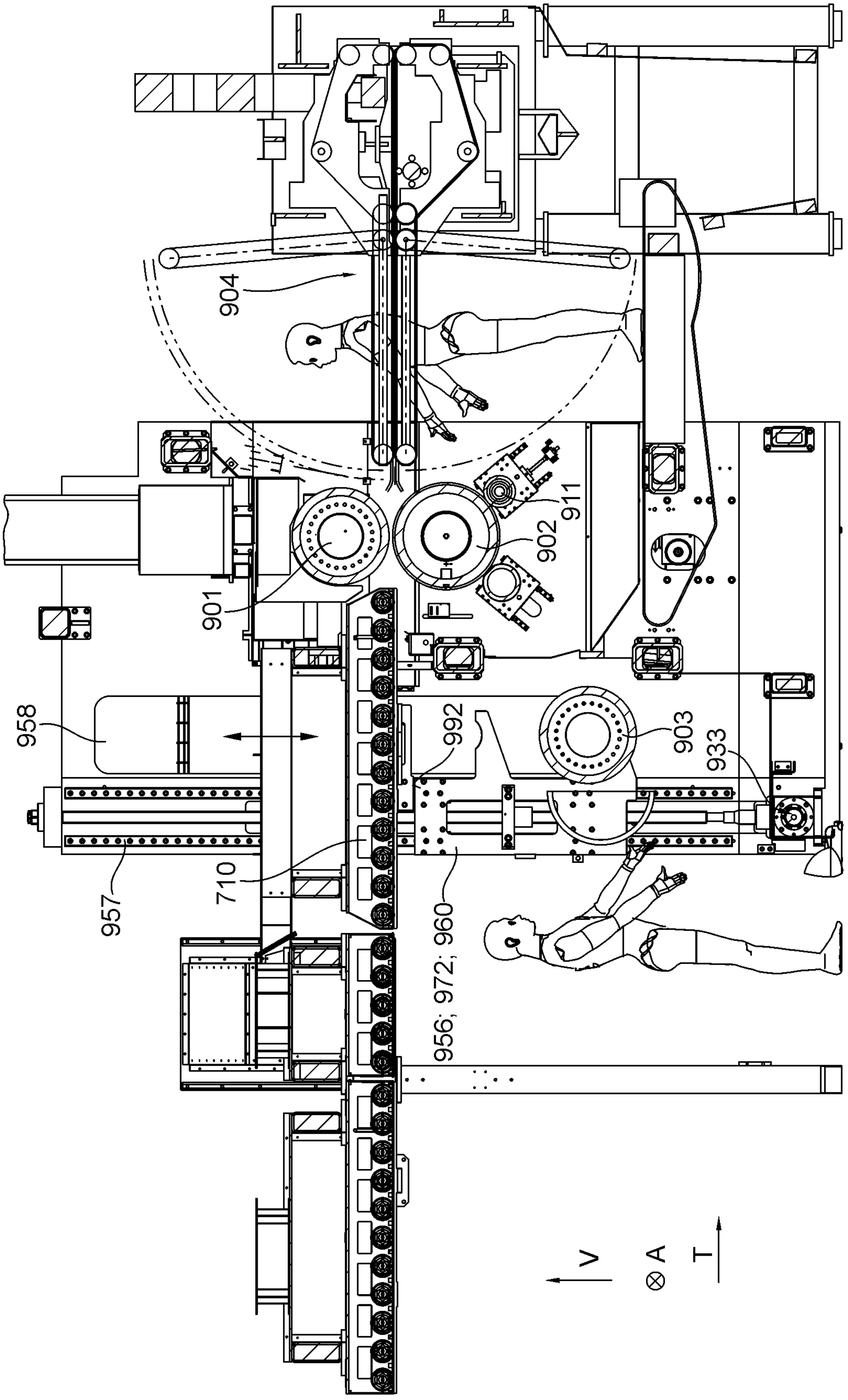
FIG. 16 a side view of the die-cutting unit comprising a transport device in the working position.
Figure 17:
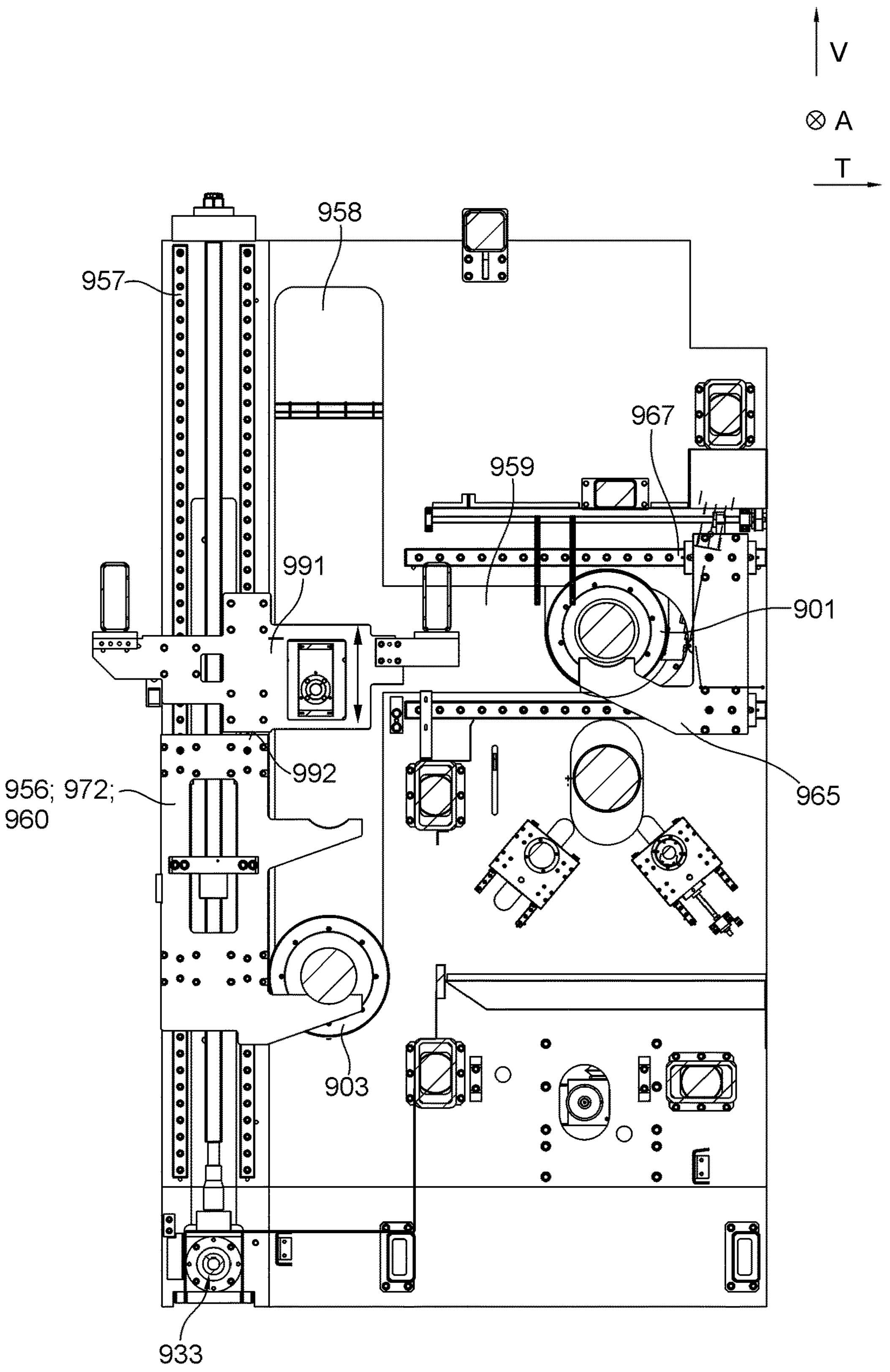
FIG. 17 a side view of the displacement mechanism of the transport device.
Figure 18:
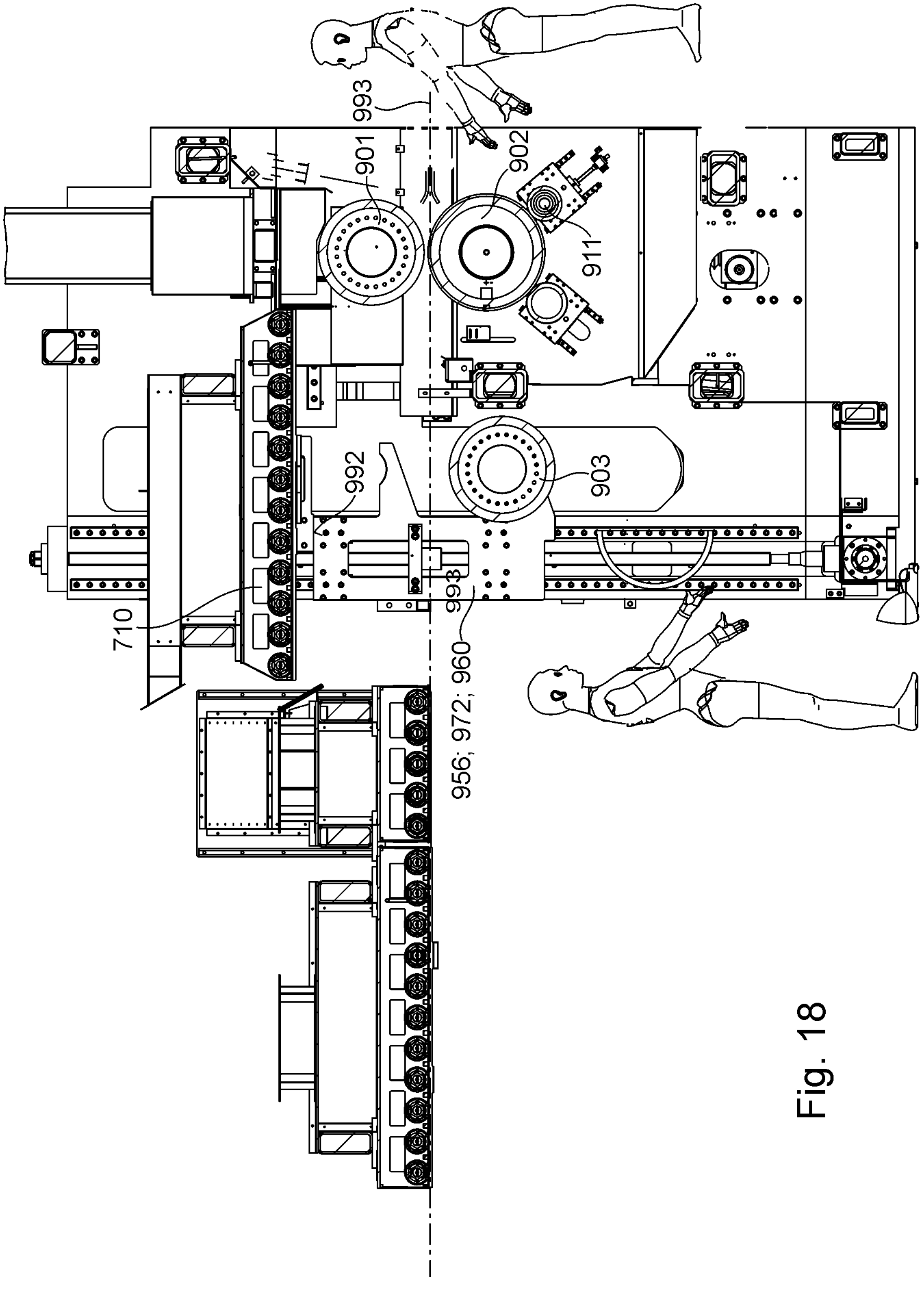
FIG. 18 a side view of the die-cutting unit comprising a transport device in the maintenance position.
Figure 19:
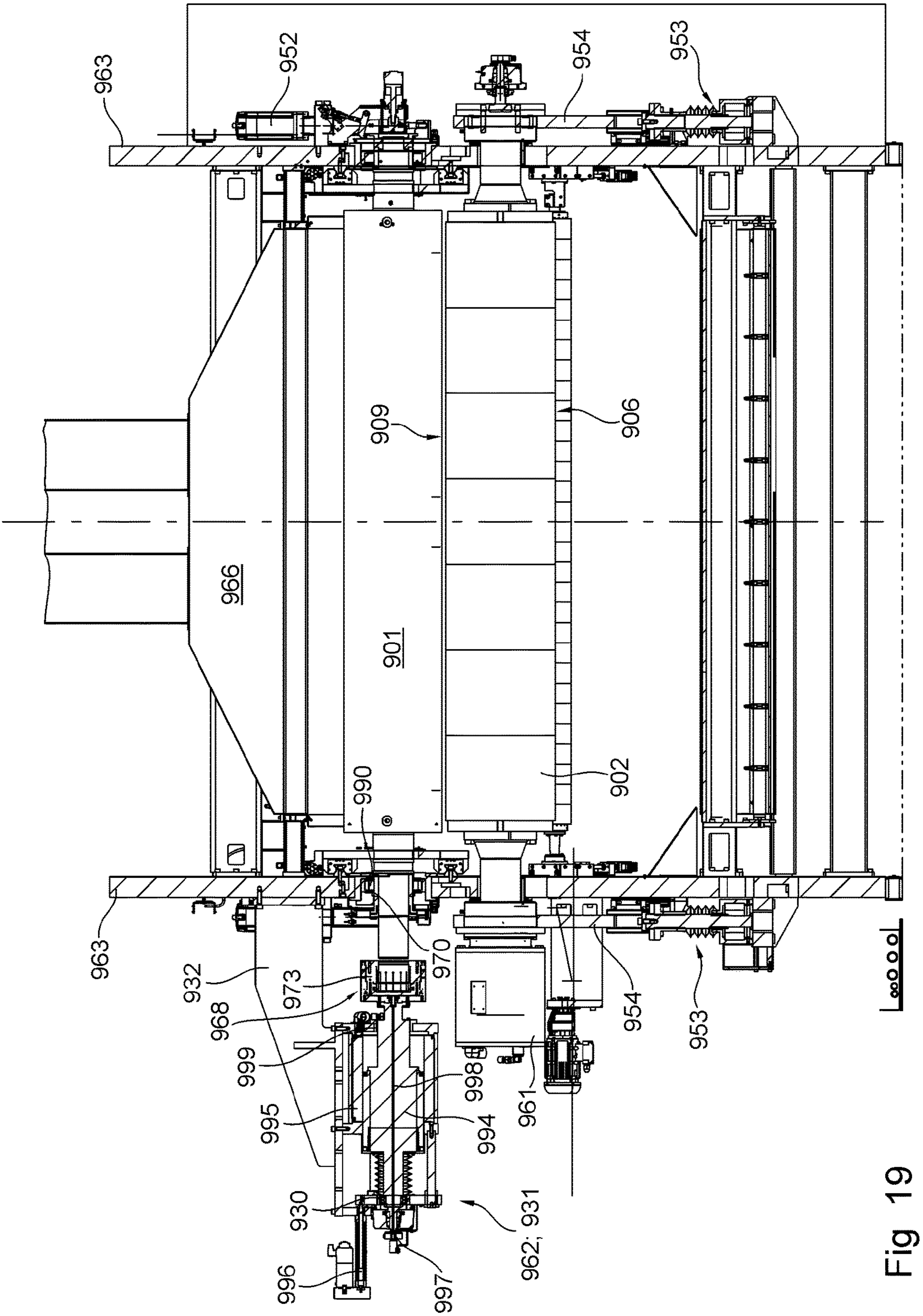
FIG. 19 a side view of the die-cutting unit comprising a released coupling.
Figure 20:
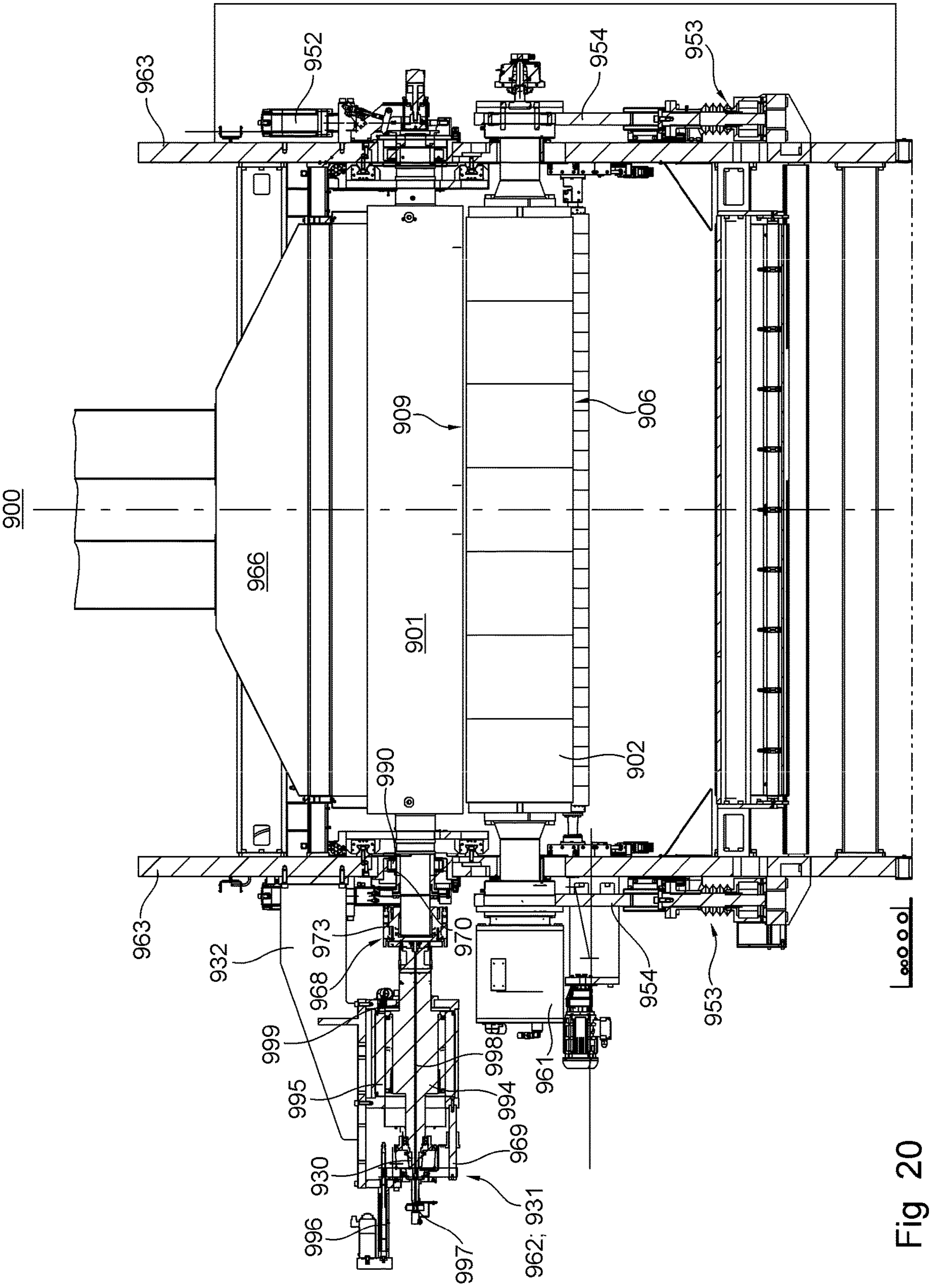
FIG. 20 a side view of the die-cutting unit comprising a closed coupling.
Figure 21:
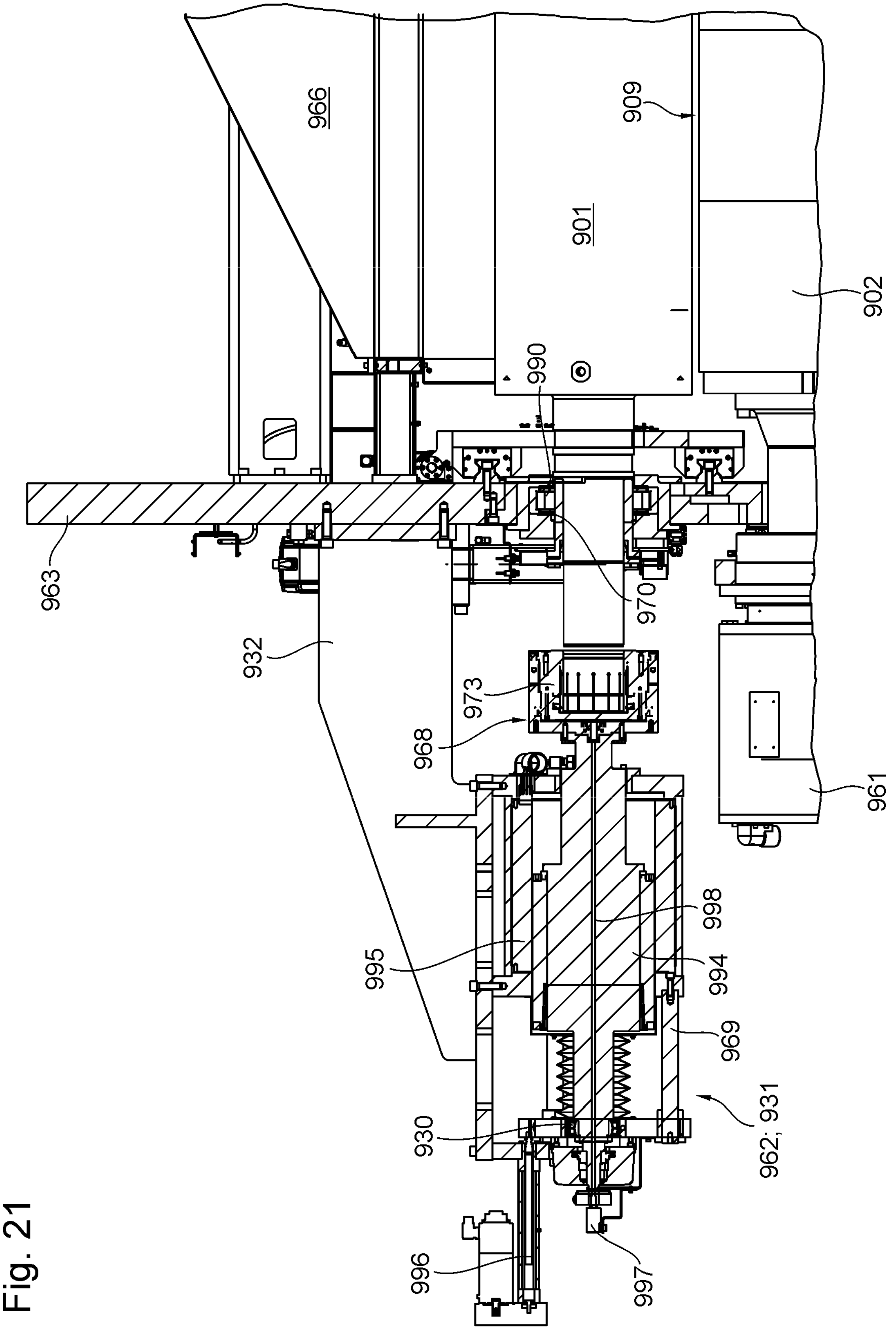
FIG. 21 a sectional illustration of the drive of the die-cutting cylinder.

A processing machine 01 is preferably designed as a printing machine 01 and/or as a shaping machine 01, in particular a die-cutting machine 01. The printing machine 01 is designed as a flexographic printing machine 01, for example.

The processing machine 01 is preferably referred to as a printing machine 01 when it comprises at least one printing mechanism 614 and/or at least one printing unit 600, in particular regardless of whether the machine comprises additional units for processing substrate 02. A processing machine 01 designed as a printing machine 01 also comprises, for example, at least one additional such unit 900, for example at least one shaping unit 900, which is preferably designed as a die-cutting unit 900, more preferably as a die-cutting device 900. The processing machine 01 is preferably referred to as a shaping machine 01 when it comprises at least one shaping mechanism 914 and/or at least one shaping unit 900, in particular regardless of whether it comprises additional units 600 for processing substrate 02. The processing machine 01 is preferably referred to as a die-cutting machine 01 when it comprises at least one die-cutting mechanism 914 and/or at least one die-cutting unit 900 and/or at least one die-cutting device 900, in particular regardless of whether it comprises additional units 600 for processing substrate 02. A processing machine 01 designed as a shaping machine 01 or die-cutting machine 01 also comprises, for example, at least one additional unit 600 for processing substrate 02, for example at least one printing unit 600 and/or at least one printing mechanism 614.

In a preferred embodiment, the processing machine 01, in particular a sheet processing machine 01, preferably comprises a unit 100 designed as a sheet feeder 100 and/or at least one application mechanism 614 for applying at least one print image onto substrate 02. Thus, if the processing machine 01 comprises at least one printing mechanism 614 and/or at least one printing unit 600, and also comprises at least one shaping mechanism 914 and/or at least one shaping unit 900, it is designed both as a printing machine 01 and as a shaping machine 01. If the processing machine 01 comprises at least one printing mechanism 614 and/or at least one printing unit 600, and also comprises at least one die-cutting mechanism 914 and/or at least one die-cutting unit 900 and/or at least one die-cutting device 900, it is accordingly designed both as a printing machine 01 and as a shaping machine 01, in particular a die-cutting machine 01.

The processing machine 01 is preferably designed as a sheet processing machine 01, i.e., as a processing machine 01 for processing sheet-format substrate 02 or sheets 02, in particular sheet-format print substrate 02. For example, the sheet processing machine 01 is designed as a sheet-fed printing machine 01 and/or as a sheet-fed shaping machine 01 and/or as a sheet-fed die-cutting machine 01. The processing machine 01 is further preferably designed as a corrugated cardboard sheet processing machine 01, i.e., as a processing machine 01 for processing sheet-format substrate 02 or sheets 02 made of corrugated cardboard 02, in particular sheet-format print substrate 02 made of corrugated cardboard 02. The processing machine 01 is further preferably designed as a sheet-fed printing machine 01, in particular as a corrugated cardboard sheet printing machine 01, i.e., as a printing machine 01 for coating and/or printing sheet-format substrate 02 or sheets 02 made of corrugated cardboard 02, in particular sheet-format print substrate 02 made of corrugated cardboard 02. The printing machine 01 is designed as a printing machine 01 that operates according to a printing forme-based printing method, for example.

Unless an explicit distinction is made, the term sheet-format substrate 02, in particular print substrate 02, specifically sheet 02, shall generally encompass any flat substrate 02 present in the form of sections, i.e., including substrates 02 in tabular form or panel form, i.e., including boards or panels. The sheet-format substrate 02 or sheet 02 thus defined is made, for example, of paper or paperboard, i.e., as a sheet of paper or paperboard, or by sheets 02, boards, or optionally panels made of plastic, cardboard, glass, or metal. More preferably, the substrate 02 is corrugated cardboard 02, in particular corrugated cardboard sheets 02. The at least one sheet 02 is preferably designed as corrugated cardboard 02. A thickness of a sheet 02 shall preferably be understood to mean a dimension orthogonal to a largest surface area of the sheet 02. This largest surface area is also referred to as the main surface area. For example, the thickness of the sheets 02 is at least 0.1 mm, more preferably at least 0.3 mm, and still more preferably at least 0.5 mm. Considerably greater thicknesses are also customary, especially in the case of corrugated cardboard sheets 02, for example at least 4 mm or also 10 mm and more. Corrugated cardboard sheets 02 are relatively stable and are therefore not very flexible. Corresponding adjustments of the processing machine 01 therefore facilitate the processing of sheets 02 of great thickness.

The respective, preferably the at least one, sheet 02 is preferably made of paper or cardboard or paperboard. According to DIN 6730, paper is a flat material, consisting mainly of fibers derived from vegetable sources, which is formed by the dewatering of a fiber suspension on a sieve. In the process, a card web is created, which is subsequently dried. The basis weight of paper is preferably a maximum of 225 $g/m^2$. According to DIN 6730, cardboard is a flat material, consisting mainly of fibers derived from vegetable sources, which is formed by the dewatering of a fiber suspension on a sieve or between two sieves. The fiber structure is compressed and dried. Cardboard is preferably manufactured from cellulose by gluing or pressing. Cardboard is preferably designed as solid board or corrugated cardboard 02. Above and below, corrugated cardboard 02 is cardboard made of one or more layers of corrugated paper that is glued to one layer or between multiple layers of another, preferably smooth, paper or cardboard. The basis weight of cardboard is preferably more than 225 $g/m^2$. Above and below, the term paperboard preferably refers to a sheet material that is preferably primed on one side and made of paper, preferably having a basis weight of at least 150 g/m2 and no more than 600 $g/m^2$. Paperboard preferably has high strength relative to paper.

The processing machine 01 preferably comprises several units 100; 300; 600; 700; 900; 1000. A unit in this context shall preferably be understood to mean a group of devices that cooperate functionally, in particular in order to carry out a preferably self-contained processing operation of sheets 02. At least two, for example, and preferably at least three, and more preferably all of the units 100; 300; 600; 700; 900; 1000 are designed as modules 100; 300; 600; 700; 900; 1000 or at least each is assigned to such a module. A module in this context shall in particular be understood to mean a respective unit or a structure made up of multiple units, which preferably comprises at least one transport means and/or at least a dedicated drive controllable by open-loop and/or closed-loop control, and/or as an independently functioning module and/or as an individually manufactured and/or separately assembled machine unit or functional assembly. A dedicated drive, controllable by open-loop and/or closed-loop control, of a unit or module shall in particular be understood to mean a drive that is used to power the movements of components of this unit or module and/or that is used to transport substrate 02, in particular sheets 02, through this particular unit or module and/or through at least one operating zone of this particular unit or module and/or that is used to directly or indirectly drive at least one component of the particular unit or module that is intended for contact with sheets 02. The dedicated drive of a unit or module which can be controlled by open-loop and/or closed-loop control is preferably designed to power movements of components of this unit or module and/or designed to effect a transport of substrate 02 and/or designed to directly or indirectly drive at least one component of the particular unit or module which is intended for contact with sheets 02. These drives of the units 100; 300; 600; 700; 900; 1000 of the processing machine 01 are preferably embodied, in particular, as closed loop position-controlled electric motors.

Each unit 100; 300; 600; 700; 900; 1000 preferably comprises at least one drive control system and/or at least one drive controller, which is assigned to the respective at least one drive of the particular unit 100; 300; 600; 700; 900; 1000. The drive control systems and/or drive controllers of the individual units 100; 300; 600; 700; 900; 1000 can preferably be operated individually and independently of one another. More preferably, the drive control systems and/or drive controllers of the individual units 100; 300; 600; 700; 900; 1000 are linked and/or can be linked in terms of circuitry, in particular by means of at least one BUS system, to one another and/or to a machine control system of the processing machine 01, in such a way that coordinated open-loop and/or closed-loop control of the drives of several or all units 100; 300; 600; 700; 900; 1000 of the processing machine 01 is and/or can be carried out. Accordingly, the individual units 100; 300; 600; 700; 900; 1000 and/or in particular modules 100; 300; 600; 700; 900; 1000 of the processing machine 01 can be and/or are operated preferably electronically synchronized with one another, at least with respect to their drives, in particular by means of at least one electronic master axis. For this purpose, an electronic master axis is preferably specified, for example by a higher-level machine control system of the processing machine 01. As an alternative or in addition, the individual units 100; 300; 600; 700; 900; 1000 of the processing machine 01 are and/or can be mechanically synchronized with one another, for example, at least with respect to the drives thereof. Preferably, however, the individual units 100; 300; 600; 700; 900; 1000 of the processing machine 01 are mechanically decoupled from one another, at least with respect to the drives thereof.

The spatial area provided for the transport of substrate 02, which the substrate 02, if present, at least temporarily occupies, is the transport path. The transport path is preferably defined by at least one device for guiding the substrate 02 in an operating state of the processing machine 01. Unless described otherwise, each of the units 100; 300; 600; 700; 900; 1000 of the processing machine 01 is preferably characterized in that the section of a transport path provided for a transport of sheets 02, which is defined by the respective unit 100; 300; 600; 700; 900; 1000, is at least substantially flat, and more preferably completely flat. A substantially flat section of the transport path provided for the transport of sheets 02 in this context shall be understood as a section that has a minimum radius of curvature of at least 2 meters, more preferably at least 5 meters, still more preferably at least 10 meters, and still more preferably still at least 50 meters. A completely flat section has an infinitely large radius of curvature and is thus likewise substantially flat and therefore likewise has a minimum radius of curvature of at least 2 meters. Unless described otherwise, each of the units 100; 300; 600; 700; 900; 1000 of the processing machine 01 is preferably characterized in that the section of the transport path provided for the transport of sheets 02, which is defined by the respective unit 100; 300; 600; 700; 900; 1000, extends at least substantially horizontally, and more preferably exclusively horizontally. This transport path preferably extends in a direction T, in particular in the transport direction T. A substantially horizontal transport path provided for the transport of sheets 02 means, in particular, that within the entire area of the particular unit 100; 300; 600; 700; 900; 1000, the provided transport path only has one or more directions that deviate by no more than 30°, preferably no more than 15°, and more preferably no more than 5° from at least one horizontal direction. The direction of the transport path, in particular the transport direction T, is in particular the direction in which the sheets 02 are transported at the point at which the direction is measured. The transport path provided for the transport of sheets 02 preferably begins at the point where the sheets 02 are removed from a feeder pile 104.

The processing machine 01 preferably comprises at least one substrate feed device 100, which more preferably is designed as a unit 100, in particular a substrate feed unit 100, and/or as a module 100, in particular a substrate feed module 100. In particular in the case of a sheet processing machine 01, the at least one substrate feed device 100 is preferably designed as a sheet feeder 100 and/or sheet feeder unit 100 and/or sheet feeder module 100. A sheet 02 to be processed is preferably collected in the feeder pile 104 within a storage area of the substrate feed device 100 and is conveyed from there through the processing machine 01.

For example, the processing machine 01 comprises at least one unit designed as a conditioning device, in particular a conditioning unit, which is more preferably designed as a module, in particular as a conditioning module. Such a conditioning device is designed, for example, as a pre-processing device or as a post-processing device. The processing machine 01 preferably comprises at least one unit designed as a pre-processing device, in particular a pre-processing unit, which more preferably is designed as a module, in particular as a pre-processing module, and represents a conditioning device. The processing machine 01 preferably comprises at least one post-processing device. The processing machine 01 preferably comprises at least one unit 300, preferably an infeed device 300, which is more preferably designed as an infeed unit 300 and/or infeed module 300. Alternatively, the at least one infeed device 300 is designed as a component of the substrate feed device 100 or of another unit.

The processing machine 01, for example, comprises at least one unit 600, for example application unit 600. The at least one application unit 600 is preferably arranged and/or designed based on its function and/or application method. The at least one application unit 600 is preferably used to apply at least one respective application fluid or coating agent over the entire surface area and/or a portion of the surface area of the sheets 02. One example of an application unit 600 is a printing unit 600 or printing module 600, which is used in particular for applying printing ink and/or ink onto substrate 02, in particular sheets 02. In particular, the at least one application unit 600 is designed to apply application fluid, preferably printing ink and/or ink, over the entire surface area and/or a portion of the surface area of the sheets 02. Above and below, an optionally provided priming unit and/or an optional varnishing unit may also be considered to be such an application unit 600 or printing unit 600.

Independently, in particular, of the function of the application fluid that can be applied by the application units 600, these units can preferably be distinguished in terms of their application method. One example of an application unit 600 is a forme-based application unit 600, which comprises, in particular, at least one fixed, physical, and preferably exchangeable printing forme. Forme-based application units 600 preferably operate according to a planographic printing process, in particular an offset planographic printing process, and/or according to a gravure printing process, and/or according to a letterpress printing process, in particular preferably according to a flexographic printing process. The corresponding application unit 600 is then a flexographic application unit 600 or flexographic printing unit 600, for example, in particular a flexographic application module 600 or flexographic printing module 600. The printing unit 600 preferably comprises a plate cylinder 602. The plate cylinder 602 is preferably driven by means of a drive M2, preferably dedicated drive. An impression cylinder 608 is preferably assigned to the plate cylinder 602. The impression cylinder is driven by means of a drive M1, preferably by means of a dedicated drive or a drive of the printing unit 600 or, in an alternative design, in addition to the plate cylinder 602 by means of the drive M1 of the plate cylinder 602. The plate cylinder 602 and the impression cylinder 608 are preferably each designed as a cylinder 602 and cylinder 608.

Such a flexographic printing unit 600 preferably comprises at least one supply roller 603, which more preferably is designed as an anilox roller 603 and/or has a well structure on the outer cylindrical surface thereof, in particular on the outer cylindrical surface of the roller body thereof. The supply roller 603 is preferably designed as a cylinder 603. The at least one supply roller 603 is preferably arranged so as to be in contact and/or arranged in such a way that it can be brought in contact with a plate cylinder 602. Preferably, a supply roller drive M3 designed as a drive M3 of the supply roller 603 is connected and/or can be connected to the supply roller 603 via a releasable connection, for example by means of a coupling. This connection is preferably released when the supply roller 603 is to be placed into the storage device 21. Thus, at least one chamber doctor blade 604 is preferably in contact with and/or functionally connected to the supply roller 603, which is in particular designed as an anilox roller 603. The at least one storage device 21 preferably comprises at least two, more preferably at least three, still more preferably at least four, and still more preferably exactly four storage receptacles for receiving a respective supply roller 603. In this way, at least one supply roller 603 can always be kept available in the vicinity of the intended place of use if a presently used supply roller 603 is to be replaced. Such a replacement usually takes place, for example, when a subsequent job requires a smaller or greater amount of application fluid per surface area. The storage device 21 preferably comprises at least one movable repositioning device 23, by means of which the at least two storage receptacles 22 can be moved and arranged in different storage positions. The storage device 21 is thus suitable for exchanging the anilox roller in a quick and simple manner. In particular in conjunction with a device for changing 950 die-cutting cylinders 901; 903, an expedited job change can be created. Both devices thus crucially contribute to expedited job changes of the processing machine 01.

A preferred first embodiment of the flexographic application mechanism 614 is intended to provide application fluid from beneath onto, for example to print, substrate 02, in particular sheets 02 and/or print substrate 02. In this preferred first embodiment of the flexographic application mechanism 614, the plate cylinder 602 is preferably arranged beneath the impression cylinder 608. In an alternative embodiment, the sheets 02 are printed from above. The printing unit 600 is then preferably designed in a mirror-inverted order and has design adaptations. The sheets 02 are preferably die-cut on the opposite side of the print image. This is why printing from beneath is the preferred embodiment.

The printing unit 600 preferably furthermore comprises the plate cylinder 602. The plate cylinder 602 can preferably be moved relative to the supply roller 603 by means of servo drives. In this way, a corresponding application point 609 can preferably be adapted to different thicknesses of substrate 02 to be processed. The supply roller 603 preferably comprises a drive M3. During operation, the plate cylinder 602 is supplied with printing fluid via the supply roller 603. For this purpose, the supply roller 603 is in contact with a chamber doctor blade 604. An impression cylinder 608 is arranged opposite the plate cylinder 602. The application point 609 is located between the plate cylinder 602 and the impression cylinder 608. The cylinders 602, 603, 608 comprise the drives M1, M2, M3 and are supported by a frame 607.

Furthermore, the processing machine 01, for example, comprises at least one unit designed as a drying device, in particular a drying unit, which more preferably is designed as a module, in particular as a drying module. As an alternative or in addition, at least one drying device 506 and/or at least one after-drying device, for example, is a component of at least one unit 100; 300; 600; 700; 900; 1000 preferably designed as a module 100; 300; 600; 700; 900; 1000. For example, at least one application unit 600 comprises at least one drying device 506 and/or comprises at least one unit 700 designed as a transport device 710 and/or at least one transport unit 700.

The processing machine 01 comprises a unit 700, in particular a transport unit 700, and/or the module 700, in particular the transport module 700. In addition, or as an alternative, the processing machine 01 preferably comprises transport devices 700, for example as components of other units and/or modules. The transport unit 700 is driven by a drive. This drive is, for example, mechanically coupled to further units 700, for example further transport units 700. As an alternative, the drive is mechanically decoupled from further units.

The processing machine 01 preferably comprises at least one shaping device 900, which more preferably is designed as a unit 900, in particular a shaping unit 900 or die-cutting unit 900, and/or as a module 900, in particular as a shaping module 900 or die-cutting module 900 and/or as a die-cutting device 900. The processing machine 01 preferably comprises at least one shaping unit 900 designed as a die-cutting unit 900. The at least one shaping device 900 is preferably designed as a rotary die-cutting device 900 and/or preferably comprises at least one shaping mechanism 914 or die-cutting mechanism 914. A shaping device 900 shall also be understood to mean a stamping device and/or a creasing device. A perforating device is preferably likewise a form of a die-cutting device 900. The shaping device 900 preferably comprises at least one plate cylinder 901 and at least one anvil cylinder 902. The plate cylinder 901 is designed as a cylinder 901, preferably as a die cylinder 901, and in particular a die-cutting cylinder 901. Preferably, the die-cutting cylinder 901 is or can be rotatably driven by a drive 962. The anvil cylinder 902 is designed as a cylinder 902. For example, the anvil cylinder 902 is also referred to as a counterpressure cylinder 902 of the shaping device 900. Preferably, the anvil cylinder 902 is or can be rotatably driven by a drive 961.

The processing machine 01 preferably comprises at least one unit 1000 designed as a substrate output device 1000, in particular as a delivery device 1000, in particular a unit 1000 designed as a sheet delivery unit 1000, in particular a delivery unit 1000, which is more preferably designed as a module 1000, in particular as a delivery module 1000.

The transport direction T provided in particular for the transport of sheets 02 is the direction T that is preferably oriented at least substantially, and more preferably entirely, horizontally and/or that preferably points from a first unit 100; 300; 600; 700; 900; 1000 of the processing machine 01 to a last unit 100; 300; 600; 700; 900; 1000 of the processing machine 01, in particular from a sheet feeder unit 100 or a substrate feed device 100 on the one hand to a delivery unit 1000 or a substrate output device 1000 on the other hand, and/or that preferably points in a direction in which the sheets 02 are transported, apart from vertical movements or vertical components of movements, in particular from a first point of contact with a unit 300; 600; 700; 900; 1000 of the processing machine 01 that is arranged downstream from the substrate feed device 100 or a first point of contact with the processing machine 01 to a last point of contact with the processing machine 01. Regardless of whether the infeed device 300 is an independent unit 300 or module 300 or is a component of the substrate feed device 100, the transport direction T is preferably the direction T in which a horizontal component of a direction points, which is oriented from the infeed device 300 to the substrate output device 1000.

A direction A, preferably a transverse direction A, preferably also referred to as an axial direction A, is preferably a direction A that is oriented orthogonally to the transport direction T of the sheets 02 and/or orthogonally to the intended transport path of the sheets 02 through the at least one application unit 600 and/or through the at least one shaping unit 900 and/or through the at least one sheet delivery unit 1000. The transverse direction A is preferably a horizontally oriented direction A. A working width of the processing machine 01 and/or of the at least one application unit 600 and/or of the at least one shaping unit 900 and/or of the at least one sheet delivery unit 1000 is preferably a dimension that extends preferably orthogonally to the intended transport path of the sheets 02 through the at least one application unit 600 and/or the at least one shaping unit 900 and/or the at least one sheet delivery unit 1000, more preferably in the transverse direction A. The working width of the processing machine 01 preferably corresponds to a maximum width that a sheet 02 may have in order to still be able to be processed by the processing machine 01, i.e., in particular a maximum sheet width that can be processed by the processing machine 01. The width of a sheet 02 shall, in particular, be understood to mean its dimension in the transverse direction A. This is preferably independent of whether this width of the sheet 02 is greater than or less than a horizontal dimension of the sheet 02 orthogonal thereto, which more preferably represents the length of this sheet 02.

The working width of the processing machine 01 preferably corresponds to the working width of the at least one application unit 600 and/or of the at least one shaping unit 900 and/or of the at least one sheet delivery unit 1000. The working width of the processing machine 01, in particular sheet processing machine 01, is preferably at least 100 cm, more preferably at least 150 cm, still more preferably at least 160 cm, still more preferably at least 200 cm, and still more preferably at least 250 cm.

A vertical direction V preferably denotes a direction that is parallel to the normal vector of a plane spanned by the transport direction T and the transverse direction A. For example, in the region of the shaping device 900, the vertical direction V is preferably oriented so as to point from the print substrate 02 toward a plate cylinder 901 of the shaping device 900.

The sheet processing machine 01 is preferably a sheet processing machine 01 comprising at least one shaping device 900 and at least one delivery device 1000 arranged downstream from the at least one shaping device 900 along a transport path provided for the transport of sheets 02. The at least one shaping device 900 is preferably designed as a die-cutting device 900 and/or as a rotary die-cutting device 900. For example, exactly one shaping device 900, in particular die-cutting device 900 and/or rotary die-cutting device 900, is provided.

The at least one shaping device 900 preferably has at least one, and more preferably exactly one, shaping point 909. The at least one shaping device 900 preferably has the at least one, and more preferably exactly one, shaping point 909, which is formed by at least one, and more preferably exactly one, plate cylinder 901, in particular designed as a die cylinder 901, on the one hand, and at least one counterpressure cylinder 902 on the other. The shaping point 909 is preferably the region in which the particular plate cylinder 901 and the particular counterpressure cylinder 902 are closest to one another. The at least one shaping point 909 is preferably designed as at least one die-cutting point 909 and/or as a processing point 909 and/or as at least one transport means 909 and/or as at least one shaping transport means 909 and/or as at least one die-cutting transport means 909. The shaping device 900, in particular the shaping mechanism 914, preferably comprises at least one tool, and more preferably the at least one plate cylinder 901 comprises at least one tool. In a preferred embodiment, the tool of the shaping device 900, in particular of the shaping mechanism 914, preferably the tool of the plate cylinder 901, is in direct contact with the anvil cylinder 902, in particular in the region of the shaping point 909. Preferably, the impression cylinder 608 and the anvil cylinder 902 must run at a synchronous speed during operation, preferably at the same surface speed.

The at least one plate cylinder 901 designed as a die-cutting cylinder 901 comprises a tool having preferably vertically arranged blades. The blades are preferably discontinuously arranged and differ depending on the die-cutting job. For example, the blades differ in terms of the penetration depth. In particular, it is then not possible to specify a single surface speed for the die-cutting cylinder 901. The computation is then preferably carried out using a mean value. Preferably, the at least one starting diameter has to be entered into an interface to a control system prior to starting the machine, for example manually.

The at least one counterpressure cylinder 902 designed as an anvil cylinder 902 preferably comprises a cover or die cutting blanket 906. The die cutting blanket 906 is preferably made of a plastic material and/or rubber and has slightly elastic properties. The die cutting blanket 906 is preferably made of a plastic material such as polyurethane or the like. The die cutting blanket 906, for example, can be easily pushed in and at least partially return to its shape. Usually, such a die cutting blanket 906 is between 10 mm and 12 mm thick, wherein between 4 and 8 mm can be removed by grinding.

At least one grinding cylinder 911 or grinding roller 911 is arranged at or can be set against the anvil cylinder 902. The at least one grinding cylinder 911 comprises a drive, preferably a direct drive. The grinding cylinder 911 can preferably be set against the anvil cylinder 902 by means of servo drives.

The processing machine 01 comprises a plurality of sensors. These can be used, for example, to detect the arrival of the sheet at certain points of the processing machine 01. Furthermore, the sensors can also be designed as cameras and, for example, inspect the result of the processing operation. Such an inspection system is preferably designed as a printed image monitoring system 726 for inspecting a print image. Furthermore, such a sensor can be a color register monitoring system 728. The printed image monitoring system 726 and the color register monitoring system 728 are preferably arranged downstream from the application units 600 and preferably inspect the entire print image. Furthermore, the processing machine 01 preferably comprises a die-cut image monitoring system 916. This system is preferably arranged downstream from the die-cutting unit 900. A sheet 02 can be channeled out of the processing machine 01, for example, by means of the sensors 726, 728, 916. For this purpose, the processing machine 01 preferably comprises a sheet diverter 1001 and an ejection pile 1002, also referred to as a diverted delivery 1002. If deviations in the print and/or die-cut quality occur, the sheet diverter 1001 can be controlled by means of the signals of the sensors 726, 728, 916, and the sheets can be deflected in the transport path and thus be delivered onto the ejection pile 1002. If, in contrast, the print quality and/or die-cut quality are sufficient, the sheet 02 is preferably deposited on a delivery pile carrier 1003 of the sheet delivery unit 1000. Furthermore, the sheet processing machine 01 comprises a plurality of sheet arrival sensors 164; 622; 722; 922. Furthermore, due to outer changes in the printing length of the die-cutting length occur over time. These changes can likewise be detected by the sensors, and the cylinders, in particular the plate cylinders 602; 901; 903, can subsequently be controlled in an open loop and/or a closed loop by way of the signals.

There is a need to change out the die-cutting cylinders 901; 903 in a die-cutting unit 900 in an improved manner. For this purpose, the die-cutting unit 900 comprises a device for changing 950 the die-cutting cylinders 901; 903. A die-cutting cylinder 901 which, during operation, is in a die-cutting position 981 can be changed out for a further die-cutting cylinder 903. The device for changing 950 comprises the components of the die-cutting unit 900 which are involved in and/or required for changing the cylinders 901; 903. In particular, the device for changing 950 comprises the at least one die-cutting cylinder 901 and the at least one further die-cutting cylinder 903 for changing out the at least one die-cutting cylinder 901. The die-cutting unit 900 preferably comprises a vacuum system 966 for extracting waste parts or dust. The die-cutting unit 900 preferably comprises a housing 963. Preferably, the housing 963 of the die-cutting unit 900 has at least one first wall and one second wall, which are arranged in the axial direction upstream and downstream from the transport path of sheets 02. Preferably, the housing 963 is designed as a frame 963, for example for holding the cylinders 901; 902; 903 of the die-cutting unit 900.

Preferably, the device for changing 950 the die-cutting cylinders 901; 903 comprises at least one, preferably a plurality of, and in particular at least two, guides 958; 959. A transport system 95 in particular includes the guides 958; 959. Preferably, a guide 959 is designed as a preferably predominantly horizontal guide 959, more preferably comprising at least one horizontal transport element 965. Preferably, a guide 958 is designed as a preferably predominantly vertical guide 958, more preferably comprising at least one vertical transport element 956; 960. The die-cutting cylinders 901; 903 can be arranged in several positions 981; 982; 985; 986; 987 in the device for changing 950. The at least one guide 958; 959 is designed for positioning the at least one die-cutting cylinder 901 and/or the further die-cutting cylinder 903. In particular, the die-cutting cylinders 901; 903 are moved along the guides 958; 959. One of the die-cutting cylinders 901; 903 can be arranged and/or is arranged in a die-cutting position 981. During die-cutting, the die-cutting cylinder 901; 903, in particular the particular die-cutting cylinder 901; 903 that is being employed, is arranged in the die-cutting position 981. In a preferred embodiment, the die-cutting cylinder 901; 903 is arranged above the shaping point 909 in the die-cutting position 981. During operation of the processing machine 01, the cutting blades, in the die-cutting position 981, come in contact with the die cutting blanket 906 of the anvil cylinder 902. This position 983 of the anvil cylinder 902 is referred to as the working position 983 of the anvil cylinder 902. In this way, the processing point 909 is preferably formed by the die-cutting cylinder 901; 903 arranged in the die-cutting position 981 and the anvil cylinder 902 arranged in the working position 983. The die-cutting position 981 is thus the same position for both die-cutting cylinders 901; 903. In particular, the processing point 909 is thus in an identical position for the at least one die-cutting cylinder 901 and for the further die-cutting cylinder 903. The sheet 02 is preferably processed at the processing point 909 of the die-cutting unit 900 during operation, in particular regardless of which die-cutting cylinder 901; 903 is arranged in the die-cutting position 981.

Preferably, one of the die-cutting cylinders 901; 903, preferably at least the at least one die-cutting cylinder 901, can be arranged and/or is arranged in a change-out position 982. Preferably, the at least one die-cutting cylinder 901 or the further die-cutting cylinder 903 can be arranged and/or is arranged in the change-out position 982. From the die-cutting position 981, the die-cutting cylinder 901 can be transferred into a change-out position 982. For this purpose, preferably at least one locking mechanism 951 of the die-cutting cylinder 901 is opened. In the change-out position 982, the at least one die-cutting cylinder 901 is ready for removal. In particular for changing the cylinder, the die-cutting cylinder 901 is transferred from the die-cutting position 981 into the change-out position 982. The further cylinder 903 is preferably transferred from the change-out position 982 into the die-cutting position 981. From the change-out position 982, the die-cutting cylinder 901; 903 can be transferred and/or is transferred into the die-cutting position 981. The change-out position 982 is preferably arranged so as to be spaced apart from the die-cutting position 981, in particular in the vertical direction V, and more preferably beneath the die-cutting position 981. In a preferred embodiment, the die-cutting cylinder 901; 903 is arranged so as to be located further away from the shaping point 909 in the change-out position 982 than in the die-cutting position 981, preferably displaced in the direction of the previously backed-away anvil cylinder 902, and more preferably displaced downwardly.

Preferably, the change-out position 982 is arranged, in the vertical direction, above, or preferably beneath, the die-cutting position 981. The axis of rotation 976 of the die-cutting cylinder 901 in the change-out position 982 is preferably located on the same axis in the vertical direction V as the axis of rotation 976 of the die-cutting cylinder 901 in the die-cutting position 981. The change-out position 982 is preferably located on a direct guide path between the die-cutting position 981 and a maintenance position 987.

In a preferred embodiment, the die-cutting cylinder 901; 903 is functionally connected to the drive 962. The drive 962 preferably rotationally drives the die-cutting cylinder 901; 903, in particular in the die-cutting position 981 thereof. The drive 962 of the die-cutting cylinder 901; 903 is designed to drive a die-cutting cylinder 901; 903 arranged in the die-cutting position 981. The die-cutting cylinder 901; 903 has an axis of rotation 976. The axis of rotation of a body is the straight line about which this body can be rotated, without the view of the body changing. During a rotation about the axis of rotation, the individual points of the body move on circles in planes perpendicular to the respective axis of rotation. The drive 962 is preferably arranged coaxially with respect to the axis of rotation 976 of the die-cutting cylinder 901; 903 arranged in the die-cutting position 981. The drive 962 is preferably arranged at the housing 963 of the die-cutting unit 900, preferably by means of a carrier 932, so as to be fixed to the frame and/or fixed to the housing. The carrier 932 is preferably a housing carrier and is fixed to the frame, i.e., is preferably arranged in an unchangeable position of the housing 963. The drive 962 advantageously comprises a motor 931, in particular a torque motor 931, comprising a rotor 994 and a stator 995. The motor 931 is preferably designed as a synchronous motor 931. The rotor 994 preferably has a permanently excited magnetic field. The rotor 994 preferably comprises at least one permanent magnet for this purpose. The rotor 994 preferably comprises at least one lift for this purpose, with at least one, and preferably a plurality of, permanent magnets. The rotor 994 of the synchronous motor 931 comprises poles (in particular poles alternating in the circumferential direction) made of permanent magnets on the circumference thereof. The stator 995 preferably comprises windings located opposite the permanent magnets for generating magnetic fields by electrical energy. A rotating magnetic field is generated in the stator 995. The rotor 994 and the stator 995 are preferably arranged so as to be displaceable relative to one another, preferably axially. This preferred configuration of the motor 931, in particular comprising the permanent magnets, achieves a high power density. The use of gear ratios thus becomes unnecessary. As a result, inaccuracies in the drive section as well as wear of mechanical elements, such as the gear mechanism, are dispensed with.

In a preferred embodiment, a coupling 968 couples the die-cutting cylinder 901; 903 to the drive 962, which is preferably designed so as to rotationally drive the die-cutting cylinder 901; 903. As a result of the axial displacement of the rotor 994, the die-cutting cylinder 901; 903 can or is preferably completely removed from the coupling 968 and brought back in contact therewith. Moreover, the lateral register can be adjusted as a result of the relative displaceability of the rotor 994 and stator 995. Furthermore, a power of the drive 962 changes as a result of the relative displacement. The rotor 994 is axially displaced or shifted from a coupled position into a decoupled position. Axially preferably means in or counter to the transverse direction A. In the process, the rotor 994 preferably moves between 50 mm and 200 mm, and more preferably approximately 160 mm. For the displacement of the lateral register, the rotor 994 is moved out of the coupled position with the die-cutting cylinder 901; 903. In the process, sensors at the processing machine 01 can be utilized to generate a signal for a servo drive 996 via the machine control system. Proceeding from this signal, the servo drive 996 is accordingly adjusted for correcting the lateral register. The servo drive 996 preferably moves the die-cutting cylinder 901; 903 for adjusting the register, in particular in the die-cutting position 981 thereof. The servo drive 996 is preferably designed as a pneumatic and/or an electric and/or preferably an electromechanical drive. The die-cutting cylinder 901, 903 is preferably only moved a few millimeters to centimeters for adjusting the register. The drive 962 comprises at least one guide 969 for this purpose. The drive 962 is particularly preferably designed as a torque motor 931. A rotary encoder preferably monitors the positioning of the cylinders 901; 903. The coupling 968 is preferably released for removing the die-cutting cylinder 901. As an alternative, in particular as an alternative to displacing only a portion of the drive 962, it is also possible to displace the entire drive 962 parallel to the axis of rotation 976 of the die-cutting cylinder 901; 903, preferably by means of a servo drive 996.

Preferably, only the rotor 994 of the drive 962 is arranged so as to be displaceable and/or be displaced parallel to the axis of rotation 976 of the die-cutting cylinder 901; 903, preferably by means of the servo drive 996. The rotor 994 can preferably be selectively displaced with the die-cutting cylinder 901; 903 or without the die-cutting cylinder 901; 903.

In particular, it is then possible to adapt the lateral register as a result of the relative displacement of the rotor 994 with respect to the stator 995. In this case, the rotor 994 can be displaced with the die-cutting cylinder 901; 903. On the other hand, the rotor 994 can also be, or is, displaced without the die-cutting cylinder 901; 903. This is the case when the coupling 968 has been released, and the coupling 968 is pulled off or removed from the die-cutting cylinder 901; 903, or when the coupling 968 is to be coupled to a new die-cutting cylinder 901; 903. The coupling 968 is preferably removed from a cylinder journal of the die-cutting cylinder 901 during a die-cutting cylinder change. The die-cutting cylinder 901 is thus exposed for a simple, preferably horizontal, removal from the change-out position 982 thereof. After the die-cutting cylinder 901 has been changed, the new die-cutting cylinder 903 is preferably coupled by an axial displacement of the rotor 994. The drive 962 then preferably drives the further die-cutting cylinder 903, which is arranged in the die-cutting position 981.

The rotor 994 is mounted in the motor 931. Preferably, the motor 931 comprises a bearing 930 for mounting, preferably a bearing 930 designed as a roller bearing 930, and more preferably a bearing 930 designed as a spherical roller bearing 930. This bearing is preferably displaced with the rotor 994 in the axial direction by means of the servo drive 996. Furthermore, a plain bearing 999 is preferably employed to enable the axial movement of the rotor 994. The plain bearing 999 is preferably arranged at the end face toward the coupling 968.

The centering of the rotor 994 is preferably ensured by way of a mounting 990 of the die-cutting cylinder 901; 903, in particular in a hub 970 of the die-cutting cylinder 901; 903. The drive 962 or the rotor 994 is centered by coupling the coupling 968. The bearing 930, which is preferably designed as a spherical roller bearing 930, enables the centering movement. The drive 962 is thus preferably mounted by way of the bearing 930, which is preferably designed as a spherical roller bearing 930, and the mounting 990 of the die-cutting cylinder 901; 903.

In a preferred embodiment, the device for changing 950 preferably comprises the coupling 968 for coupling and/or for decoupling the die-cutting cylinders 901; 903 to and/or from the drive 962 for driving one of the die-cutting cylinders 901; 903. The servo drive 996 is preferably connected to the drive 962. The drive 962 is preferably connected to the die-cutting cylinder 901 via the coupling 968. Preferably, the coupling 968 can be or is opened while the die-cutting cylinders 901; 903 are being changed, and the die-cutting cylinder 901 can thus be decoupled from the drive 962 thereof. The coupling 968 is preferably arranged between the drive 962 or the motor 931 and the die-cutting cylinder 901; 903. In particular, the coupling 968 couples the die-cutting cylinder 901; 903 arranged in the die-cutting position 981 to the drive 962 or the motor 931 thereof. In the coupled state, the coupling 968 can preferably be moved in the axial direction with the die-cutting cylinder 901; 903. For example, the coupling 968 is moved with the die-cutting cylinder 901; 903 in the axial direction A during the register adjustment.

In an advantageous embodiment, the coupling 968 comprises a spring collet 973 including preloaded tensioning elements. Such tensioning elements can be star washers, for example. The coupling 968 is preferably designed to be releasable by way of a pressure medium, for example by means of a hydraulic system or hydraulically. For this purpose, the pressure medium can preferably be supplied to the coupling 968 through the shaft of the rotor 994. The rotor 994 preferably has a central borehole 998, through which the pressure medium reaches the coupling 968. The borehole 998 preferably extends through the entire rotor 994. The supply of the pressure medium for actuating the coupling 968 can thus be supplied or delivered to the coupling 968 through the shaft, or the borehole 998, in a simple manner, for example via a rotary inlet 997.

However, as an alternative, the coupling 968, for example, is also a coupling 968 that can be operated in another manner. For example, the coupling 968 can be implemented as a cone, disk, electromagnetic or fluid coupling. In a first embodiment, the die-cutting cylinder 901 remains in position, or does not change the positioning thereof, when transferred from the die-cutting position 981 into the change-out position 982.

Preferably, the at least one servo drive 996 can displace and/or is arranged so as to displace the drive 962, or a part thereof, preferably the rotor 994, in a parallel direction to the axis of the rotation 976 of the die-cutting cylinder 901; 903. Preferably, the servo drive 996 is functionally connected to the rotor 994, and can displace the same in the axial direction relative to the stator 995. The rotor 994 can preferably be displaced by at least 100 mm, and more preferably by 160 mm, in the axial direction. The servo drive 996 is preferably designed to displace the drive 962, preferably a part of the drive 962, more preferably the rotor 994, in the parallel direction to the axis of rotation 976 of the die-cutting cylinder 901; 903, preferably in the axial direction relative to the stator 995.

In a preferred embodiment, the drive 961 of the anvil cylinder 902 also comprises a synchronous motor that is preferably excited by permanent magnets. A gear mechanism can then also be dispensed with for the anvil cylinder 902.

The device for changing 950 preferably comprises a locking mechanism 951 for fixing the die-cutting cylinder 901 or the further die-cutting cylinder 903, in particular depending on which of the cylinders 901; 903 is to be employed, in the die-cutting position 981 and/or for releasing it from the die-cutting position 981. The at least one die-cutting cylinder 901 or the further die-cutting cylinder 903 can be arranged and/or is arranged in the change-out position 982 in a released state of the locking mechanism 951. The at least one die-cutting cylinder 901 or the further die-cutting cylinder 903 can be arranged and/or is arranged in the die-cutting position 981 in a fixed state of the locking mechanism 951. The die-cutting cylinder 901; 903 is preferably exclusively transferred from the die-cutting position 981 thereof into the change-out position 982 thereof by the locking mechanism 951 being released and/or is preferably exclusively transferred from the change-out position 982 into the die-cutting position 981 by the locking mechanism 951 being fixed. If the at least one die-cutting cylinder 901 has been changed for the further die-cutting cylinder 903, the releasing and fixing by means of the locking mechanism 951 apply, mutatis mutandis, to the further die-cutting cylinder 903. The locking mechanism 951 is thus preferably designed so as to fix the die-cutting cylinder 901; 903 which is to be arranged in the die-cutting position 981 at the particular point in time.

In a first embodiment, the die-cutting cylinder 901 remains in position or does not change the positioning thereof, or only changes the positioning thereof slightly, when transferred from the die-cutting position 981 into the change-out position 982. A slight change in positioning, for example, describes a relative change in the positioning of the axis of rotation 976 between the positions by no more than 1 cm, preferably by no more than 5 mm, more preferably by no more than 1 mm, more preferably by no more than 0.5 mm, and more preferably by no more than 0.05 mm. In this case, the change-out position 982 is characterized in that only the locking mechanism 951 is opened or loosened. The die-cutting cylinder 901 is preferably exclusively transferred from the die-cutting position 981 thereof into the change-out position 982 thereof by the locking mechanism 951 being released.

In another embodiment, the position of the die-cutting cylinder 901 changes during the transfer from the die-cutting position 981 into the change-out position 982. This is in particular the case when the locking mechanism 951 pushes the die-cutting cylinder 901 or the further die-cutting cylinder 903 into a position and is then released. Particularly preferably, the locking mechanism 951 is arranged so as to fix, and in particular push, the die-cutting cylinder 901; 903 from the opposite side, in particular from beneath, against the frame 963 and/or an element 963 that is fixed to the frame and/or the housing 963. Particularly preferably, the locking mechanism 951 is arranged so as to fix and/or push the die-cutting cylinder 901; 903 from beneath against a contact surface, preferably in the form of a half shell, in a wall of the housing 963, in particular the housing wall 963, or into the frame 963. The contact surface is preferably adapted to the shape of the die-cutting cylinder 901 and/or is at least adapted to a guide element 971 on the cylinder journal. The contact surface is in particular adapted to the shape of the die-cutting cylinder 901 that the die-cutting cylinder 901 has in the area in which the cylinder makes direct contact with the contact surface. Such a guide element 971 is preferably a groove 971 on a hub 970, which is placed on the cylinder journal. Each die-cutting cylinder 901; 903 preferably comprises at least one guide element 971 or a guide element 971 designed as a groove 971, for securely guiding the die-cutting cylinders 901; 903 in the guides 958; 959. The hub 970 preferably includes the contact surface for locking the die-cutting cylinder 901; 903 in the die-cutting position 981. In the embodiment comprising the locking mechanism 951 from beneath, the die-cutting cylinder 901, when transferred from the die-cutting position 981 into the change-out position 982, drops or moves downwardly in the vertical direction V. In particular, the die-cutting cylinder 901, in particular the groove 971 thereof, in the change-out position 982 is then located in a guide 959, preferably a predominantly horizontal guide 959. The die-cutting cylinder 901 then only moves a few centimeters. The die-cutting cylinder 901 preferably moves less than 20 cm, and more preferably less than 10 cm.

At least in the embodiment which includes the locking mechanism 951 from beneath and the change in position during the transfer into the change-out position 982, the anvil cylinder 902 is in the working position 983 thereof and has a backed-away position 984. More preferably, the anvil cylinder 902, at least in the embodiment which includes the locking mechanism 951 from beneath and the change in position during the transfer into the change-out position 982, comprises a servo drive. The anvil cylinder 902 is arranged so as to be transferrable from the working position 983 into the backed-away position 984 by means of the servo drive. The working position 983 is, in particular, the position of the anvil cylinder 902 in which the die-cutting cylinder 901; 903, which is preferably arranged in the die-cutting position 981, is in direct contact with the anvil cylinder 902. In a preferred embodiment, in the working position 983, the anvil cylinder 902 is arranged in the vertical direction V beneath the die-cutting position 981 of the die-cutting cylinder 901; 903. The backed-away position 984 is a position in which the anvil cylinder 902 is not in contact with the die-cutting cylinder 901; 903. In a preferred embodiment, in the backed-away position 984, the anvil cylinder 902 is arranged in the vertical direction V beneath the die-cutting position 981 of the die-cutting cylinder 901; 903.

The locking mechanism 951 is preferably functionally connected to a drive 952. In a preferred embodiment, the drive 952 of the locking mechanism 951 is designed as a hydraulic drive 952. The drive 952 preferably actuates the locking mechanism 951. The drive 952 preferably actuates the locking mechanism 951 for fixing and/or releasing the die-cutting cylinder 901; 903. The die-cutting cylinder 901; 903 is preferably released from the die-cutting position 981 thereof or fixed in the die-cutting position 981 thereof by the locking mechanism 951 driven by means of the drive 952. The drive 952 thus preferably fixes and/or releases the locking mechanism 951. Via a lever, the drive 952 pushes or pulls a holding element, preferably from beneath, against the contact surface, in particular against the hub 970 or the groove 971 thereof, of the die-cutting cylinder 901; 903. In a preferred embodiment, the drive 952 pulls the locking mechanism 951 upward from beneath, thereby clamping the particular die-cutting cylinder 901; 903 in the die-cutting position 981. As a result, the die-cutting cylinder 901; 903 is raised and pushed from beneath against the housing wall 963 and/or the frame 963. The housing 963 is preferably designed as a frame 963. The housing 963 preferably comprises at least one element 963 that is fixed to the frame, for example the wall thereof. The locking mechanism 951 is arranged so as to fix, preferably push, the die-cutting cylinder 901; 903, preferably from beneath, against the frame 963 and/or the element 963 that is fixed to the frame and/or the housing 963. The locking mechanism 951 can subsequently be released again by the drive 952. By the locking mechanism 951 being released, the die-cutting cylinder 901; 903 can be transferred from the die-cutting position 981 into the change-out position 982. In particular, the die-cutting cylinder 901; 903 is transferred from the die-cutting position 981 into the change-out position 982 by the locking mechanism 951 being released.

In this preferred embodiment described here, the die-cutting cylinder 901; 903 is locked from beneath. However, locking from the side or from above is also possible.

Particularly preferably, the locking mechanism 951 acts so as to point away, in particular perpendicularly, from the shaping point 909 or processing point 909. When a die-cutting mechanism has been rotated, i.e., when the anvil cylinder 902 is preferably arranged above the die-cutting cylinder 901; 903 for forming the processing point 909, locking from above, for example, is advantageous. The locking mechanism 951 is arranged so as to fix the die-cutting cylinder 901; 903, preferably in the die-cutting position 981, preferably by means of the locking mechanism 951, against the wall of the frame 963, in particular frame wall, and/or wall of the housing 963, in particular housing wall 963, so as to point away from the shaping point 909. In particular, the locking mechanism 951 acts on the die-cutting cylinder 901 or on the further die-cutting cylinder 903 from a side of the die-cutting cylinder 901; 903 which is located opposite the contact surface of the frame 963. Preferably, the housing 963 is thus only in contact with the die-cutting cylinder 901; 903 from the side of the die-cutting cylinder 901; 903 which is located opposite the locking mechanism 951, preferably from above. The housing 963 has a matched contact surface, preferably in the form of a half shell, for receiving the die-cutting cylinder 901; 903 in the die-cutting position 981. The matched shape preferably shall be understood to mean a contact surface having a curvature similar to the corresponding contact surface of the die-cutting cylinder 901; 903, in particular of the hub 970. The die-cutting cylinder 901; 903 preferably has a contact surface for clamping. The locking mechanism 951 has a further matched contact surface, and in particular a contact surface that is matched to the die-cutting cylinder 901; 903. The contact surface of the locking mechanism 951 is preferably likewise matched to the shape of the die-cutting cylinder 901; 903 or the shape of the hub 970. To achieve a good clamping effect, the contact surface of the locking mechanism 951 is then arranged opposite the contact surface of the housing 963 or of the frame 963. In particular, the contact surface of the housing 963 and the contact surface of the locking mechanism 951 hold the die-cutting cylinder 901; 903 from opposing sides. As an alternative, the two contact surfaces can also be arranged obliquely opposite one another.

In a preferred embodiment, the die-cutting cylinder 901 or the further die-cutting cylinder 903 is arranged in the change-out position 982. In this change-out position 982, the respective die-cutting cylinder 901; 903 is preferably arranged at the end of the horizontal guide 959. The horizontal guide 959 preferably comprises a half shell at the end. The die-cutting cylinder 901; 903 rests against this half shell. For example, the horizontal guide 959 has a half shell shape, or half shell for short, for establishing the change-out position 982 at the one end of its guide path. The die-cutting cylinder 901; 903 rests against the half shell of the horizontal guide 959 in particular when the die-cutting cylinder 901; 903 is arranged in the change-out position 982. Furthermore, a further recess, preferably in the form of a half shell, is preferably arranged thereabove, preferably a further recess for holding the die-cutting cylinder 901; 903 in the die-cutting position 981. The die-cutting cylinder 901; 903 is now pressed into this recess. For this purpose, the locking mechanism 951 raises the die-cutting cylinder 901; 903, preferably from beneath, and pushes the die-cutting cylinder 901; 903 into the recess above. The recess is designed in such a way that the die-cutting cylinder 901; 903 is then held in position. This position is preferably the die-cutting position 981. The contact surface of the locking mechanism 951 then likewise holds the die-cutting cylinder 901; 903 in position by way of the matched shape, preferably the half shell shape. Preferably, the particular die-cutting cylinder 901; 903 is then held in the die-cutting position 981 by the locking mechanism 951, in particular the contact surface thereof, and/or by the recess in the frame 963 and/or housing 963 and/or the recess at the end of the horizontal guide 959, preferably linear guide 959. The recesses are preferably configured so as to have a shape that is matched to the contact surface of the hub 970. As a result of this configuration, it is in particular possible to securely fix the die-cutting cylinders 901; 903.

In another preferred embodiment, the position of the die-cutting cylinder 901 changes during the transfer from the die-cutting position 981 into the change-out position 982. Preferably, the die-cutting cylinder 901 only moves a few centimeters. The die-cutting cylinder preferably moves less than 20 cm, and more preferably less than 10 cm. The distance between the change-out position 982 and the die-cutting position 981 is thus preferably less than 20 cm, and more preferably less than 10 cm. In this way, the axes of rotation 976 of the die-cutting cylinders, in the change-out position 982 in relation to the die-cutting position 981, are thus preferably spaced less than 20 cm, and preferably less than 10 cm, apart from one another. In a preferred embodiment, the anvil cylinder 902 can be predominantly displaced in the vertical direction V. The backed-away position 984 is a position in which the anvil cylinder 902 is moved out of contact with the die-cutting cylinder 901. The anvil cylinder 902 thus essentially remains in the working position 983 thereof. The anvil cylinder 902 is preferably only backed away so far that the anvil cylinder 902 is not in contact even when the die-cutting cylinder 901 is arranged in the change-out position 982. A servo drive preferably only backs the anvil cylinder 902 away between 15 cm and 30 cm. The servo drive preferably has a travel length of no more than 50 cm, and more preferably of no more than 30 cm. The servo drive of the anvil cylinder 902 preferably comprises a cylinder 953 that is preferably designed as a linear guide 953 and, for example, moves a holding element 954 that is preferably designed as a partial frame. The holding element 954 preferably carries a bearing of the anvil cylinder 902. In this way, the anvil cylinder 902 is preferably displaced by the servo drive, by means of the cylinder 953 and by means of the holding element 954, from the working position 983 thereof into the backed-away position 984 thereof and/or vice versa. Preferably, cylinders 953 and holding elements 954 are arranged in the axial direction upstream and downstream from the processing point 909.

The die-cutting cylinder 901 and/or the at least one further die-cutting cylinder 903 preferably each comprise at least one bearing 990 at the axial ends, preferably on the cylinder journals. The at least one die-cutting cylinder 901; 903 preferably comprises at least one mount 990 at each of the axial ends. The mount 990 is preferably arranged at the die-cutting cylinder 901; 903 in such a way that these move together with the die-cutting cylinder 901; 903. The mount 990 is thus preferably arranged at the die-cutting cylinder 901; 903 so as to move together with the die-cutting cylinder 901; 903 when the die-cutting cylinder 901; 903 is being changed. The position of the mount 990 in the change-out position 982 differs from the position in the die-cutting position 981. Preferably, a mount 990 is arranged at each axial end of the die-cutting cylinder 901; 903. In particular, each die-cutting cylinder 901; 903, at each of the ends thereof, has a hub 970 in the axial direction A.

The die-cutting cylinder 901 and/or the at least one further die-cutting cylinder 903 preferably comprise the at least one hub 970 on at least one of the cylinder journals. The hub 970 is preferably configured so as to limit the movement of the die-cutting cylinder 901; 903 in the axial direction in the guides 958; 959. For this purpose, the hub 970 has two shoulders, which form a groove 971. The hub 970 thus preferably includes the groove 971. The hub 970 includes a surface that can be fixedly connected, by way of the locking mechanism 951, to the frame 963 and/or a wall of the housing 963, in particular housing wall 963. The locking mechanism 951 preferably has a half shell shape, which is adapted to the contact surface of the hub 970, in particular the groove 971. In addition, the wall of the housing 963, in particular housing wall 963, likewise preferably includes a matched half shell for receiving the contact surface of the hub 970, for example the groove 971. In the die-cutting position 981, the die-cutting cylinder 901; 903 is thus fixed in the vertical and horizontal directions by means of the locking mechanism 951. In the axial direction, the die-cutting cylinder 901; 903 is preferably fixed by the elevation of the hub 970. These likewise act accordingly as guide elements in the guides 958; 959. The hub 970 preferably comprises the at least one mount 990. More preferably, the mount 990 is arranged in the hub 970. Furthermore, the locking mechanism 951 is, for example, briefly opened for adjusting the lateral register, which is adjusted by means of the servo drive 996.

The device for changing 950 preferably comprises a transport system 955 for moving the die-cutting cylinders 901; 903. This system preferably comprises transport elements 956; 960; 965, which receive and transport the die-cutting cylinders 901; 903 along the guide paths, i.e., in particular along the at least predominantly horizontal guide 959 and/or along the at least predominantly vertical guide 958, and/or to the different positions. The transport system 955 thus preferably comprises the at least one guide 958; 959.

Another position that the die-cutting cylinder 901 and/or the at least one further die-cutting cylinder 903 can take on is the move-out position 985. One of the die-cutting cylinders 901; 903 can be arranged and/or is arranged in the move-out position 985. The move-out position 985 is preferably arranged on the vertical guide 958. The move-out position 985 is preferably spaced apart from the die-cutting position 981, preferably spaced apart in or counter to the transport direction T. The at least one die-cutting cylinder 901 and/or the at least one further die-cutting cylinder 903 can be transferred from the change-out position 982 into a move-out position 985 and/or vice versa. In particular for changing out the at least one die-cutting cylinder 901, the at least one die-cutting cylinder 901 can be transferred from the change-out position 982 into the move-out position 985 and/or is transferred into the move-out position 985. The change-out position 982 is thus preferably arranged along the guide path between the die-cutting position 981 and the move-out position 985. Preferably, the at least one die-cutting cylinder 901 is removed from the change-out position 982 for this purpose and guided along a guide 959, preferably in the predominantly horizontal guide 959. The die-cutting cylinder 901 can preferably be removed predominantly horizontally from the change-out position 982 and transferred into the move-out position 985. Predominantly horizontal shall, in particular, be understood to mean a direction having a predominantly horizontal component. This wording also encompasses inclined guides. The die-cutting cylinder 901; 903 can preferably be transferred from the change-out position 982 into the move-out position 985, and/or vice versa, on the guide 959 designed as a linear guide 959.

The device for changing 950 preferably comprises at least one transport element 965 for transferring the die-cutting cylinder 901; 903 from the change-out position 982 into the move-out position 985 and/or vice versa. This element more preferably comprises a half shell for holding the die-cutting cylinder 901; 903. The half shell is preferably designed as a contact surface with the die-cutting cylinder 901; 903. In a preferred embodiment, the horizontal transport element 965 is designed as a shell 965. The predominantly horizontal guide 959 is preferably implemented by means of the at least one transport element 965. For example, the at least one transport element 965 of the preferably predominantly horizontal guide 959 is designed as a slide, and preferably as a slide comprising holding arms. More preferably, the at least one transport element 965 of the preferably predominantly horizontal guide 959 includes at least one shell-shaped area on which the die-cutting cylinder 901; 903 can be arranged. Preferably, a transport element 965 is arranged on each side of the housing 963.

The transport element 965 can preferably be moved, preferably horizontally, on at least one guide rail 967. However, the transport element 965 can also follow curved guide paths. Preferably, the at least one guide rail 967 defines the guide path of the preferably predominantly horizontal guide 959. In a preferred embodiment, the preferably predominantly horizontal guide 959 comprises the at least one transport element 965 and the at least one guide rail 967, and at least one drive for moving the transport elements 965 along the at least one guide rail 967. A movement of the transport element 965 moves the die-cutting cylinder 901; 903 along the guide 959, preferably predominantly horizontally, and more preferably completely horizontally. The predominantly horizontal guide 959 preferably establishes the guide path of the die-cutting cylinder 901; 903 from the change-out position 982 to the move-out position 985, and vice versa.

Before the locking mechanism 951 is released, the at least one transport element 965 is preferably arranged beneath the die-cutting cylinder 901, which is preferably arranged in the die-cutting position 981. The transport element 965 preferably has a matched shape, in particular matched to the at least one die-cutting cylinder 901; 903, thus holding this cylinder on the transport element 965. For this purpose, the transport element 965 receives the die-cutting cylinder 901 in the change-out position 982 and is guided on the guide rail 967 by means of the drive. A distance between the die-cutting position 981 and the change-out position 982 is preferably smaller than a distance between the die-cutting position 981 and the move-out position 985. Above and below, a distance between two reference points denotes the length of the shortest connection between the relevant reference points.

The move-out position 985 is preferably the position at which a change in direction of the die-cutting cylinder 901; 903 takes place. In particular, a change in direction of the guide path between the change-out position 982 and the maintenance position 987 takes place in the move-out position 985. The die-cutting cylinder 901, in particular the die-cutting cylinder 901 to be changed out, is preferably transferred from the transport element 965 of the horizontal guide 959 to a transport element 956 of the vertical guide 958 at the move-out position 985. The die-cutting cylinder 903, in particular the die-cutting cylinder 903 to be brought in, is preferably handed over from the transport element 956 of the vertical guide 958 to the transport element 965 of the horizontal guide 959 at the move-out position 985. This means that the move-out position 985 is preferably a position at which the guide paths of the vertical guide 958 and of the horizontal guide 959 intersect. For this purpose, the two transport elements 956; 965 are arranged in different positions, or offset from one another, in the axial direction, i.e., over the width of the machine, and can engage one another and receive the die-cutting cylinder 901; 903. From there, the die-cutting cylinder 901, in particular the die-cutting cylinder 901 to be changed out, can then be displaced in the vertical direction V, in particular by means of the vertical guide 958.

Furthermore, one of the die-cutting cylinders 901; 903 can be arranged and/or is arranged in a maintenance position 987 for set-up and/or maintenance. In this maintenance position 987, the die-cutting cylinder 901; 903 can undergo maintenance and, for example, be prepared for a new die-cutting job. For example, a die-cutting tool can be replaced for a new one. The die-cutting tools are, for example, composed of half shells 964 including die-cutting tools, such as cutting blades, arranged thereon. Preferably, at least one cutting die 964, which is preferably designed as a half shell 964, is attached to the die-cutting cylinder 901; 903. The maintenance position 987 is preferably arranged in a vertical direction V beneath the die-cutting position 981 and/or the change-out position 982. More preferably, the die-cutting cylinder 901; 903 is then located at a comfortable height for an operator. This has the advantage that the die-cutting cylinder 901; 903 can be prepared for the next die-cutting job in a position that is at a height that is easy to reach for an operator. In addition, interfering elements are removed from the die-cutting cylinder 901; 903, which can thus be accessed easily from the surrounding sides. The maintenance position 987 is preferably arranged on the vertical guide 958.

A further position in which the die-cutting cylinders 901; 903 can be arranged is the waiting position 986. Preferably, one of the die-cutting cylinders 901; 903 is arrangeable in the waiting position 986 and/or can be arranged therein and/or is arranged therein and/or is being arranged therein for guiding the two die-cutting cylinders 901; 903 past one another. The waiting position 986 is used to guide two cylinders 901; 903 past one another and is located at least outside a guide path of a die-cutting cylinder 901. The guide path is the direct transport path between the change-out position 982 and the maintenance position 987. In particular, the waiting position 986 is a position outside the direct guide path between the die-cutting position 981 and the maintenance position 987. This guide path is preferably established by the guides 958; 959. In this way, it can be achieved that a die-cutting cylinder 901 and a further die-cutting cylinder 903 can be guided past one another in the guides 958; 959. A die-cutting cylinder 901 can thus be changed for a further die-cutting cylinder 903 in the die-cutting position 981. The process can likewise also take place in the reverse order. One of the die-cutting cylinders 901; 903 is arranged in the waiting position 986 for this purpose, and the other die-cutting cylinder 901; 903 can then be guided past the same. Preferably, one of the die-cutting cylinders 901; 903 is arranged in the waiting position 986, while the other of the die-cutting cylinders 901; 903 is guided past the same.

In a preferred embodiment, the waiting position 986 is arranged at a similar height as or above the change-out position 982 and/or the die-cutting position 981. The waiting position 986 is preferably located in the vertical direction V above the change-out position 982. In addition or as an alternative, the waiting position 986 is located in the vertical direction V above the die-cutting position 981. More preferably, the waiting position 986 is arranged above, and spaced apart from, the die-cutting position 981 and/or the change-out position 982 in the vertical direction V. More preferably, the waiting position 986 is arranged above the move-out position 985. A similar height shall, in particular, be understood to mean a positioning in the vertical direction V that is essentially at the same level in the vertical direction V. This means, in particular, that the waiting position 986 is arranged lower by no more than 100%, more preferably no more than 50% or 20%, of a diameter D901 of the die-cutting cylinder 901. In particular, the waiting position 986 is arranged lower, in the vertical direction V, by no more than 100% of the diameter D901 of the die-cutting cylinder 901 in the change-out position 982 and/or die-cutting position 981. The diameter D901 is preferably the distance from the farthest extensions, including possible blade lengths, of the die-cutting cylinder 901. The waiting position 986 is thus preferably spaced apart from the die-cutting position 981 and/or from the change-out position 982 in the transport direction T, and preferably upstream therefrom in the transport direction T. To save space, the at least one die-cutting cylinder 901; 903 of the die-cutting cylinders 901; 903, in the waiting position 986, is preferably arranged above the other die-cutting cylinder 901; 903 of the die-cutting cylinders 901; 903, but the waiting position 986 is located only so far thereabove that the cylinder is outside the guide path, and the other die-cutting cylinder 901; 903 can be guided past the same.

In a preferred embodiment, the die-cutting cylinder 901, in particular the die-cutting cylinder 901 to be removed, is removed from the change-out position 982 along a removal direction E and guided to the move-out position 985. Furthermore, the waiting position 986 is arranged within, or still more preferably above, two enveloping tangents 974; 975 of the die-cutting cylinder 901. This preferably means that the waiting position 986 is arranged within, or still more preferably above, the enveloping surface of the tangents 974; 975. Preferably, an upper tangent 974 rests against the die-cutting cylinder 901 in the change-out position 982, and a lower tangent 975 rests against the opposing edge. This upper tangent 974 and lower tangent 975 are preferably located at the opposing points of the outside edges of the die-cutting cylinder 901 and are preferably arranged parallel to the removal direction E from the change-out position 982. The removal direction E is preferably established by the guide 959, preferably horizontal guide 959. In a preferred embodiment, the removal direction E is horizontally oriented. However, the removal direction E may also be inclined with respect to the horizontal if the guide 959 is inclined or curved. The removal direction E preferably extends through the change-out position 982 and the move-out position 985 or is defined by these two positions. This means that the removal direction E preferably points from the change-out position 982 to the move-out position 985. In particular in the case of curved guides 959, and in particular curved horizontal guides 959, it is thus possible to determine the removal direction E. The removal direction E preferably has at least one component that is oriented in or counter to the transport direction T, and more preferably the removal direction E is directed in or counter to the transport direction T. Preferably, the waiting position 986, in particular the center thereof, is within or above the tangent, in particular the two enveloping tangents 974; 975, and preferably spaced apart, so that the cylinder 901 to be removed and the new cylinder 903 do not get in the way of one another. Preferably, the positioning of the positions refers to the positioning of the axis of a cylinder, in particular of a die-cutting cylinder 901; 903 that would be located at this position. The waiting position 986 is preferably arranged in or counter to the transport direction T, spaced apart from the die-cutting position 981 and/or from the change-out position 982.

The device for changing 950 preferably comprises the two guides 958; 959. The two guides 958; 959 of the device for changing 950 are preferably designed as linear guides 958; 959. Preferably, one guide 959 of the guides 958; 959 is designed as the predominantly, and more preferably completely, horizontal guide 959, in particular linear guide 959. The other guide 958 of the guides 958; 959 is preferably designed as the predominantly, and more preferably completely, vertical guide 958, in particular linear guide 958. Predominantly, here, preferably shall be understood to mean a greater directional component in the respective horizontal or vertical direction. In another embodiment, the guides 958; 959 can also be curved. When, above and below, mention is made of a horizontal guide 959, this wording preferably also encompasses the predominantly horizontal guide 959, i.e., a curved guide 959 having a greater directional component in the horizontal direction. When, above and below, mention is made of a vertical guide 958, this wording preferably also encompasses the predominantly vertical guide 958, i.e., a curved guide 958 having a greater directional component in the vertical direction. In particular, the die-cutting cylinders 901; 903 are guided along the guides 958; 959. In this way, the die-cutting cylinders 901; 903 are moved along the predominantly horizontal guide 959, preferably in an at least predominantly horizontal direction, preferably in a direction having a greater horizontal component, and more preferably in or counter to the transport direction T. In this way, the die-cutting cylinders 901; 903 are moved along the predominantly vertical guide 958, preferably in a direction having a greater vertical component, preferably in or counter to the vertical direction V.

The transport system 955 preferably comprises the at least one transport element 965 for predominantly horizontally moving the die-cutting cylinders 901; 903, and preferably comprises the at least one transport element 956; 960 for predominantly vertically moving the die-cutting cylinders 901; 903. These transport elements 965; 956; 960 are designed, for example, as slides comprising holding arms. More preferably, these comprise a half shell for holding the die-cutting cylinder 901; 903. The half shell is preferably designed as a contact surface with the die-cutting cylinder 901; 903. Preferably, a respective transport element 956; 960; 965 is arranged on each side of the housing 963.

The waiting position 986 is preferably arranged on the vertical guide 958. The predominantly vertical guide 958 then either comprises two transport elements 956; 960, or two transport elements 956; 960 on a shared transport device 972. In a particularly simple design embodiment, the two transport elements 956; 960 of the predominantly vertical guide 958 are arranged together on a shared transport device 972, in particular a carrier 972 and/or slide 972. The two die-cutting cylinders 901; 903 can then be moved in a predominantly, more preferably completely, vertical direction V by a movement of the transport device 972. The vertical guide 958 preferably comprises two transport elements 956; 960, in particular a first vertical transport element 956 and a second vertical transport element 960. The first and second transport elements 956; 960 can preferably be moved by way of a shared transport device 972 on a preferably predominantly, more preferably completely, vertical guide rail 957. The first and second transport elements 956; 960 are preferably moved by way of the shared transport device 972 on the preferably predominantly, more preferably completely, vertical guide rail 957. The shared transport device 972 preferably comprises the first transport element 956 beneath the second transport element 960.

The at least one transport element 956; 960 of the vertical guide 958 can preferably be moved on at least one guide rail 957, preferably vertically. However, the at least one transport element 956; 960 can also follow curved guide paths. Preferably, the at least one guide rail 957 establishes the guide path of the preferably predominantly vertical guide 958. In a preferred embodiment, the preferably predominantly vertical guide 958 comprises the at least one transport element 956; 960 and the at least one guide rail 957, and at least one drive 933 for moving the at least one transport element 956; 960 along the at least one guide rail 957. A movement of the at least one transport element 956; 960 causes the die-cutting cylinder 901; 903 to be moved along the guide 958, preferably predominantly vertically, and more preferably completely vertically. The predominantly vertical guide 958 preferably establishes the guide path of the die-cutting cylinder 901; 903 from the move-out position 985 to the maintenance position 987 and vice versa, and/or from the waiting position 986 to the move-out position 985 and vice versa, and/or from the waiting position 986 to the maintenance position 987 and vice versa.

Furthermore, the die-cutting cylinders 901; 903 can be and/or are also at least briefly arranged in in-between positions during the change. This, for example, is due to the fact that the transport elements 956; 960; 965, for example, move beneath the cylinders 901; 903 for receiving purposes, wherein these can be raised slightly. Moreover, the die-cutting cylinder 901; 903, which is arranged in the maintenance position 987, can, in principle, be deposited on the upper or on the lower transport element 956; 960 of the vertical transport elements 956; 960. This element is then moved to the suitable height for maintenance.

The at least one die-cutting cylinder 901 and the at least one further die-cutting cylinder 903 have an axis of rotation 976. The individual positions can be geometrically described by way of straight connecting lines 977; 978; 979 of the axes of rotation 976. The axes of rotation 976 extend axially through the die-cutting cylinders 901; 903. These can also be referred to as a central axis. In particular, these straight connecting lines 977; 978; 979 are then the shortest connections between the axes of rotation 976 of the die-cutting cylinders 901; 903 when these are at the individual positions. A shortest straight connecting line 977 between the axis of rotation 976 of the die-cutting cylinder 901; 903 in the die-cutting position 981 and the axis of rotation 976 of the die-cutting cylinder 901; 903 in the move-out position 985 is inclined less than $\alpha=30°$, more preferably less than $\alpha=15°$, with respect to a horizontal plane 988. Inclined shall be understood to mean an inclination between an angle $\alpha$, also referred to as angle of inclination a, and a horizontal plane 988. This also applies to the change-out position 982. This position differs little from the die-cutting position 981, preferably only by the release or fixation of the locking mechanism 951. Here as well, a shortest straight connecting line 979 between the axis of rotation 976 of the die-cutting cylinder 901; 903 in the change-out position 982 and the axis of rotation 976 of the die-cutting cylinder 901; 903 in the move-out position 985 is inclined less 30° with respect to a horizontal plane 988. The horizontal plane 988 preferably extends parallel to a ground.

Furthermore, the waiting position 986 and the maintenance position 987 are preferably arranged on the vertical guide 958. More preferably, the waiting position 986, the maintenance position 987, and the move-out position 985 are preferably arranged on the vertical guide 958. This means that the positions are aligned with respect to one another in relation to a vertical 989 and are preferably arranged offset in the vertical direction V, and more preferably on top of one another. The vertical 989 is preferably parallel to the vertical direction V. The vertical 989 preferably extends through the centers of the cylinders 901; 903 in the maintenance position 987, move-out position 985, and waiting position 986. The 3 positions are preferably arranged directly on top of one another. The maintenance position 987 is preferably arranged beneath the move-out position 985. The waiting position 986 is preferably arranged above the move-out position 985, and the maintenance position 987 is arranged beneath the move-out position 985. However, the waiting position 986 can also be located next to one of the other positions in another embodiment. In principle, all that is important is that the waiting position 986 is located outside the direct guide path between the maintenance position 987 and the die-cutting position 981. Preferably, however, the waiting position 986 is located above, since in this way a particularly preferred and simple design embodiment of the device for changing 950 becomes possible. A shortest straight connecting line 978 between the axis of rotation 976 of the die-cutting cylinder 901; 903 in the move-out position 985 and the waiting position 986 is preferably inclined less than 30°, more preferably less than 15°, with respect to the vertical 989 and/or vertical direction V. Furthermore, for example, a shortest straight connecting line 980 between the axis of rotation 976 of the die-cutting cylinder 901; 903 in the move-out position 985 and the maintenance position 987 is also inclined less than 30° with respect to the vertical 989 and/or vertical direction V. The maintenance position 987 is preferably arranged so as to be located beneath, in the vertical direction V, and spaced apart from the change-out position 982. The maintenance position 987 is preferably arranged so as to be located beneath, in the vertical direction V, and spaced apart from the die-cutting position 981. The maintenance position 987 is preferably arranged so as to be spaced apart from the change-out position 982 and/or from the die-cutting position 981, in or counter to the transport direction T.

The die-cutting unit 900 comprising the device for changing 950 is advantageously arranged inline in a processing machine 01, which is preferably designed as a sheet processing machine 01, comprising application units 600. These units 600, for example, also comprise devices for changing the cylinders 602; 603; 608 of the application mechanisms 614 in a simplified manner. In this way, a fully automatic cutting die changer, which is integrated inline, can contribute to a considerably more efficient overall machine.

In a preferred embodiment, the processing machine 01 comprises more application units 600 than are required for a normal application job. This means that the processing machine 01 comprises at least two application units 600, wherein one of the application units 600 can at least be used as a redundant application unit 600. In the case of multicolor printing, four application units 600 are typically employed. These four application units 600 are preferably printing units 600. In addition, it is also possible for further units 600 designed as varnish application units 600 to be present. More preferably, the processing machine 01 comprises four further application units 600 for multicolor printing. These four application units 600 can usually undergo maintenance and/or set-up steps while the other units 600 are running during operation. These four further application units 600 can at least be employed as redundant application units 600. As an alternative, these additional application units 600 can also be employed for special print jobs. For example, it is also possible to apply special colors and/or varnishes using the additional application units 600.

The die-cutting cylinder 901 is changed by means of the device for changing 950 using the method described hereafter. During operation of the processing machine 01, the die-cutting cylinder 901 and the anvil cylinder 902 are arranged in the die-cutting position 981 or working position 983. From time to time, the die-cutting cylinder 901 has to be changed or replaced. The die-cutting cylinder 901 is in particular changed for the further die-cutting cylinder 903.

In a preferably first step, the anvil cylinder 902 is preferably backed away from the die-cutting cylinder 901 and transferred from the working position 983 thereof into the backed-away position 984 thereof. For this purpose, the anvil cylinder 902 is preferably predominantly displaced in the vertical direction V, preferably downwardly. During the changing process, the anvil cylinder 902 preferably remains in this position, i.e., preferably in the backed-way position 984, and does not have to be moved.

The die-cutting cylinder 901 is displaced from the die-cutting position 981 into the change-out position 982. Preferably in a further step, in particular after the anvil cylinder 902 has been backed away, the die-cutting cylinder 901 is displaced from the die-cutting position 981 into the change-out position 982. In a preferred embodiment, the die-cutting position 981 and the change-out position 982 are different positions. The locking mechanism 951 is released for the transfer. In a preferred embodiment, the die-cutting cylinder 901 is decoupled from the drive 962 by the coupling 968 prior to being transferred from the die-cutting position 981 into the change-out position 982. In the die-cutting position 981, the die-cutting cylinder 901 is pushed by means of the locking mechanism 951 against a wall of the frame 963, in particular frame wall, and/or wall of the housing 963, in particular housing wall 963, so as to point away from the shaping point 909. In the preferred embodiment, the die-cutting cylinder 901 is arranged above the shaping point 909. The locking mechanism 951 thus pushes the die-cutting cylinder 901 from beneath against the frame 963 and/or the wall of the housing 963. In the process, the locking mechanism 951 raises the cylinder 901; 903, pushing it against an adapted contact surface, preferably a half shell. By the locking mechanism 951 being released, the pressure against the die-cutting cylinder 901 is preferably removed, whereby the cylinder is transferred into the change-out position 982. In particular, the locking mechanism 951 is released for the changing process, and the die-cutting cylinder 901 is released from the die-cutting position 981 into the change-out position 982. In the preferred embodiment, the at least one die-cutting cylinder 901 is moved away from the shaping point 909 when being transferred from the die-cutting position 981 into the change-out position 982, preferably in the direction of the previously backed-away anvil cylinder 902, and more preferably downwardly. In the change-out position 982, the die-cutting cylinder 901 is preferably carried by the transport element 965 of the preferably horizontal guide 959.

The further die-cutting cylinder 903, which is to replace the current die-cutting cylinder 901, is located in the maintenance position 987. The further die-cutting cylinder 903 is preferably preset while the at least one die-cutting cylinder 901 is in the die-cutting position 981, processing the substrate 02. In the maintenance position 987, the die-cutting cylinder 903 can or is preferably prepared, for example, for the next die-cutting job in a simple manner. For this purpose, a half shell 964 comprising the cutting blades is preferably exchanged. The further die-cutting cylinder 903, for example, has already been prepared while the processing machine 01 has been operated with the at least one die-cutting cylinder 901, i.e., preferably before the die-cutting cylinder changing process started.

The two die-cutting cylinders 901; 903 are now preferably guided past one another in the guides 958; 959. For this purpose, one of the die-cutting cylinders 901; 903 is temporarily stored and/or temporarily held in the waiting position 986. Either the die-cutting cylinder 901 is guided from the change-out position 982 and/or the die-cutting position 981 into the waiting position 986, or the further die-cutting cylinder 903 is guided from the maintenance position 987 into the waiting position 986. Only one of the cylinders 901; 903 has to be moved out of the guide path and is thus temporarily stored in the waiting position 986 for guiding the cylinders 901; 903 past one another.

In the embodiment in which the further die-cutting cylinder 903 is in the waiting position 986, the displacement is preferably carried out according to the following steps. The further die-cutting cylinder 903 is displaced from the maintenance position 987 into the waiting position 986. This preferably takes place by the predominantly vertical displacement of the further die-cutting cylinder 903, preferably along the predominantly vertical guide 958. For this purpose, a transport element 960 of the preferably two vertical transport elements 956; 960 is, in particular, displaced in the vertical direction V with the cylinder 903 on the guide rail 957, thus transporting the further die-cutting cylinder 903 to the waiting position 986. The transport element 956, preferably the other one of the preferably two vertical transport elements 956; 960, is preferably positioned at the move-out position 985 and waits to receive the die-cutting cylinder 901. Preferably, the two vertical transport elements 956; 960 are displaced together in the vertical direction V. At least in the preferred embodiment, in which the waiting position 986 is arranged above the change-out position 982 and/or above the die-cutting position 981 and/or above the other cylinder 901, the further die-cutting cylinder 903 is preferably transported by the vertical transport element 960, which is arranged higher than the other vertical transport element 956 in the shared transport device 972. The die-cutting cylinder 901 to be removed is preferably guided from the change-out position 982 and/or from the die-cutting position 981, preferably on the horizontal guide 959, into the move-out position 985. In the embodiment in which the further die-cutting cylinder 903 is in the waiting position 986, this is preferably carried out after the further die-cutting cylinder 903 has been transferred into the waiting position 986. Preferably after the anvil cylinder 902 has been backed away and the locking mechanism 951 has been released, the die-cutting cylinder 901 is guided from the change-out position 982 and/or the die-cutting position 981, preferably on the guide 959, into the move-out position 985. For this purpose, in particular for guidance into the move-out position 985, the die-cutting cylinder 901 preferably rests on the contact surfaces of the transport element 965, in particular of the horizontal transport element 965, which are intended for this purpose. This element is guided with the die-cutting cylinder 901 on a guide rail 967 and stopped in the move-out position 985. Preferably, the horizontal transport element 965 transports the die-cutting cylinder 901 from the change-out position 982 into the move-out position 985. The die-cutting cylinder 901 is preferably displaced from the die-cutting position 981 or change-out position 982 into the move-out position 985 in a move-out step. The die-cutting cylinder 901 is preferably displaced from the die-cutting position 981 into the change-out position 982, and from the change-out position 982 into the move-out position 985 in the move-out step. In the process, the die-cutting cylinder 901 is preferably displaced predominantly horizontally from the die-cutting position 981 and/or from the change-out position to the move-out position 985. The die-cutting cylinders 901; 903 are thus preferably displaced from the die-cutting position 981, via the change-out position 982, into the move-out position 985, and/or vice versa. In the move-out position 985, the die-cutting cylinder 901 is handed over to the transport element 956 of the, preferably vertical, guide 958. Preferably, the die-cutting cylinder 901 to be removed is handed over to the vertical transport element 956 on which the further die-cutting cylinder 903 is not arranged, i.e., which is free of the further die-cutting cylinder 903. For example, the transport element 956 of the preferred vertical guide 958 approaches the die-cutting cylinder 901 from beneath and receives the die-cutting cylinder 901, preferably by the transport element 956 of the preferably vertical guide 958 slightly raising the cylinder 901 so that the transport element 965 of the predominantly horizontal guide 959 can be moved out. Several intermediate positions may exist for this purpose, which are the result of the design and required for transferring the cylinders 901; 903 from one transport element 956; 960 965 to another. From the move-out position 985, the die-cutting cylinder 901 is then preferably transferred into the maintenance position 987, in particular by means of the preferably vertical guide 958. For example, further intermediate positions arise in the process between the move-out position 985 and the maintenance position 987. In this embodiment, the die-cutting cylinder 901 is preferably transferred along the direct guide path from the die-cutting position 981 thereof into the maintenance position 987, while the further die-cutting cylinder 903 preferably leaves the direct guide path during the die-cutting cylinder changing process. In particular after the at least one die-cutting cylinder 901 has left the move-out position 985 in the direction of the maintenance position 987, the at least one further die-cutting cylinder 903 is preferably displaced from the waiting position 986 to the die-cutting position 981 via the move-out position 985 and the change-out position 982.

As an alternative, it is also possible for the die-cutting cylinder 901, which is preferably to be removed, to be temporarily stored in the waiting position 986. For this purpose, the die-cutting cylinder 901 to be removed is preferably displaced from the die-cutting position 981 and/or from the change-out position 982 into the move-out position 985, preferably by means of the preferably horizontal guide 959. In a preferred embodiment, the further die-cutting cylinder 903 is arranged in the maintenance position 987 or along the direct guide path between the maintenance position 987 and the move-out position 985, preferably on one of the vertical transport elements 956; 960. The die-cutting cylinder 901 is then preferably transferred from the move-out position 985 into the waiting position 986. Preferably, the at least one die-cutting cylinder 901 is predominantly vertically displaced from the move-out position 985 into the waiting position 986. The die-cutting cylinder 901 to be removed thus preferably leaves the direct guide path from the die-cutting position 981 thereof into the waiting position 987, while the further die-cutting cylinder 903 is preferably transported along the direct guide path. This takes place, for example, in this manner when the change-out position 982 is located, in the vertical direction V, at the same height, and in particular at the same height as the waiting position 986. The die-cutting cylinder 901 is then transferred either directly predominantly horizontally from the change-out position 982 into the waiting position 986. Alternatively, the die-cutting cylinder 901 is removed from the move-out position 985 and is then received predominantly vertically, for example by the further transport element 956, preferably a transport element 956 of the preferably vertical guide 958, and transferred to the waiting position 986. In this variant, a transport element 956, preferably a transport element 956 of the preferably vertical guide 958, preferably receives the die-cutting cylinder 901 in the move-out position 985, and moves this cylinder into the waiting position 986. In particular, the transport element 956, which is free of the further die-cutting cylinder 903, receives the die-cutting cylinder 901 to be removed. Preferably after the further die-cutting cylinder 903 has left the move-out position 985 in the direction of the die-cutting position 981, the at least one die-cutting cylinder 901 is displaced from the waiting position 986 to the maintenance position 987.

Subsequent to the cylinders 901; 903 being guided past one another, i.e., preferably while the die-cutting cylinder 901 to be removed is arranged either in the waiting position 986 or in the maintenance position 987 or along the guide path between the move-out position 985 and the maintenance position 987, the further die-cutting cylinder 903 is preferably guided to the move-out position 985. For example, depending on the embodiment, the cylinder is guided by means of the transport system 955 to the move-out position 985. Depending on the embodiment, the first or the second vertical transport element 956; 960 is preferably employed for this purpose. It is thus preferably achieved, by way of the waiting position 986, that the two cylinders 901; 903 can be guided past one another. From the move-out position 985, the further die-cutting cylinder 903 can or is then, preferably predominantly horizontally, moved to the change-out position 982. The horizontal transport element 965 is preferably employed for this purpose. The further die-cutting cylinder 903 is then preferably attached or fixed again at the change-out position 982 by means of the locking mechanism 951. The further die-cutting cylinder 903 is preferably transferred into the die-cutting position 981 for this purpose. In particular, the fixation by means of the locking mechanism 951 transfers the further die-cutting cylinder 903 into the die-cutting position 981. In this way, the at least one further die-cutting cylinder 903 is preferably transferred from the move-out position 985 to the change-out position 982, and then to the die-cutting position 981.

Thereafter, the anvil cylinder 902 is preferably set against the die-cutting cylinder 903 again, in particular when this cylinder was previously backed away, and the processing machine 01 is placed back into operation.

The die-cutting cylinder changing process can preferably be carried out fully automatically. The die-cutting unit 900 is preferably functionally connected to a machine control system. The cylinder changing process can be stored in this system and can then run fully automatically.

In the embodiment comprising a carrier 972 and two transport elements 960; 956, the two cylinders 901; 903 can only be moved together in the predominantly vertical guide 958. It is possible for the cylinders 901; 903 to be guided to intermediate positions so as to yield the movement of the die-cutting cylinders 901; 903 to the positions described in detail above. In the embodiment in which the first die-cutting cylinder 901 is in the waiting position 986, for example, the other die-cutting cylinder 903 can already be entrained, out of the maintenance position 987. During the transfer from the predominantly horizontal transport element 965 to the upper of the vertical transport elements 960, for example, the new die-cutting cylinder 903 is already arranged slightly beneath the move-out position 985 on the lower transport element 956. Depending on which of the two cylinders 901; 903 rests on which transport element 956; 960, the other die-cutting cylinder 901; 903 is entrained vertically.

The die-cutting cylinders 901; 903 are preferably displaced between the maintenance position 987 and/or the move-out position 985 and/or the waiting position 986 on the predominantly vertical guide 958. The die-cutting cylinders 901; 903 are preferably displaced between the change-out position 982 and the move-out position 985 on the predominantly horizontal guide 959.

The expedited maintenance and/or set-up are preferably carried out according to the following method. Some of the application units 600 are used to apply or print the printing fluid, with the remainder of the application units 600 being in a backed-away state. In the backed-away state, the plate cylinders 602 can undergo maintenance or set-up, in particular while the processing machine 01 is running. During set-up, preferably at least the application formes are replaced. Furthermore, however, other processes can also take place during set-up, such as, for example, a replacement of the anilox rollers.

The further die-cutting cylinder 903 can also preferably be preset at the same time, while the at least one die-cutting cylinder 901 is in the die-cutting position 981, processing the substrate 02. For this purpose, the further die-cutting cylinder 903 is arranged in the maintenance position 987 of the device for changing 950. In this position, the further die-cutting cylinder 903 can be comfortably preset or undergo maintenance.

When the processing job has been completed, the processing machine 01 is prepared for a new processing job. For this purpose, the further die-cutting cylinder 903 is used to replace the die-cutting cylinder 901 by means of the device for changing 950. In addition, the backed-away and pre-set application units 600 are transferred from the backed-away state into the state in which they are set against the cylinder. Both processes preferably take place automatically according to a pattern stored in a control system. The die-cutting cylinders 901; 903 are changed according to the above-described method. Likewise, the application units 600 comprise servo drives for setting the application units 600 against and backing the application units away [from the cylinders]. Accordingly, the application units 600 can likewise be transferred from the backed-away position into the position in which they are set against the cylinders.

In the processing machine 01, the sheet 02 has to be transported to the processing points 909. For this purpose, the processing machine 01 preferably comprises a plurality of transport units 700 comprising transport devices 710. The die-cutting unit 900 also comprises at least one transport device 710 for feeding the sheets 02 to the processing point 909. The die-cutting unit 900 preferably comprises a plurality of transport devices 710. The transport device 710 is preferably designed for a hanging transport of sheets and is therefore located above a transport path of the sheet 02. In another embodiment, the transport device 710 can also be arranged beneath the transport path of the sheet 02. In a preferred embodiment, the transport device 710 is designed as a suction transport means, and in particular as a suction box. So as to feed the sheet 02 precisely to the processing point 909, the transport device 710 preferably extends to just upstream from the processing point 909. During a die-cutting cylinder changing process by way of the device for changing 950, the transport device 710 is in the way. The transport device 710 is preferably in the way especially when the die-cutting cylinder 901 is removed horizontally. The die-cutting unit 900 thus preferably comprises a displacement device. As an alternative or in addition, the transport device 710 can be displaced manually, for example by an operator. Preferably, only the part or the transport device 710 that is in the way during the die-cutting cylinder changing process is displaced during a die-cutting cylinder change. For this purpose, the die-cutting unit 900 preferably comprises a transport device 710 in the area of the device for changing 950. It is then only this part of the transport device 710 that is displaced.

During the operation of the processing machine 01, in particular during the operation of the die-cutting unit 900, the transport device 710 is arranged in a working position. The transport device 710 is thus preferably arranged in the working position during the operation of the processing machine 01, i.e., in particular before and after a change of the cylinders 901; 903, regardless of which die-cutting cylinder 901; 903 is arranged at the die-cutting position 981. For changing the cylinders 901; 903, the transport device 710 can be transferred into a maintenance position. The maintenance position is preferably a position that is located outside the guide path of the device for changing 950 the die-cutting cylinders 901; 903. In a first embodiment, this maintenance position can be located next to the working position of the transport device 710. More preferably, however, the maintenance position is located above the working position or above a transport plane 993. More preferably, the transport device 710 is arranged so as to be spaced apart from the transport plane 993 in the maintenance position. In particular, the transport device 710 is arranged so as to be raised in the vertical direction V in the maintenance position. The transport device 710 is preferably at least displaced upwardly by a cylinder diameter of a die-cutting cylinder 901; 903. The transport plane 993 is preferably the plane 993 in which a sheet 02 is being transported. The embodiment in which the maintenance position is arranged above is thus in particular advantageous since the transport device 710 can be raised in a particularly simple manner. In particular, the transport device 710 is at least temporarily arranged in this maintenance position during a cylinder change. Preferably, the movement of the displacement device is synchronized with the movement of the device for changing 950. The transport device 710 can preferably be displaced as a function of the position of the die-cutting cylinders 901; 903. The movement can, for example, be electrically synchronized, for example by means of an electric master axis and a control system, and/or be mechanically synchronized via contact elements. The device for changing 950 preferably comprises contact elements for contacting the displacement device. During the sequence of motions of the die-cutting cylinder changing process, contact is made with these contact elements and/or contact surfaces 992, and the transport device 710 is placed and/or moved out of the way at the appropriate points in time. In this way, the transport device 710 can be prevented from impeding the simple sequence of motions of the die-cutting cylinder changing process.

In a further preferred embodiment, in the maintenance position, the transport device 710 is arranged so as to only be pivoted away upwardly compared to the working position, in particular pivoted to the plane 993, in particular to the transport plane 993. Preferably, the transport device 710 only has to be located out of the way for the die-cutting cylinder changing process.

In a preferred embodiment, in the maintenance position, the transport device 710 is arranged above the waiting position 986 of the die-cutting cylinders 901; 903. This ensures that sufficient space is available for the cylinder changing process.

In a preferred embodiment, the transport device 710 is arranged upstream from the processing point 909 in the transport direction T of sheets 02. In particular, the transport device 710 is arranged along the transport direction T on the side of the processing point 909 on which the transport system 955, and in particular the vertical guide 958, is arranged.

Furthermore, a transport means 904 arranged downstream from the die-cutting unit 900 can also be displaced in such a way that an operator can reach the die-cutting cylinder 901; 903 and/or the anvil cylinder 902 without difficulty. For this purpose, the transport means 904 can preferably be pivoted. For example, this transport means 904 arranged downstream from the die-cutting unit 900 is designed as a separation transport means 904 of a separation device 905. In particular, offcut pieces, which were generated as a result of the processing operation by means of the die-cutting cylinders 901; 903, are separated from the sheet 02 by means of the separation transport means 904, in particular if these were not already previously separated from the sheet 02. For this purpose, the separation device 905 is designed as a jogging device 905, for example. For example, the transport means 904 arranged downstream from the die-cutting unit 900 comprises an upper part and a lower part, for example an upper and a lower conveyor belt. For example, the upper part of the transport means 904 is pivoted upwardly, while the lower part of the transport means 904 is pivoted downwardly.

The displacement device preferably comprises a drive 933 for displacing the at least one transport device 710. This drive 933 is preferably a drive 933 that is shared with the device for changing 950. This drive 933 preferably drives at least the transport element 956; 960, in particular the at least one vertical transport element 956; 960, and/or the carrier 972 of the device for changing 950, in particular in the vertical guide 958.

The drive 933 is preferably designed as a spindle drive. Upon actuation of the drive 933, the transport element 956; 960, in particular the at least one vertical transport element 956; 960, and/or the carrier 972 are preferably moved up or down in the vertical direction V.

The at least one displacement device is preferably arranged on at least one guide, in particular a guide 958 of the device for changing 950, preferably the at least one predominantly vertical guide 958, and more preferably on the guide rail 957 of the at least one predominantly vertical guide 958, and/or is guided thereon and/or is displaced thereon. The guide 958 is thus preferably designed as a shared guide for the device for changing 950 and the displacement device. The relevant guide, more preferably the guide rail 957, preferably of the at least one predominantly vertical guide 958, is preferably designed as a linear guide. The guide 958 thus preferably comprises the guide rail 957 designed as a linear guide 957. The displacement device preferably comprises a frame 991 and/or housing 991. This frame or housing is in each case attached, in the axial direction A, to the ends of the at least one transport device 710, in particular of the transport devices 710, and is preferably arranged in the guide rail 957 of the guide 958, in particular of the vertical guide 958 of the device for changing 950. Preferably, the at least one transport device 710 is fixedly connected to the frame 991 and moves together therewith. The guide 958, in particular the guide rail 957, more preferably the linear guide 957, is preferably designed as a shared guide 958, preferably as a shared guide rail 957, for the device for changing 950 and the displacement device. The displacement device preferably comprises a stop on which the frame 991 and/or the transport device 710 rest in the working position. The at least one transport device 710 preferably only rests with the dead weight on the stop in the working position. The movement counter to the vertical direction V is preferably limited by the stop. Furthermore, a horizontal movement of the transport device 710 is limited by the guide 958, in particular the vertical guide 958 of the device for changing 950. The transport device 710 preferably only has one degree of freedom in, and preferably along, the vertical direction V. Preferably, only the movement from the working position in the vertical direction V is possible. In a preferred embodiment, the transport device 710 has a contact surface 992 for raising the transport device 710 comprising the at least one transport element 956; 960 and/or the carrier 972 of the device for changing 950, in particular the vertical guide 958. The displacement device preferably comprises a contact element including the contact surface 992 for contacting the device for changing 950. When the transport element 956; 960, in particular the at least one vertical transport element 956; 960 or the carrier 972, is raised in the vertical direction V, this element and/or this carrier come in contact with the contact surface 992 and help raise the transport device 710. The transport device 710 is thus preferably at least temporarily transferred into the maintenance position.

As an alternative, the transport device 710 can also carry out the desired movement by way of an electronic master axis. Preferably, the displacement device then comprises a further drive, preferably a drive that is mechanically decoupled from the device for changing 950.

The displacement of the transport device 710 preferably takes place according to the method described hereafter. During a die-cutting cylinder changing process, the transport device 710 is displaced by means of the displacement device from the working position, preferably into the maintenance position, preferably by means of the drive 933. The drive 933 is preferably the drive 933 shared with the device for changing 950. The displacement of the transport device 710 is preferably synchronized with the device for changing 950 or the die-cutting cylinder changer. The transport device 710 is preferably displaced and/or guided on a guide, preferably the guide rail 957 designed as a linear guide 957.

Preferably, the transport device 710 is raised in the vertical direction V by means of the displacement device, against the dead weight of the transport device 710. For this purpose, the transport device 710 is preferably contacted via a contact surface 992 by means of the transport element 956; 960 and/or the carrier 972, preferably from beneath, and is thereby displaced. After the cylinder has been changed, the transport device 710 is preferably returned into the working position. The return movement preferably takes place by lowering of the contact element of the displacement device. The displacement device is preferably lowered as a result of the dead weight of the transport device 710.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A die-cutting unit (900) comprising a device for changing (950), the die-cutting unit (900) further comprising:

a first die-cutting cylinder (901) and an anvil cylinder (902);

the device for changing (950) comprising a second die-cutting cylinder (903) able to replace the first die-cutting cylinder (901), each of the first and second die-cutting cylinders having a respective axis of rotation (976);

the first and second die-cutting cylinders (901; 903) each being moveable between a die-cutting position (981), a change-out position (982), a move-out position (985), which is spaced apart from the die-cutting position (981), and a maintenance position (987) for set-up and/or maintenance, wherein the maintenance position (987) is disposed below the move-out position (985) and the change-out position (982) in a vertical direction (V);

the anvil cylinder (902) being arrangeable in a working position (983) and a backed-away position (984), and the anvil cylinder (902), in the backed-away position (984), being arranged in the vertical direction (V) beneath the die-cutting position (981), characterized in that a first shortest straight connecting line (977) between the respective axis of rotation (976) of one of the first or second die-cutting cylinders (901; 903) when in the die-cutting position (981) and the respective axis of rotation (976) of one of the first or second die-cutting cylinders (901; 903) when in the move-out position (985) is inclined less than 30 degrees with respect to a horizontal plane (988), and in that a second shortest straight connecting line (980) between the respective axis of rotation (976) of one of the first or second die-cutting cylinders (901; 903) when in the move-out position (985) and the respective axis of rotation (976) of one of the first or second die-cutting cylinders (901; 903) when in the maintenance position (987) is inclined less than 30 degrees with respect to the vertical direction (V), and in that the device for changing (950) comprises a predominantly horizontal guide (959), and in that the predominantly horizontal guide (959) establishes a guide path to move one of the first or second die-cutting cylinders (901; 903) between the change-out position (982) and the move-out position (985), the move-out position (985) having the maintenance position (987) disposed therebelow in the vertical direction (V).

2. The die-cutting unit according to claim 1, characterized in that the first and second die-cutting cylinders (901; 903) are alternately arrangeable between the die-cutting position (981), at which die-cutting can be performed on a substrate (02), the change-out position (982), which is an intermediate position between the die-cutting position (981) and the move-out position (985), and the move-out position (985), wherein moving one of the first or second die-cutting cylinders (901; 903) between the die-cutting position (981) and the move-out position (985) includes moving the one of the first or second die-cutting cylinders (901; 903) predominantly horizontally along the guide path between the move-out position (985) and the change-out position (982), and moving the one of the first or second die-cutting cylinders (901; 903) between the change-out position (982) and the die-cutting position (981).

3. The die-cutting unit according to claim 2, characterized in that a third shortest straight connecting line (979) between the respective axis of rotation (976) of one of the first or second die-cutting cylinders (901; 903) when in the change-out position (982) and the respective axis of rotation (976) of one of the first or second die-cutting cylinders (901; 903) when in the move-out position (985) is inclined less than 30 degrees with respect to the horizontal plane (988), and/or in that the change-out position (982) is spaced apart from the die-cutting position (981) in the vertical direction (V) and/or in that the change-out position (982) is arranged beneath the die-cutting position (981).

4. The die-cutting unit according to claim 1, characterized in that one of the first or second die-cutting cylinders (901; 903) is arrangeable and/or can be arranged and/or is arranged in a waiting position (986) for enabling one of the first or second die-cutting cylinders (901; 903) to be guided past the other one of the first or second die-cutting cylinders (901; 903) by movement at least partially in a transport direction (T) of a substrate (02), or at least partially counter to the transport direction (T).

5. The die-cutting unit according to claim 4, characterized in that a fourth shortest straight connecting line (978) between the respective axis of rotation (976) of one of the first or second die-cutting cylinders (901; 903) when in the move-out position (985) and the respective axis of rotation (976) of one of the first or second die-cutting cylinders (901; 903) when in the waiting position (986) is inclined less than 30 degrees with respect to the vertical direction (V), and/or in that the waiting position (986) is located in the vertical direction (V) above the die-cutting position (981) and/or in that the waiting position (986) is located outside a direct guide path between the maintenance position (987) and the die-cutting position (981).

6. The die-cutting unit according to claim 1, characterized in that the move-out position (985) is horizontally spaced apart from the die-cutting position (981) and the change-out position (982), wherein the guide path enables, at least in part, movement of the one of the first or second die-cutting cylinders (901; 903) between the die-cutting position (981) and the move-out position (985) by movement predominantly horizontally in a transport direction (T) of a substrate (02), or counter to the transport direction (T).

7. The die-cutting unit according to claim 1, characterized in that, in the working position (983), the anvil cylinder (902) is arranged in the vertical direction (V) beneath the die-cutting position (981).

8. The die-cutting unit according to claim 1, characterized in that the device for changing (950) comprises a predominantly vertical guide (958).

9. The die-cutting unit according to claim 8, characterized in that the predominantly vertical guide (958) establishes a guide path for moving the first or second die-cutting cylinder (901; 903) independently of the anvil cylinder (902) from the move-out position (985) to the maintenance position (987) disposed below the move-out position (985) and vice versa, and/or from the waiting position (986) to the move-out position (985) disposed below the waiting position (986) and vice versa, and/or from the waiting position (986) to the maintenance position (987) disposed below the waiting position (986) and vice versa, and/or in that the predominantly vertical guide (958) comprises a first vertical transport element (956) and a second vertical transport element (960), and in that the first and second vertical transport elements (956; 960) are moved by way of a shared transport device (972) on a predominantly vertical guide rail (957), the shared transport device (972) comprising the first vertical transport element (956) beneath the second vertical transport element (960), and/or that the predominantly vertical guide (958) is a linear guide.

10. The die-cutting unit according to claim 8, characterized in that guide paths of the vertical guide (958) and of the horizontal guide (959) intersect at the move-out position (985).

11. The die-cutting unit according to claim 1, characterized in that the die-cutting unit (900) comprises a housing (963), which has at least one first wall and one second wall, which are arranged in an axial direction (A) upstream and downstream from the transport path of a substrate (02), and that the housing (963) is configured as a frame for holding the first and second die-cutting cylinders (901; 903) and the anvil cylinder (902) of the die-cutting unit (900).

12. The die-cutting unit according to claim 1, characterized in that the waiting position (986), the maintenance position (987), and the move-out position (985) are arranged on the vertical guide (958), and in that the waiting position (986), the maintenance position (987), and the move-out position (985) are aligned with respect to one another in relation to the vertical direction (V) and are arranged offset with respect to one another in the vertical direction (V).

13. The die-cutting unit according to claim 1, characterized in that the first and second die-cutting cylinders (901; 903) are each moveable predominantly horizontally and independently of the anvil cylinder (902) in a transport direction (T) of a substrate (02), or counter to the transport direction (T), between the die-cutting position (981) and the move-out position (985), which is spaced apart from the die-cutting position (981) in at least a horizontal direction, and in that the first and second die-cutting cylinders (901; 903) are each moveable independently of the anvil cylinder (902) between the move-out position (985) and the maintenance position (987), which is disposed below the move-out position (985) and the die-cutting position (981) in the vertical direction (V).

14. A method for changing first and second die-cutting cylinders (901; 903) of a die-cutting unit (900), the die-cutting unit (900) comprising the first die-cutting cylinder (901) and an anvil cylinder (902); the first die-cutting cylinder (901) being exchangeable with the second die-cutting cylinder (903) by means of a device for changing (950); the second die-cutting cylinder (903) being located in a maintenance position (987) for set-up and/or maintenance, and the first die-cutting cylinder (901) being located in a die-cutting position (981), each of the first and second die-cutting cylinders having a respective axis of rotation (976);

in a working position (983), the anvil cylinder (902) being arranged in a vertical direction (V) beneath the die-cutting position (981) of the first die-cutting cylinder (901); the anvil cylinder (902) being able to be displaced from the working position (983) into a backed-away position (984); the method comprising:

displacing the anvil cylinder (902) in a predominantly vertical direction (V) into the backed-away position (984); and displacing the first die-cutting cylinder (901), in a move-out step, from the die-cutting position (981) into a move-out position (985), characterized in that the die-cutting cylinder (901) is displaced predominantly horizontally from the die-cutting position (981) to the move-out position (985), in that a first shortest straight connecting line (977) between the respective axis of rotation (976) of one of the first or second die-cutting cylinders (901; 903) when in the die-cutting position (981) and the respective axis of rotation (976) of one of the first or second die-cutting cylinders (901; 903) when in the move-out position (985) is inclined less than 30 degrees with respect to a horizontal plane (988), and in that a second shortest straight connecting line (980) between the respective axis of rotation (976) of one of the first or second die-cutting cylinders (901; 903) when in the move-out position (985) and the respective axis of rotation (976) of one of the first or second die-cutting cylinders (901; 903) when in the maintenance position (987) is inclined less than 30 degrees with respect to the vertical direction (V), and in that the device for changing (950) comprises a predominantly vertical guide (958), and in that one of the first or second die-cutting cylinders (901; 903) is moved between the move-out position (985) and the maintenance position (987) by movement in the vertical direction (V) along the predominantly vertical guide (985).

15. The method according to claim 14, characterized in that the die-cutting cylinder (901) is displaced from the die-cutting position (981), at which die-cutting can be performed on a substrate (02), into a change-out position (982), and in that the die-cutting cylinder (901) is displaced predominantly horizontally in a transport direction (T) of a substrate (02), or counter to the transport direction (T) from the change-out position (982) into the move-out position (985), which is horizontally offset from the die-cutting position (981) and the change-out position (982), and/or in that one of the first or second die-cutting cylinders (901; 903) is arranged in a waiting position (986) for enabling one of the first or second die-cutting cylinders (901; 903) to be guided past the other one of the first or second die-cutting cylinders (901, 903) by movement at least partially in the transport direction (T) of the substrate (02), or at least partially counter to the transport direction (T).

16. The method according to claim 14, characterized in that the device for changing (950) comprises a predominantly horizontal guide (959) that establishes a guide path to move, in a transport direction (T) of a substrate (02), or counter to the transport direction (T), one of the first or second die-cutting cylinders (901; 903) between the die-cutting position (981) and the move-out position (985), wherein the maintenance position (987) is disposed below the die-cutting position (981) and the move-out position (985) in the vertical direction (V).

17. The method according to claim 16, characterized in that the guide paths of the vertical guide (958) and of the horizontal guide (959) intersect at the move-out position (985), and/or in that the predominantly vertical guide (958) comprises a first vertical transport element (956) and a second vertical transport element (960), and in that the first and second transport elements (956; 960) are moved by way of a shared transport device (972) on a predominantly vertical guide rail (957), the shared transport device (972) comprising the first vertical transport element (956) beneath the second vertical transport element (960), and/or that the predominantly vertical guide (958) is a linear guide.

18. The method according to claim 14, characterized in that the die-cutting unit (900) comprises a housing (963), which has at least one first wall and one second wall, which are arranged in an axial direction (A) upstream and downstream from the transport path of a substrate (02), and in that the housing (963) is configured as a frame for holding the first and second die-cutting cylinders (901; 903) and the anvil cylinder (902) of the die-cutting unit (900).

19. The method according to claim 14, characterized in that the waiting position (986), the maintenance position (987), and the move-out position (985) are arranged on the vertical guide (958), and in that the waiting position (986), the maintenance position (987), and the move-out position (985) are aligned with respect to one another in relation to the vertical direction (V) and are arranged offset with respect to one another in the vertical direction (V).

20. The method according to claim 14, characterized in that the first and second die-cutting cylinders (901; 903) are each moveable predominantly horizontally and independently of the anvil cylinder (902) in a transport direction (T) of a substrate (02), or counter to the transport direction (T), between the die-cutting position (981) and the move-out position (985), which is spaced apart from the die-cutting position (981) in at least a horizontal direction, and in that the first and second die-cutting cylinders (901; 903) are each moveable independently of the anvil cylinder (902) between the move-out position (985) and the maintenance position (987), which is disposed below the move-out position (985) and the die-cutting position (981) in the vertical direction (V).

* * * * *